(12) United States Patent
Fujiwara et al.

(10) Patent No.: US 12,019,019 B2
(45) Date of Patent: Jun. 25, 2024

(54) LIGHT SOURCE DEVICE AND RANGE SENSOR PROVIDED WITH THE SAME

(71) Applicant: OMRON Corporation, Kyoto (JP)

(72) Inventors: Naoki Fujiwara, Takatsuki (JP); Kazuya Kimura, Kizugawa (JP); Masayuki Hayakawa, Kizugawa (JP); Masayuki Arakawa, Nara (JP)

(73) Assignee: OMRON Corporation, Kyoto (JP)

( * ) Notice: Subject to any disclaimer, the term of this patent is extended or adjusted under 35 U.S.C. 154(b) by 1253 days.

(21) Appl. No.: 16/615,189

(22) PCT Filed: Feb. 16, 2018

(86) PCT No.: PCT/JP2018/005402
§ 371 (c)(1),
(2) Date: Nov. 20, 2019

(87) PCT Pub. No.: WO2018/225300
PCT Pub. Date: Dec. 13, 2018

(65) Prior Publication Data
US 2020/0173921 A1 Jun. 4, 2020

(30) Foreign Application Priority Data

Jun. 9, 2017 (JP) .................. 2017-114290

(51) Int. Cl.
*G01N 21/64* (2006.01)
*F21V 5/04* (2006.01)
(Continued)

(52) U.S. Cl.
CPC .......... *G01N 21/6402* (2013.01); *F21V 5/048* (2013.01); *F21V 7/043* (2013.01);
(Continued)

(58) Field of Classification Search
CPC ..... G01N 21/6402; F21V 5/048; F21V 7/043; F21V 9/30; F21V 9/35; G01B 11/026;
(Continued)

(56) References Cited

U.S. PATENT DOCUMENTS 10,975,497 B2 * 4/2021 Uwani .................. G02B 6/42
2005/0105301 A1   5/2005 Takeda et al.
(Continued)

FOREIGN PATENT DOCUMENTS

CN 103673887 A  3/2014
CN 204254515 U  4/2015
(Continued)

OTHER PUBLICATIONS

Translation of JP-2016138020-A (Year: 2016).*
(Continued)

*Primary Examiner* — David P Porta
*Assistant Examiner* — Mamadou Faye
(74) *Attorney, Agent, or Firm* — METROLEX IP LAW GROUP, PLLC

(57) ABSTRACT

A light source device includes a light source unit that emits laser light, a condensing lens, and a transmissive fluorescent body. The condensing lens condenses laser light emitted from the light source unit. The transmissive fluorescent body is provided with, inside thereof, a condensing point of laser light condensed by the condensing lens, and emits fluorescent light from a portion through which laser light passes.

27 Claims, 32 Drawing Sheets

(51) Int. Cl.
  *F21V 7/04*   (2006.01)
  *F21V 9/30*   (2018.01)
  *G01B 11/02*  (2006.01)
  *G01B 11/06*  (2006.01)
  *G01C 15/00*  (2006.01)
  *G01S 7/481*  (2006.01)
  *G01S 7/484*  (2006.01)
  *G01S 17/08*  (2006.01)
  *G02B 19/00*  (2006.01)

(52) U.S. Cl.
  CPC .............. *F21V 9/30* (2018.02); *G01B 11/026* (2013.01); *G01B 11/0608* (2013.01); *G01C 15/002* (2013.01); *G01S 7/4818* (2013.01); *G01S 7/484* (2013.01); *G01S 17/08* (2013.01); *G02B 19/0014* (2013.01); *G02B 19/0052* (2013.01)

(58) Field of Classification Search
  CPC ............ G01B 11/0608; G01B 2210/50; G01C 15/002; G01S 7/4818; G01S 7/484; G01S 17/08; G02B 19/0014; G02B 19/0052; G02B 23/2469
  See application file for complete search history.

(56) References Cited

U.S. PATENT DOCUMENTS

| | | | |
|---|---|---|---|
| 2010/0097779 | A1 | 4/2010 | Gladnick et al. |
| 2010/0208486 | A1 | 8/2010 | Gladnick et al. |
| 2013/0027962 | A1 | 1/2013 | Takahashi et al. |
| 2013/0308332 | A1* | 11/2013 | Woelfing ................ F21V 29/70 362/553 |
| 2015/0083967 | A1 | 3/2015 | Watanabe et al. |
| 2018/0044588 | A1 | 2/2018 | Watanabe et al. |
| 2018/0195693 | A1 | 7/2018 | Yanagisawa |
| 2018/0226770 | A1* | 8/2018 | Yamashita ............ H01S 5/2027 |
| 2018/0283625 | A1* | 10/2018 | Inoue ...................... F21V 7/24 |
| 2020/0263850 | A1* | 8/2020 | Kawaguchi ............. F21V 9/30 |

FOREIGN PATENT DOCUMENTS

| | | | | |
|---|---|---|---|---|
| EP | 2500685 | A1 | 9/2012 | |
| EP | 2708934 | A1 | 3/2014 | |
| JP | 2005-150041 | A | 6/2005 | |
| JP | 2007-148418 | A | 6/2007 | |
| JP | 2011-117960 | A | 6/2011 | |
| JP | 2013-120735 | A | 6/2013 | |
| JP | 2013-191479 | A | 9/2013 | |
| JP | 2013-535797 | A | 9/2013 | |
| JP | 2014-055920 | A | 3/2014 | |
| JP | 2014055920 | A * | 3/2014 | ............ G01B 11/24 |
| JP | 2014-186916 | A | 10/2014 | |
| JP | 5649202 | B2 | 1/2015 | |
| JP | 2016-138020 | A | 8/2016 | |
| JP | 2016138020 | A * | 8/2016 | |
| JP | 2017-050256 | A | 3/2017 | |
| JP | 2017050256 | A * | 3/2017 | |
| TW | I452256 | B | 9/2014 | |
| WO | 99/64784 | A1 | 12/1999 | |
| WO | 2010/116305 | A1 | 10/2010 | |
| WO | 2016/185853 | A1 | 11/2016 | |

OTHER PUBLICATIONS

Translation of JP-2017050256-A (Year: 2017).*
Translation of JP-2014055920-A (Year: 2014).*
An English translation of the International Search Report("ISR") of PCT/JP2018/005402 mailed on Apr. 24, 2018.
The Written Opinion("WO") of PCT/JP2018/005402 mailed on Apr. 24, 2018.
The Taiwanese Office Action issued on Sep. 17, 2018 in a counterpart Taiwanese Patent application.
The Japanese Office Action issued on Oct. 23, 2019 in a counterpart Japanese Patent application.
The partial supplementary European search report (R. 164 EPC) issued on Feb. 5, 2021 in a counterpart European patent application.
The Chinese Office Action (CNOA) issued on May 14, 2021 in a counterpart Chinese patent application.

\* cited by examiner

LIGHT SOURCE DEVICE AND RANGE SENSOR PROVIDED WITH THE SAME

TECHNICAL FIELD

The present invention relates to a light source device and a range sensor provided with the same.

RELATED ART

In recent years, light source devices are used in which a light source unit that emits blue laser light and a fluorescent body that emits fluorescent light excited by the blue laser light irradiated thereon are combined. For example, in Patent Document 1, a light source device is disclosed that is configured such that, using a plurality of fluorescent bodies that emit fluorescent light rays having different wavelengths by being excited by laser light rays that have been emitted from a plurality of semiconductor lasers and are condensed by a condensing lens, the light emitting points of the semiconductor lasers and the fluorescent bodies are respectively in a conjugate relationship to each other with respect to the condensing lens, in order to reduce the size and increase the luminance of the light source device.

RELATED ART DOCUMENT

Patent Document

Patent Document 1: JP 2013-120735A
Patent Document 2: JP 5649202B
Patent Document 3: JP 2007-148418A

SUMMARY OF THE INVENTION

Problem to be Solved by the Invention

However, the known light source device described above has the following problems. That is, in the light source device disclosed in Patent Document 1, each fluorescent body is formed by mixing fluorescent materials with binders such as resin, and therefore, when the fluorescent body is irradiated with laser light emitted from the corresponding semiconductor laser, the laser light is scattered inside the fluorescent body. Therefore, the fluorescent light emitted by the fluorescent materials cannot be efficiently taken out, and it is difficult to obtain a light source having sufficiently high luminance.

Also, a light source device using a single crystal fluorescent body in which binders such as resin are not used is described in Patent Document 2. However, it is difficult to obtain a light source having sufficiently high luminance by the single crystal fluorescent body being simply irradiated with laser light. The present invention aims to provide a light source device with which a light source having higher luminance than known light sources can be obtained, and a range sensor provided with the light source device.

Means for Solving the Problems

A light source device according to a first invention includes a light source unit that emits laser light, a condensing lens, and a transmissive fluorescent body. The condensing lens condenses laser light emitted from the light source unit. The transmissive fluorescent body is provided with, inside thereof, a condensing point of laser light condensed by the condensing lens, and emits fluorescent light from a portion through which laser light passes.

Here, laser light that is emitted from the light source unit and is condensed by the condensing lens is emitted such that the condensing point is located inside the transmissive fluorescent body, and a light source is obtained using fluorescent light generated in the transmissive fluorescent body due to being excited by the laser light.

Here, an LD (Laser Diode) that emits blue laser light or the like can be used as the light source unit. Also, the laser light emitted from the light source unit is not limited to parallel light, and may also be light having some spread.

The condensing lens need only have a function of condensing laser light into the transmissive fluorescent body, and may have any shape. The transmissive fluorescent body is a fluorescent body having a block shape such as a polyhedron or a sphere, and includes a single crystal fluorescent body, a transmissive ceramic fluorescent body, and the like. Also, "transmissive" means a property that, when being irradiated with laser light, the laser light is scarcely scattered inside the fluorescent body (including property of no scattering), and means a scattering property that allows a condensing spot to be formed inside the fluorescent body. Also, "transmissive" means a property that fluorescent light generated inside the fluorescent body is scarcely scattered (including property of no scattering).

With this, a fluorescent light source unit that emits fluorescent light excited by laser light is formed along a laser light propagation direction inside the transmissive fluorescent body that is irradiated with laser light condensed by the condensing lens, and laser light can be taken inside the transmissive fluorescent body while the laser light is scarcely scattered due to the property of the transmissive fluorescent body. As a result, the fluorescent light emitted from the fluorescent light source unit formed in the transmissive fluorescent body can be efficiently taken out, and therefore a light source with higher luminance than known light sources can be obtained.

A light source device according to a second invention is the light source device according to the first invention, wherein the condensing point of the laser light condensed by the condensing lens is provided inside the transmissive fluorescent body, the laser light passes through the condensing point with a beam diameter that is smaller than the beam diameter when the laser light enters a surface of the transmissive fluorescent body and the beam diameter when the laser light exits from a surface of the transmissive fluorescent body, and fluorescent light is emitted from a portion through which the laser light passes.

Here, in the transmissive fluorescent body, laser light passes through the condensing point with a beam diameter that is smaller than the beam diameter of laser light when entering a surface of the transmissive fluorescent body and the beam diameter of laser light when exiting a surface of the transmissive fluorescent body, and fluorescent light is caused to be emitted from a portion through which laser light passes. With this, as a result of increasing the energy density per unit volume by condensing laser light inside the transmissive fluorescent body, a light source with higher luminance than known light sources can be obtained.

A light source device according to a third invention is the light source device according to the first or second invention, wherein the condensing point is provided in a range less than or equal to 500 μm from a surface of the transmissive fluorescent body. Here, the laser light is condensed in a range less than or equal to 500 μm from a surface of the transmissive fluorescent body.

With this, the fluorescent light source unit that emits fluorescent light due to being excited is formed in a portion in which laser light is condensed, in the transmissive fluorescent body. Also, the range from a surface of the transmissive fluorescent body to a position at 500 μm from the surface is irradiated with laser light while being scarcely scattered, and as a result, the emitted fluorescent light can be efficiently taken out from a desired direction.

A light source device according to a fourth invention is the light source device according to the first or second invention, wherein the condensing point is provided in a range less than or equal to 160 μm from a surface of the transmissive fluorescent body. Here, the laser light is condensed in a range less than or equal to 160 μm from a surface of the transmissive fluorescent body, which is a more preferable range.

With this, the fluorescent light source unit that emits fluorescent light due to being excited is formed in a portion in which laser light is condensed, in the transmissive fluorescent body. Also, the range from a surface of the transmissive fluorescent body to a position at 160 μm from the surface is irradiated with laser light while being scarcely scattered, and as a result, the emitted fluorescent light can be efficiently taken out from a desired direction.

A light source device according to a fifth invention is the light source device according to any one of the first to fourth invention, wherein the transmissive fluorescent body is a single crystal fluorescent body. Here, a single crystal fluorescent body is used as the transmissive fluorescent body.

With this, the laser light condensed by the condensing lens propagates inside the transmissive fluorescent body while being scarcely scattered compared with prior fluorescent bodies including binders such as resin, and as a result, fluorescent light can be efficiently emitted. Therefore, a light source with higher luminance than known light sources can be obtained.

A light source device according to a sixth invention is the light source device according to any one of the first to fifth invention, wherein the transmissive fluorescent body has a spherical, ellipsoidal, or polyhedron shape. Here, a fluorescent body having a spherical, ellipsoidal, or polyhedron shape is used as the transmissive fluorescent body.

With this, a fluorescent light source unit that emits fluorescent light excited by laser light can be formed along a laser propagation direction in a portion in which laser light is condensed in the transmissive fluorescent body having a spherical shape or the like. Also, the range from a surface to the inside of the transmissive fluorescent body is irradiated with laser light while being scarcely scattered, and as a result, the emitted fluorescent light can be efficiently taken out from a desired direction.

A light source device according to a seventh invention is the light source device according to any one of the first to sixth invention, and further includes an intake lens that condenses at least the fluorescent light emitted from the transmissive fluorescent body.

Here, an intake lens is provided for taking out fluorescent light emitted in a portion (fluorescent light source unit) irradiated with laser light, inside the transmissive fluorescent body. With this, the fluorescent light emitted in the transmissive fluorescent body is taken out from the transmissive fluorescent body to the outside in a direction of the intake lens. Therefore, a light source with higher luminance than known light sources can be obtained.

A light source device according to an eighth invention is the light source device according to the seventh invention, and further includes a fiber whose first end face is irradiated with the fluorescent light condensed by the intake lens and that emits the fluorescent light from a second end face on a side opposite to the first end face.

Here, a fiber that emits fluorescent light that has entered through the intake lens, from a side (second end face) opposite to an entering side (first end face), is arranged on a downstream side of the intake lens for taking out fluorescent light emitted inside the transmissive fluorescent body. With this, fluorescent light can be taken in from the first end face of the fiber and light with high luminance can be emitted from the second end face.

A light source device according to a ninth invention is the light source device according to the eighth invention, wherein a plurality of fluorescent light intake systems each including the intake lens and the fiber are provided with respect to the single transmissive fluorescent body. Here, a plurality of fluorescent light intake systems (intake lens and fiber) are arranged with respect to the single transmissive fluorescent body.

With this, fluorescent light with high luminance emitted in the transmissive fluorescent body can be taken in by a plurality of fluorescent light intake systems, which can be used as respective light sources with high luminance.

A light source device according to a tenth invention is the light source device according to the seventh or eighth invention, wherein the intake lens is arranged such that its central lens axis matches the central axis of laser propagation of the laser light that is emitted from the light source unit and is condensed by the condensing lens.

Here, the intake lens is arranged such that the central lens axis matches the central axis of laser propagation of laser light inside the transmissive fluorescent body. With this, the intake lens is arranged such that the central axis thereof matches the central axis of a fluorescent light emitting portion (fluorescent light source unit) that is formed inside the transmissive fluorescent body, and as a result, the fluorescent light emitted in the transmissive fluorescent body can be efficiently taken out. Therefore, a light source with higher luminance than known light sources can be obtained.

Also, the intake lens is arranged such that the central axis thereof matches the central axis of a fluorescent light emitting portion (fluorescent light source unit) that is formed inside the transmissive fluorescent body, and as a result, the optical system (condensing lens, intake lens) that is arranged on a downstream side of the light source unit can be arranged on a straight line. Therefore, the optical axis can be easily adjusted, and the size of the optical system can be reduced.

A light source device according to an $11^{th}$ invention is the light source device according to the eighth or ninth invention, wherein the intake lens is arranged such that the central lens axis is oblique to the central lens axis of the condensing lens. Here, the intake lens is arranged such that the central lens axis thereof is oblique to (does not match) the central lens axis of the condensing lens.

With this, the laser light, of laser light that has been emitted to the transmissive fluorescent body, that has passed through the transmissive fluorescent body without being absorbed can be prevented from entering the intake lens. Therefore, the energy of laser light included in light emitted from the light source device can be reduced, and as a result, a light source with high luminance while observing the safety standard of laser products can be obtained.

A light source device according to a $12^{th}$ invention is the light source device according to the eighth invention, wherein a plurality of fluorescent light intake systems each including the intake lens and the fiber are arranged such that the intake lenses are located on one spherical surface centered on the transmissive fluorescent body.

Here, the plurality of fluorescent light intake systems (intake lens and fiber) are arranged on the common spherical surface centered on the transmissive fluorescent body, with respect to a single transmissive fluorescent body. With this, fluorescent light with high luminance emitted in the transmissive fluorescent body is taken in by the plurality of fluorescent light intake systems arranged at the same distance from the transmissive fluorescent body, which can each be used as a light source with high luminance.

A light source device according to a 13$^{th}$ invention is the light source device according to any one of the first to 12$^{th}$ inventions, wherein a plurality of laser condensing systems each including the light source unit and the condensing lens are provided with respect to the single transmissive fluorescent body.

Here, the plurality of laser condensing systems (light source unit and condensing lens) are arranged with respect to the single transmissive fluorescent body. With this, fluorescent light with high luminance excited by laser light with which the transmissive fluorescent body is irradiated from a plurality of positions can be used as a light source.

A light source device according to a 14$^{th}$ invention is the light source device according to the 13$^{th}$ invention, wherein the plurality of laser condensing systems are arranged such that the condensing lenses are located on one spherical surface centered on the transmissive fluorescent body.

Here, the plurality of laser condensing systems (light source unit and condensing lens) are arranged on a common spherical surface centered on the transmissive fluorescent body, with respect to the single transmissive fluorescent body. With this, fluorescent light with high luminance is taken out by irradiating the transmissive fluorescent body with laser light from the plurality of laser condensing systems that are arranged at the same distance from the transmissive fluorescent body, which can be used as a light source.

A light source device according to a 15$^{th}$ invention is the light source device according to any one of the first to 14$^{th}$ inventions, wherein the transmissive fluorescent body has a first face that allows the laser light to pass through and reflects the fluorescent light and a second face that reflects the laser light and allows the fluorescent light to pass through.

Here, the transmissive fluorescent body is provided with a face (first face) that allows laser light to pass through and reflects fluorescent light and a face (second face) that reflects laser light and allows fluorescent light to pass through. Here, a laser transmissive/fluorescent light reflective film and a laser reflective/fluorescent light transmissive film that are formed by vapor deposition, sputtering, or the like on the transmissive fluorescent body can be respectively used as the first face and the second face.

With this, as a result of arranging the first face at a portion of the transmissive fluorescent body on which laser light is incident, the first face can allow laser light with which the transmissive fluorescent body is irradiated to pass through, and reflect fluorescent light excited by laser light.

Also, as a result of arranging the second face at a portion from which fluorescent light excited by laser light exits, the laser light, of laser light with which the transmissive fluorescent body is irradiated, that has passed through the transmissive fluorescent body without being absorbed can be reflected toward the inside of the transmissive fluorescent body, and fluorescent light excited by laser light can pass through and exit.

A light source device according to a 16$^{th}$ invention is the light source device according to any one of the first to 15$^{th}$ inventions, and further includes a concave mirror that is arranged on an incident face side of the transmissive fluorescent body, allows the laser light emitted from the light source unit to pass through, and reflect that part of the fluorescent light emitted in the transmissive fluorescent body, that is emitted toward the incident face toward the transmissive fluorescent body.

Here, the concave mirror that allows laser light to pass through and reflects fluorescent light is arranged on an incident face side of the transmissive fluorescent body, that is, between the condensing lens and the transmissive fluorescent body. Here, a dichroic mirror can be used as the concave mirror.

With this, laser light condensed by the condensing lens can pass through and the transmissive fluorescent body can be irradiated with the laser light, and the fluorescent light, of fluorescent light emitted in the transmissive fluorescent body, that has been emitted toward the incident face side of the transmissive fluorescent body can be reflected by the concave mirror toward the light emitting position of the fluorescent light. As a result, the fluorescent light emitted in the transmissive fluorescent body can be efficiently taken out due to the concave mirror, and therefore a light source with even higher luminance can be obtained.

A light source device according to a 17$^{th}$ invention is the light source device according to any one of the first to 15$^{th}$ inventions, and further includes a concave mirror that is arranged on an emitting face side of the transmissive fluorescent body, reflects the laser light that has been emitted from the light source unit and has passed through the transmissive fluorescent body, and allows that part of the fluorescent light emitted in the transmissive fluorescent body, that is emitted toward the emitting face side to pass through.

Here, the concave mirror that reflects laser light and allows fluorescent light to pass through is arranged on the emitting face side of the transmissive fluorescent body. Here, a dichroic mirror, a holed mirror including an opening through which fluorescent light passes, or the like can be used as the concave mirror.

With this, fluorescent light emitted in the transmissive fluorescent body can pass through, and laser light that was condensed by the condensing lens and has passed through the transmissive fluorescent body can be reflected by the concave mirror toward the light emitting position of the fluorescent light.

As a result, fluorescent light can be efficiently taken out by the laser light that has passed through the transmissive fluorescent body being reflected by the concave mirror toward the transmissive fluorescent body, and therefore a light source with even higher luminance can be obtained.

A light source device according to an 18$^{th}$ invention is the light source device according to the 16$^{th}$ or 17$^{th}$ invention, wherein the concave mirror is a dichroic mirror or a holed mirror including an opening portion. Here, a dichroic mirror or a holed mirror including an opening portion is used as the concave mirror.

With this, the concave mirror provided on a laser light incident face side of the transmissive fluorescent body allows laser light to pass through, and can reflect fluorescent light that has been generated in the transmissive fluorescent body and has been emitted toward the incident face side toward the light emitting position in the transmissive fluorescent body.

Alternatively, the concave mirror provided on an emitting face side of the transmissive fluorescent body allows fluorescent light emitted in the transmissive fluorescent body to pass through, and can reflect laser light that has passed through the transmissive fluorescent body toward the light emitting position in the transmissive fluorescent body. As a result, a light source with even higher luminance can be obtained.

A light source device according to a 19$^{th}$ invention is the light source device according to the first invention, wherein the transmissive fluorescent body has a spherical shape. Here, spherical fluorescent body is used as the transmissive fluorescent body.

With this, a fluorescent light source unit that emits fluorescent light excited by laser light can be formed along a laser propagation direction in a portion in which laser light is condensed in the spherical transmissive fluorescent body. Also, a portion of the transmissive fluorescent body from the surface to the inside is irradiated with laser light while being scarcely scattered, and as a result, emitted fluorescent light can be efficiently taken out toward a desired direction.

A light source device according to a 20$^{th}$ invention is the light source device according to the 19$^{th}$ invention, wherein the transmissive fluorescent body includes a first opening portion for taking in the laser light that was emitted from the light source unit and has been condensed by the condensing lens and a second opening portion for taking out the fluorescent light emitted in the transmissive fluorescent body due to the laser light.

Here, the first and second opening portions are provided in the spherical transmissive fluorescent body, the laser light condensed by the condensing lens is taken in through the first opening portion, and the fluorescent light excited in the transmissive fluorescent body is taken out through the second opening portion. With this, light with high luminance can be taken out using the transmissive fluorescent body including the first opening portion for taking in laser light and the second opening portion for taking out fluorescent light.

A light source device according to a 21$^{st}$ invention is the light source device according to the 19$^{th}$ or 20$^{th}$ invention, wherein a laser condensing system including the light source unit and the condensing lens is arranged so as to condense the laser light in a central portion of the spherical transmissive fluorescent body.

Here, laser light is condensed in the central portion of the spherical transmissive fluorescent body. With this, a fluorescent light source unit that emits fluorescent light is formed in the central portion of the spherical transmissive fluorescent body, and fluorescent light can be emitted from the fluorescent light source unit toward every direction.

A light source device according to a 22$^{nd}$ invention is the light source device according to any one of the 19$^{th}$ to 21$^{st}$ invention, wherein a plurality of laser condensing systems each including the light source unit and the condensing lens are arranged on one spherical surface centered on the transmissive fluorescent body.

Here, the plurality of laser condensing systems (light source unit and condensing lens) are arranged on a common spherical surface centered on the transmissive fluorescent body, with respect to the single spherical transmissive fluorescent body. With this, fluorescent light with high luminance is taken out by the spherical transmissive fluorescent body being irradiated with laser light from the plurality of laser condensing systems that are arranged at the same distance from the transmissive fluorescent body, which can be used as a light source.

A light source device according to a 23$^{rd}$ invention is the light source device according to any one of the 19$^{th}$ to 22$^{nd}$ invention, and further includes an intake lens that condenses the fluorescent light emitted from the transmissive fluorescent body; and a fiber whose first end face is irradiated with the fluorescent light condensed by the intake lens and that emits the fluorescent light from a second end face on a side opposite to the first end face.

Here, the intake lens for taking out fluorescent light emitted in a portion (fluorescent light source unit), inside the transmissive fluorescent body, that is irradiated with laser light and the fiber that emits fluorescent light that has entered through the intake lens from a side (second end face) opposite to the entering side (first end face) are arranged on a downstream side of the transmissive fluorescent body.

With this, the fluorescent light emitted in the transmissive fluorescent body is taken out from the transmissive fluorescent body to the outside in a direction toward of the intake lens. Also, the fiber can take in fluorescent light condensed by the intake lens from the first end face, and emit light with high luminance from the second end face.

A light source device according to a 24$^{th}$ invention is the light source device according to the 23$^{rd}$ invention, wherein a plurality of fluorescent light intake systems each including the intake lens and the fiber are arranged on one spherical surface centered on the transmissive fluorescent body.

Here, the plurality of fluorescent light intake systems (intake lens and fiber) are arranged on a common spherical surface centered on the transmissive fluorescent body with respect to the single spherical transmissive fluorescent body. With this, fluorescent light with high luminance emitted in the spherical transmissive fluorescent body is taken in by the plurality of fluorescent light intake systems that are arranged at the same distance from the transmissive fluorescent body, the plurality of fluorescent light intake systems each being able to be used as a light source with high luminance.

A light source device according to a 25$^{th}$ invention is the light source device according to the 23$^{rd}$ or 24$^{th}$ invention, wherein the intake lens is arranged such that the central lens axis matches the optical axis of the laser light that is emitted from the light source unit and is condensed by the condensing lens.

Here, the intake lens included in the fluorescent light intake system is arranged such that the central lens axis matches the central axis of laser light propagation inside the transmissive fluorescent body.

With this, the intake lens is arranged such that the central axis thereof matches the central axis of a fluorescent light emitting portion (fluorescent light source unit) formed inside the spherical transmissive fluorescent body, and as a result, fluorescent light emitted in the transmissive fluorescent body can be efficiently taken out. Therefore, a light source with higher luminance than known light sources can be obtained.

Also, as a result of the intake lens being arranged such that the central axis thereof matches the central axis of the fluorescent light emitting portion (fluorescent light source unit) formed inside the spherical transmissive fluorescent body, the optical system (condensing lens, intake lens, and the like) arranged on a downstream side of the light source unit can be arranged on a straight line. Therefore, the optical axis can be easily adjusted, and the size of the optical system can be reduced.

A light source device according to a 26$^{th}$ invention is the light source device according to the 23$^{rd}$ or 24$^{th}$ invention, wherein the intake lens is arranged such that the central lens axis is oblique to the central lens axis of the condensing lens.

Here, the intake lens is arranged such that the central axis thereof is oblique to (does not match) the central lens axis of the condensing lens.

With this, the laser light, of laser light with which the transmissive fluorescent body is irradiated, that has passed through the transmissive fluorescent body without being absorbed can be prevented from entering the intake lens. Therefore, the intake lens takes in only the fluorescent light excited by laser light in the transmissive fluorescent body, and a light source with higher luminance than known light sources can be obtained.

A light source device according to a 27$^{th}$ invention includes a light source unit that emits laser light, a condensing lens, a transmissive fluorescent body, a reflection film, a first opening portion, and a second opening portion. The condensing lens condenses laser light emitted from the light source unit. The transmissive fluorescent body emits fluorescent light in a portion through which the laser light passes. The reflection film is provided in at least a portion of the surface of the transmissive fluorescent body, and reflects laser light or fluorescent light. The first opening portion is formed in a portion of the reflection film on a laser light entering side, and allows the laser light to enter. The second opening portion is formed in a portion of the reflection film on a fluorescent light emitting side and allows the fluorescent light to exit.

Here, the transmissive fluorescent body is irradiated with laser light that has been emitted from the light source unit and is condensed by the condensing lens, and fluorescent light is excited by the laser light in the transmissive fluorescent body, which is used as a light source, and the reflection film is provided in at least a portion of the surface of the transmissive fluorescent body. Also, the first and second opening portions are provided in the transmissive fluorescent body, laser light condensed by the condensing lens is taken in through the first opening portion, and fluorescent light excited in the transmissive fluorescent body is taken out through the second opening portion.

With this, laser light can be taken in to the inside of the transmissive fluorescent body through the first opening portion, the laser light taken in the transmissive fluorescent body or the fluorescent light emitted from a portion of the transmissive fluorescent body through which the laser light has passed can be reflected toward a desired direction, and the fluorescent light can be taken out through the second opening portion. As a result, the fluorescent light emitted in the fluorescent light source unit formed in the transmissive fluorescent body can be efficiently taken out, and therefore a light source with higher luminance than known light sources can be obtained.

A range sensor according to a 28$^{th}$ invention includes the light source device according to any one of the first to 27$^{th}$ inventions, a light receiving unit that receives reflected light of light emitted from the light source device, and a measurement unit that measures the distance to an object based on the amount of light received by the light receiving unit.

Here, the range sensor is configured using the light source device described above. With this, because a light source with higher luminance than known light sources can be used, effects such as extension of the measurement distance and improvement in the response speed can be achieved.

A range sensor according to a 29$^{th}$ invention is the range sensor according to the 28$^{th}$ invention, and further includes a chromatic aberration focusing lens through which light having a plurality of wavelengths output from the light source device passes. The light receiving unit receives reflected light of light having the plurality of wavelengths emitted to the object via the chromatic aberration focusing lens. The measurement unit measures the distance to the object based on a wavelength of the reflected light at which the amount of light received by the light receiving unit is largest.

Here, a confocal-type range sensor is configured in which the distance to an object is measured by separating light having a plurality of wavelengths into light rays having respective wavelengths (respective colors) using a chromatic aberration focusing lens, and detecting the wavelength of light having the peak intensity. With this, since the range sensor is configured using a light source device that emits light having higher luminance than known light sources, as described above, a high-performance confocal-type range sensor can be obtained.

Effects of the Invention

According to the light source device according to the present invention, a light source with higher luminance than known light sources can be obtained.

EMBODIMENTS OF THE INVENTION

Embodiment 1

The following is a description of a light source device 10 according to one embodiment of the present invention and a confocal measurement device (range sensor) 50 provided with the light source device 10 using FIGS. 1 to 4, 31 and 32.

Confocal Measurement Device 50

Figure 1:
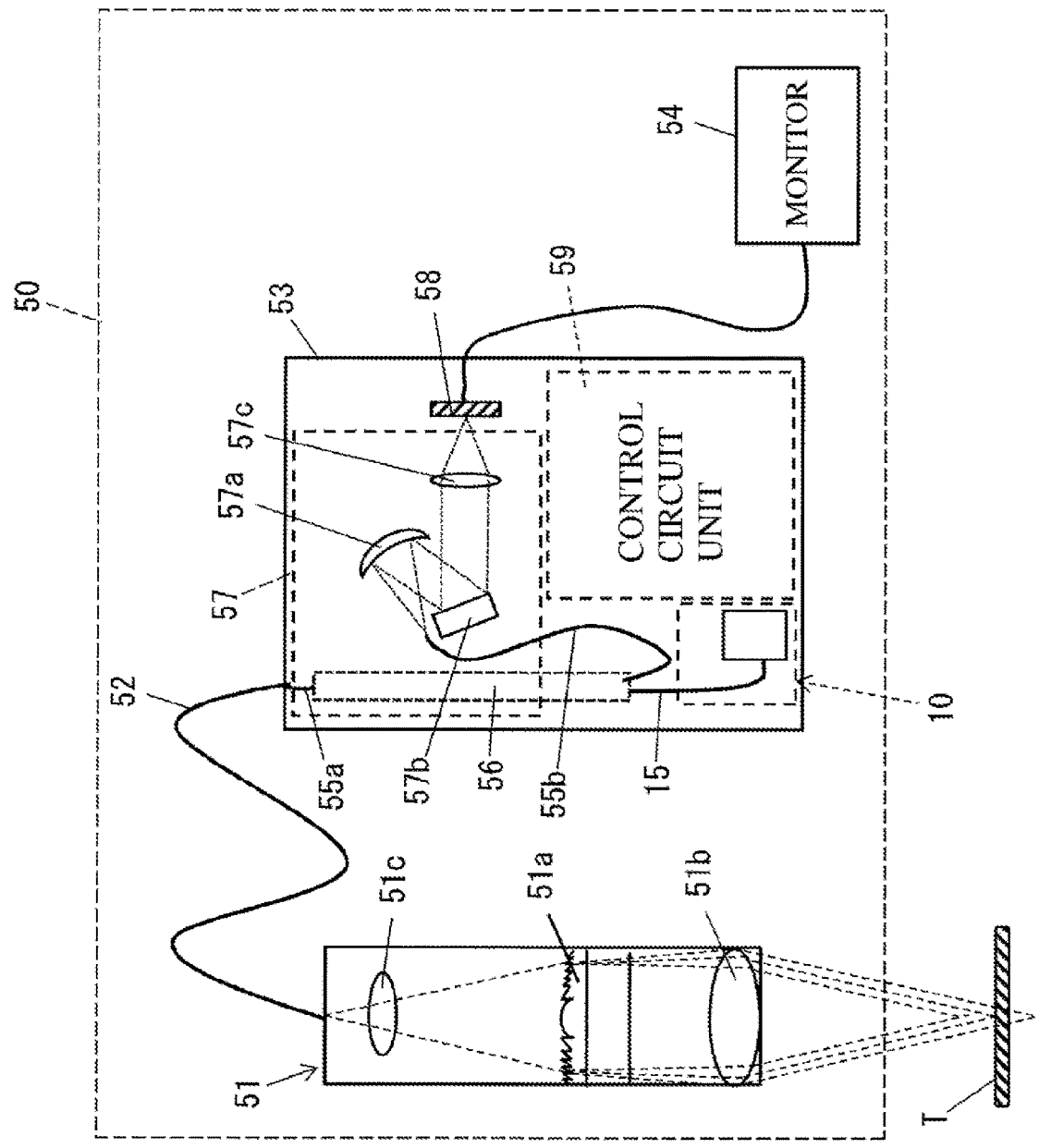
FIG. 1 is a schematic diagram illustrating a configuration of a confocal measurement device in which a light source device according to one embodiment of the present invention is mounted.

The confocal measurement device 50 in which the light source device 10 according to the present embodiment is mounted is a measurement device that measures the displacement of a measurement object T using a confocal optical system, as shown in FIG. 1. The measurement object T to be measured by the confocal measurement device 50 may include the cell gap of a liquid crystal display panel, for example.

The confocal measurement device 50 includes a head unit 51 including a confocal optical system, a controller unit 53 optically connected to the head unit 51 via an optical fiber 52, and a monitor 54 for displaying signals output from the controller unit 53, as shown in FIG. 1.

The head unit 51 includes, inside a tubular housing, a diffractive lens (chromatic aberration focusing lens) 51*a*, an objective lens 51*b* arranged on the measurement object T side relative to the diffractive lens 51*a*, and a condensing lens 51*c* provided between the optical fiber 52 and the diffractive lens 51*a*.

The diffractive lens 51*a* causes chromatic aberration with respect to light emitted from a later-described light source (white light source, for example) that emits light having a plurality of wavelengths along an optical axis direction. A fine rising and falling shape such as a kinoform shape or a binary shape (step shape, staircase shape) is periodically formed on the lens surface of the diffractive lens 51*a*. Note that the shape of the diffractive lens 51*a* is not limited to the above configuration.

The objective lens 51*b* condenses light having chromatic aberration caused by the diffractive lens 51*a* on the measurement object T. The condensing lens 51*c* is provided between the optical fiber 52 and the diffractive lens 51*a* in order to match the numerical aperture (NA) of the optical fiber 52 with the numerical aperture of the diffractive lens 51*a*.

This is because the light emitted from the light source is guided to the head unit 51 via the optical fiber 52, and the numerical aperture of the optical fiber 52 needs to be matched with the numerical aperture of the diffractive lens 51*a* in order to effectively make use of light emitted from the optical fiber 52 in the diffractive lens 51*a*.

The optical fiber 52 is an optical path from the head unit 51 to the controller unit 53, and also functions as a pinhole. That is, the light that is condensed by the objective lens 51*b* and focused on the measurement object T is also focused at an opening portion of the optical fiber 52. Therefore, the optical fiber 52 functions as a pinhole that blocks light having a wavelength that does not focus on the measurement object T and allows light that focuses on the measurement object T to pass.

The confocal measurement device 50 may be configured to not use the optical fiber 52 on an optical path from the head unit 51 to the controller unit 53, but as a result of using the optical fiber 52 on the optical path, the head unit 51 can be flexibly moved relative to the controller unit 53. Also, when an configuration is adopted in which the optical fiber 52 is not used on the optical path from the head unit 51 to the controller unit 53, the confocal measurement device 50 needs to include a pinhole, but the confocal measurement device 50 need not include a pinhole when a configuration of using an optical fiber 52 is adopted.

The light source device 10 serving as a light source, a branching optical fiber 56, a spectroscope 57, an imaging element (light receiving unit) 58, and a control circuit unit (measurement unit) 59 are mounted inside the controller unit 53. Note that the detailed configuration of the light source device 10 will be described later.

The branching optical fiber 56 includes one optical fiber 55a on a connection side of the optical fiber 52, which forms an optical path from the head unit 51 to the controller unit 53, and two optical fibers 15 and 55b on the opposite side. Note that the optical fiber 15 constitutes a portion of the later-described light source device 10. The optical fiber 55b is connected to the spectroscope 57, and the light condensed by the spectroscope 57 is taken in from an end face thereof.

With this, the branching optical fiber 56 guides the light emitted from the light source device 10 to the optical fiber 52, and the measurement object T is irradiated with the light from the head unit 51. Moreover, the branching optical fiber 56 guides the light reflected by the surface of the measurement object T to the spectroscope 57 via the head unit 51 and the optical fiber 52.

The spectroscope 57 includes a concave mirror 57a that reflects reflected light returned via the head unit 51, a diffraction grating 57b on which light reflected by the concave mirror 57a is incident, and a condensing lens 57c that condenses light exiting from the diffraction grating 57b. Note that the spectroscope 57 may be configured to be of any type such as a Czerny-Turner type or a Littrow type spectroscope as long as the reflected light returned via the head unit 51 can be dispersed by wavelength.

The imaging element 58 is a line CMOS (Complementary Metal Oxide Semiconductor) or a CCD (Charge Coupled Device) for measuring the intensity of light exiting from the spectroscope 57. Here, in the confocal measurement device 50, the spectroscope 57, and the imaging element 58 constitute a measurement unit that measures, by wavelength, the intensity of reflected light returned via the head unit 51.

Note that as long as it can measure, by wavelength, the intensity of light that returns from the head unit 51, the measurement unit may also be simply constituted by an imaging element 58, such as a CCD. Moreover, the imaging element 58 may also be a two-dimensional CMOS or a two-dimensional CCD.

The control circuit unit 59 controls the operations of the light source device 10, the imaging element 58, and the like. Also, although not shown in the drawings, the control circuit unit 59 includes an input interface to which signals for adjusting the operations of the light source device 10, the imaging element 58, and the like are input, an output interface from which signals of the imaging element 58 are output, and the like.

The monitor 54 displays the signals that are output by the imaging element 58. For example, the monitor 54 renders the spectral waveform of the light returned from the head unit 51, and displays the displacement of the measurement object. In the confocal measurement device 50 of the present embodiment, as a result of mounting the following light source device 10, a light source with high luminance can be obtained.

Accordingly, effects such as extending the measurement distance and improving the responsiveness, as a measurement device, can be obtained. Note that the configuration of the light source device 10 will be described in detail later.

Light Source Device 10

Figure 2:
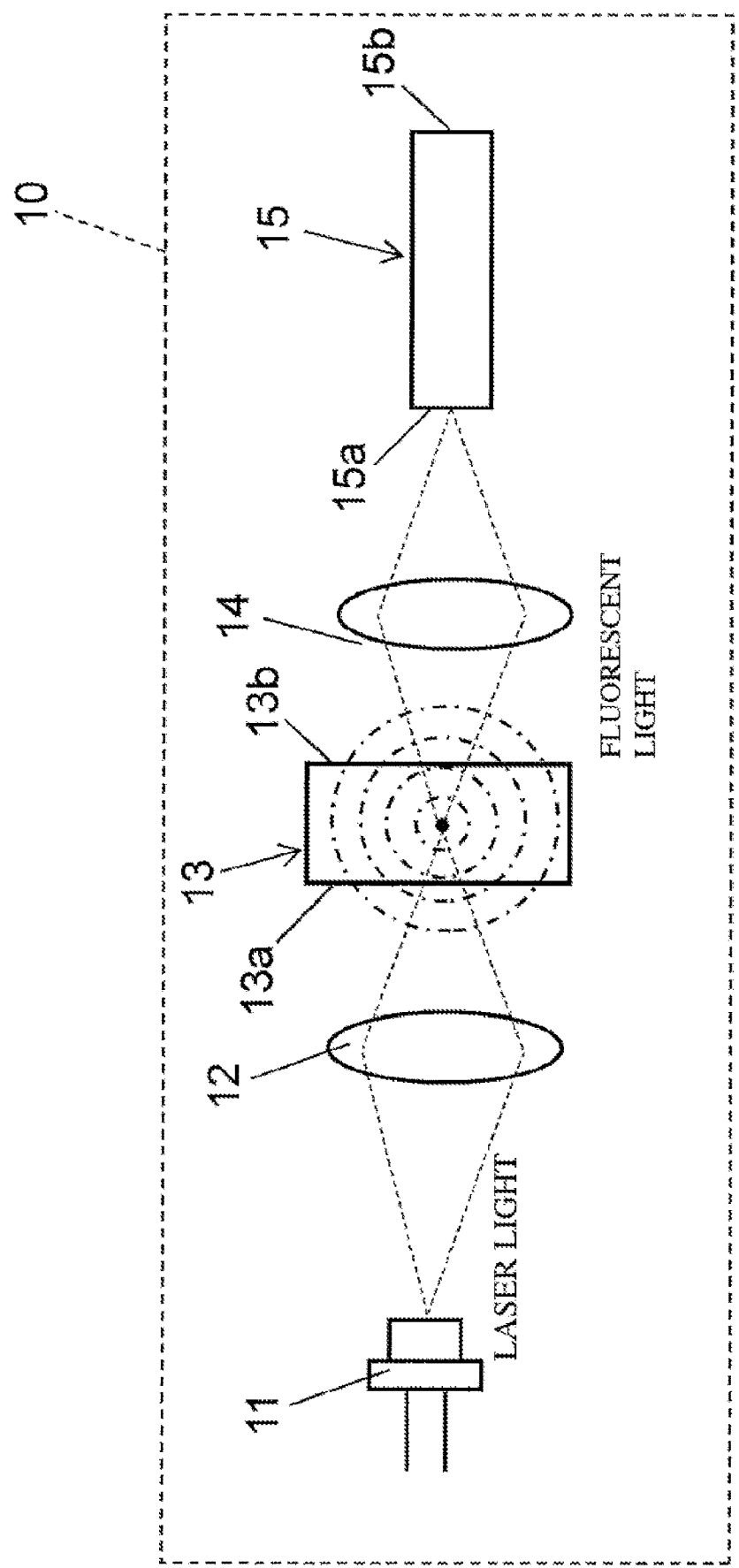
FIG. 2 is a schematic diagram illustrating a configuration of the light source device mounted in the confocal measurement device in FIG. 1.

The light source device 10 of the present embodiment is mounted as a light source of the confocal measurement device 50 described above, and includes a light source unit 11, a condensing lens 12, a transmissive fluorescent body 13, an intake lens 14, and an optical fiber 15, as shown in FIG. 2.

The light source unit 11 is a semiconductor laser that emits laser light, which has a peak wavelength of approximately 450 nm, for example, and which serves as exciting light for causing the transmissive fluorescent body 13 to emit fluorescent light, toward the condensing lens 12.

The condensing lens 12 is a convex lens whose incident face and emitting face protrude outward, and condenses laser light emitted from the light source unit inside the transmissive fluorescent body 13. Specifically, the condensing lens 12 condenses laser light to a region at a distance of 500 μm or less from an incident face 13a of the transmissive fluorescent body 13.

Note that the position of condensing point X (depth from the incident side surface) at which laser light is condensed by the condensing lens 12 will be described later. The transmissive fluorescent body 13 is a YAG single crystal fluorescent body doped with Ce ions, and has a plate-like shape, as shown in FIG. 2. Also, the transmissive fluorescent body 13 has an incident face 13a and an emitting face 13b that are arranged along a plane perpendicular to the laser propagation direction. Also, the transmissive fluorescent body 13 emits fluorescent light having a wavelength range from 480 nm to 750 nm in every direction from a portion that is irradiated with laser light that has been emitted from the light source unit 11 and condensed by the condensing lens 12, as shown in FIG. 2.

Figure 3:
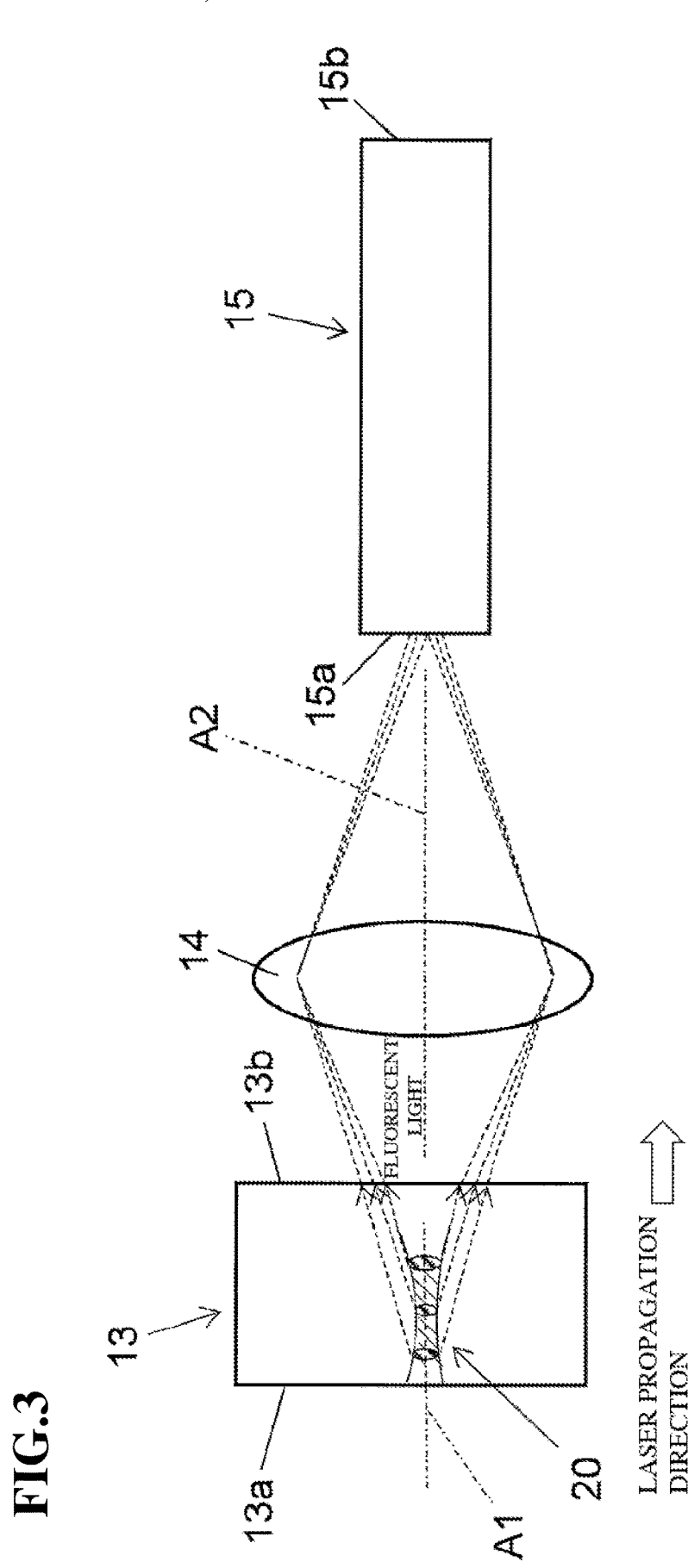
FIG. 3 is a schematic diagram in which main parts of the light source device in FIG. 2 are enlarged.
Figure 4:
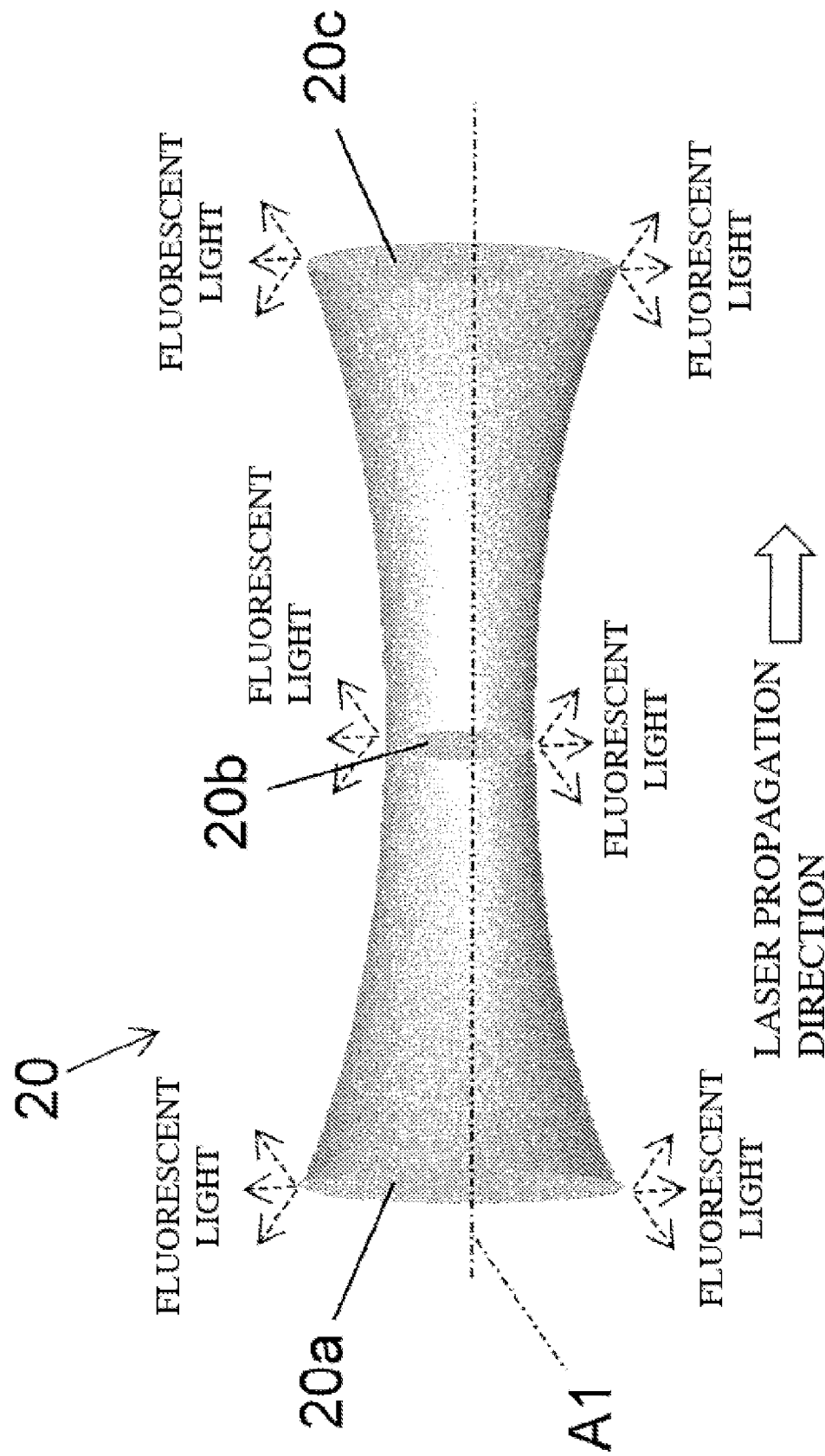
FIG. 4 is a schematic diagram illustrating the shape of a fluorescent light source unit formed inside a transmissive fluorescent body in FIG. 3.

Also, in the transmissive fluorescent body 13, a fluorescent light source portion 20 having a substantially tubular shape that extends along the laser light propagation direction is formed in the portion irradiated with the laser light, as shown in FIG. 3. The fluorescent light source portion 20 is formed in a portion inside the transmissive fluorescent body 13 through which the laser light passes, and has a substantially tubular shape elongated in the laser propagation direction, as shown in FIGS. 3 and 4.

Also, because the fluorescent light source portion 20 emits fluorescent light toward every direction from each part thereof, the fluorescent light source portion 20 can be considered to be a light source formed inside the transmissive fluorescent body 13. Specifically, the fluorescent light source portion 20 has a substantially cylindrical shape and the radius of its circular cross-sectional shape is minimum in a small diameter portion positioned in a central portion in a longitudinal direction along the propagation direction of the laser light, and increases toward both ends, as shown in FIG. 4.

That is, the fluorescent light source portion 20 is formed such that the condensing point X of the laser light is positioned in a small diameter portion cross section 20b. Also, the fluorescent light source portion 20 is formed such that the cross-sectional areas of an incident-side cross section 20a and an emitting-side cross section 20c are larger than that of the small diameter portion cross section 20b in accordance with diffusion of the laser light.

For example, the fluorescent light source portion 20 emits fluorescent light toward every direction from an end face on a laser light incident side (incident-side cross section 20a), from the small diameter portion in the central portion of the substantially cylindrical shape (small diameter portion cross section 20b), and from an end face on a laser light emitting-side (emitting-side cross section 20c).

Therefore, the light amount of the fluorescent light that is emitted from the fluorescent light source portion 20 and that is condensed on an end face (first face) of the optical fiber 15 by the intake lens 14 is a light amount of that part of the fluorescent light, that is taken in by the intake lens 14, of the fluorescent light emitted from the fluorescent light source portion 20 that is present inside of the depth of field of the optical fiber 15 that extends in a central lens axis A2 direction of the intake lens 14.

Note that the depth of field means a range that is considered to be practically in-focus in the vicinity of the position on a subject side (object side) that is brought into focus using a lens. Also, the focal depth is an equivalent of the depth of field on a film side (image plane side). That is, all objects inside the depth of field can be brought in focus when shooting is performed.

Also, the rear side of the in-focus position, of the depth of field, is referred to as a "rear depth of field", and the front side of the in-focus position is referred to as a "front depth of field". The intake lens 14 is a convex lens whose incident face and emitting face protrude outward, similarly to the condensing lens 12, and is arranged on a downstream side in a laser light propagating direction in the transmissive fluorescent body 13. Also, the intake lens 14 condenses fluorescent light emitted from the inside of the transmissive fluorescent body 13 (fluorescent light source portion 20) on an end face of the optical fiber 15.

Also, the intake lens 14 is arranged such that the central lens axis A2 matches a central axis A1 of laser light propagating inside the transmissive fluorescent body 13 (on the same straight line), as shown in FIG. 3. In this way, as a result of arranging such that the central axis A1 of laser propagation matches the central lens axis A2 of the intake lens 14, the fluorescent light emitted from the fluorescent light source portion 20 can be efficiently caused to enter the optical fiber 15 from a first face 15a.

The optical fiber 15 is one optical fiber that constitutes the branching optical fiber 56 of the confocal measurement device 50 described above, and forms, inside thereof, an optical path of light to be emitted from the head unit 51 of the confocal measurement device 50.

Also, the optical fiber 15 has an end face (first face 15a) through which the fluorescent light condensed by the intake lens 14 enters, and an emitting-side end face (second face 15b) on the opposite side, as shown in FIG. 3.

With this, the optical fiber 15 can emit light that has entered from the first face 15a from the second face 15b. In the light source device 10 of the present embodiment, with the configuration described above, the exciting laser light emitted from the light source unit 11 is condensed inside the transmissive fluorescent body 13 by the condensing lens 12, as shown in FIG. 2. Also, the fluorescent light generated in a portion, inside the transmissive fluorescent body 13, in which the laser light is condensed is condensed on the first face 15a of the optical fiber 15 by the intake lens 14, as shown in FIG. 3.

Here, in the light source device 10 of the present embodiment, the inside of the single crystal fluorescent body (transmissive fluorescent body 13) is irradiated with the laser light condensed by the condensing lens 12, as described above. Here, after entering the single crystal fluorescent body (transmissive fluorescent body 13), the laser light passes through the inside of the fluorescent body while exciting fluorescent light and hardly being diffused inside the fluorescent body.

That is, in the light source device 10 of the present embodiment, a single crystal fluorescent body (transmissive fluorescent body) that is unlikely to scatter laser light that has entered the inside thereof is used. Therefore, the fluorescent light emitted due to being excited by laser light that has entered the inside of the fluorescent body can be efficiently taken out, compared with a known fluorescent body in which fluorescent materials are fixed by binders such as resin, and as a result, a light source with higher luminance compared with known light sources can be obtained.

Position (Depth) of Condensing Point X

In the present embodiment, the condensing point X of laser light that is formed inside the transmissive fluorescent body 13 by the condensing lens 12 is formed at 500 µm or less from the incident-side surface of the transmissive fluorescent body 13, and preferably at 160 µm or less.

Here, the condensing point X at which the light amount is maximum is determined by the laser NA that is determined by the light source unit 11 and the condensing lens 12, the distance from the surface, of the transmissive fluorescent body 13, through which the laser enters, and the absorption coefficient of the transmissive fluorescent body 13.

Figure 31:
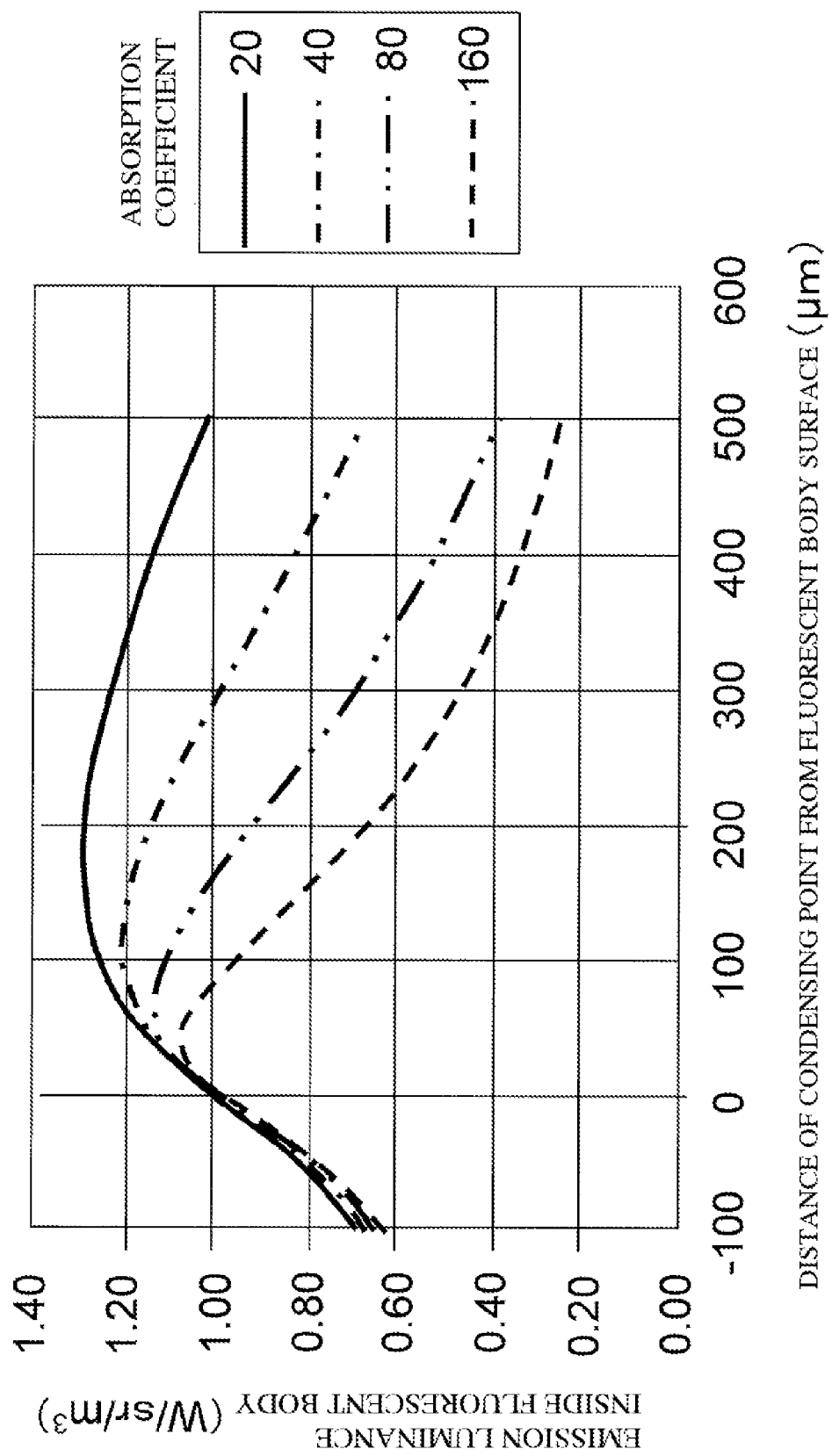
FIG. 31 is a graph showing a relationship between a distance of a condensing point formed inside the transmissive fluorescent body in FIG. 3 from the surface of the fluorescent body and emission luminance inside the fluorescent body for various absorption coefficients of the transmissive fluorescent body.

FIG. 31 shows a graph illustrating the relationship between the distance (depth) of the condensing point X formed inside the transmissive fluorescent body 13 from the fluorescent body surface and the emission luminance inside the fluorescent body for various absorption coefficients of the transmissive fluorescent body 13.

Note that the graph shown in FIG. 31 illustrates the relationship between the distance of the condensing point X from the fluorescent body surface and the emission luminance inside the fluorescent body when the focal position radius (beam waist/beam radius) is 20 µm and the laser NA (Numerical Aperture) is 0.06.

Specifically, the graph shown in FIG. 31 illustrates the change in intra-fluorescent body emission luminance relative to the depth (distance from the fluorescent body surface) of the condensing point X with respect to the absorption coefficient, of the transmissive fluorescent body 13, being 20, 40, 80, and 160, respectively.

Also, in the graph shown in FIG. 31, the relative emission luminance is plotted for various absorption coefficients, when the emission luminance inside the fluorescent body is set to 1.00 (W/sr/m$^3$) when the distance of the condensing point X from the fluorescent body surface is 0 µm, that is, when the condensing point X is located at the surface. Moreover, the range of the depth of the condensing point X at which the emission luminance is larger than 1.00 (W/sr/m$^3$) is defined as the numerical value range.

For example, when the absorption coefficient of the transmissive fluorescent body 13 is 20, the emission luminance is larger than 1.00 (W/sr/m$^3$) in a range, of the distance (depth) of the condensing point X from the fluorescent body surface, from 0 µm to 500 µm, as shown in the graph in FIG. 31. On the other hand, when the distance (depth) of the condensing point X from the fluorescent body surface exceeds 500 µm, the emission luminance decreases below 1.00 (W/sr/m$^3$). Therefore, when the absorption coefficient of the transmissive fluorescent body 13 is 20, a light source with high luminance can be obtained if the distance of the condensing point X is 500 µm or less.

Next, when the absorption coefficient of the transmissive fluorescent body 13 is 40, the emission luminance is larger than 1.00 (W/sr/m$^3$) in a range, of the distance (depth) of the condensing point X from the fluorescent body surface, from 0 µm to 300 µm, as shown in the graph in FIG. 31. On the other hand, when the distance (depth) of the condensing point X from the fluorescent body surface exceeds 300 µm, the emission luminance decreases below 1.00 (W/sr/m$^3$).

Therefore, when the absorption coefficient of the transmissive fluorescent body 13 is 40, a light source with high luminance can be obtained if the distance of the condensing point X is 300 μm or less.

Next, when the absorption coefficient of the transmissive fluorescent body 13 is 80, the emission luminance is larger than 1.00 (W/sr/m$^3$) in a range, of the distance (depth) of the condensing point X from the fluorescent body surface, from 0 μm to 160 μm, as shown in the graph in FIG. 31. On the other hand, when the distance (depth) of the condensing point X from the fluorescent body surface exceeds 160 μm, the emission luminance decreases below 1.00 (W/sr/m$^3$). Therefore, when the absorption coefficient of the transmissive fluorescent body 13 is 80, a light source with high luminance can be obtained if the distance of the condensing point X is 160 μm or less.

Next, when the absorption coefficient of the transmissive fluorescent body 13 is 160, the emission luminance is larger than 1.00 (W/sr/m$^3$) in a range, of the distance (depth) of the condensing point X from the fluorescent body surface, from 0 μm to 80 μm, as shown in the graph in FIG. 31. On the other hand, when the distance (depth) of the condensing point X from the fluorescent body surface exceeds 80 μm, the emission luminance decreases below 1.00 (W/sr/m$^3$). Therefore, when the absorption coefficient of the transmissive fluorescent body 13 is 160, a light source with high luminance can be obtained if the distance of the condensing point X is 80 μm or less.

As described above, it is preferable that the distance (depth) of the condensing point X from the fluorescent body surface is 500 μm or less in order to obtain a light source with high luminance. Also, when the absorption coefficient is 80, it is preferable that the distance (depth) of the condensing point X from the fluorescent body surface is 160 μm or less in order to obtain a light source with high luminance, as a more preferable range.

Note that the graph shown in FIG. 31 is derived from the equation of the following Formula 1.

$$L_{(x)} = \int_0^t \frac{A \times \alpha \times I_{LD} \times e^{-\alpha x'}}{4\pi \times S_{(x'-x)}} dx'$$    Formula 1

Figure 32:
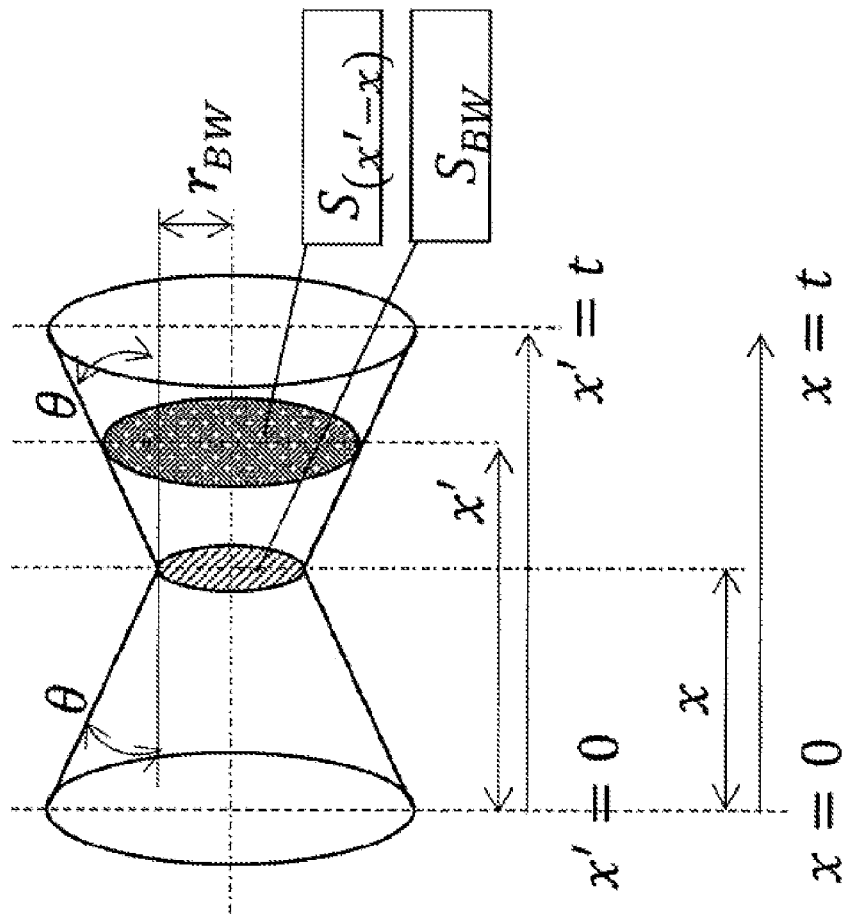
FIG. 32 is a diagram illustrating an equation according to which the graph in FIG. 31 has been drawn.

$L_{(x)}$: emission luminance per unit area [W/m$^2$-sr]
$\alpha$: absorption coefficient of fluorescent body [m$^{-1}$]
A: conversion efficiency [W/W]
$I_{LD}$: LD power [W]
$S_{(x'-x)}$: cross-sectional area [m$^2$]
t: fluorescent body thickness
x: distance from surface to condensing point [m]
x': distance from surface to measurement position
$r_{BW}$: radius at condensing position That is, the equation of Formula 1 is an expression that shows the emission luminance $L_{(x)}$ per unit area as a function of the conversion efficiency A, the absorption coefficient $\alpha$ of the transmissive fluorescent body 13, the LD power $I_{LD}$, the cross-sectional area $S_{(x'-x)}$, the thickness t of the transmissive fluorescent body 13, the distance x from the surface to the condensing point X inside the transmissive fluorescent body 13, the distance x' from the surface to the measurement position, and the laser radius $r_{BW}$ at the condensing position, as shown in FIG. 32. Note that, in the equation of Formula 1, the cross-sectional area $S_{(x'-x)}$ is represented by the following expression of Formula 2.

$$S_{(x'-x)} = (r_{BW} + |x'-x| \times \tan\theta)^2 \times \pi$$    Formula 2

Here, the cross-sectional area is approximated to be widening from the condensing position at a laser NA (0.06). Also, there is a finite area $S_{BW}$ at the condensing position, and the radius of the area is denoted by $r_{BW}$. In an optical system, the beam radius cannot be reduced below the diffraction limit, and therefore the effective area is handled as a variable.

Note that the absorption coefficient $\alpha$ of the transmissive fluorescent body 13 is expressed using the expression of Formula 3 below.

That is, when the intensity of light before entering the transmissive fluorescent body 13 is assumed to be $I_0$, the intensity I of light after entering the transmissive fluorescent body 13 can be expressed by the following equation using the absorption coefficient $\alpha$ from the Lambert-Beer law.

$$I = I_0 e^{-\alpha x}$$    Formula 3

Here, x is the distance of the medium.
The range of I with which a light source with high luminance can be obtained is $0.2 \leq I \leq 1$.

Embodiment 2

Figure 5:
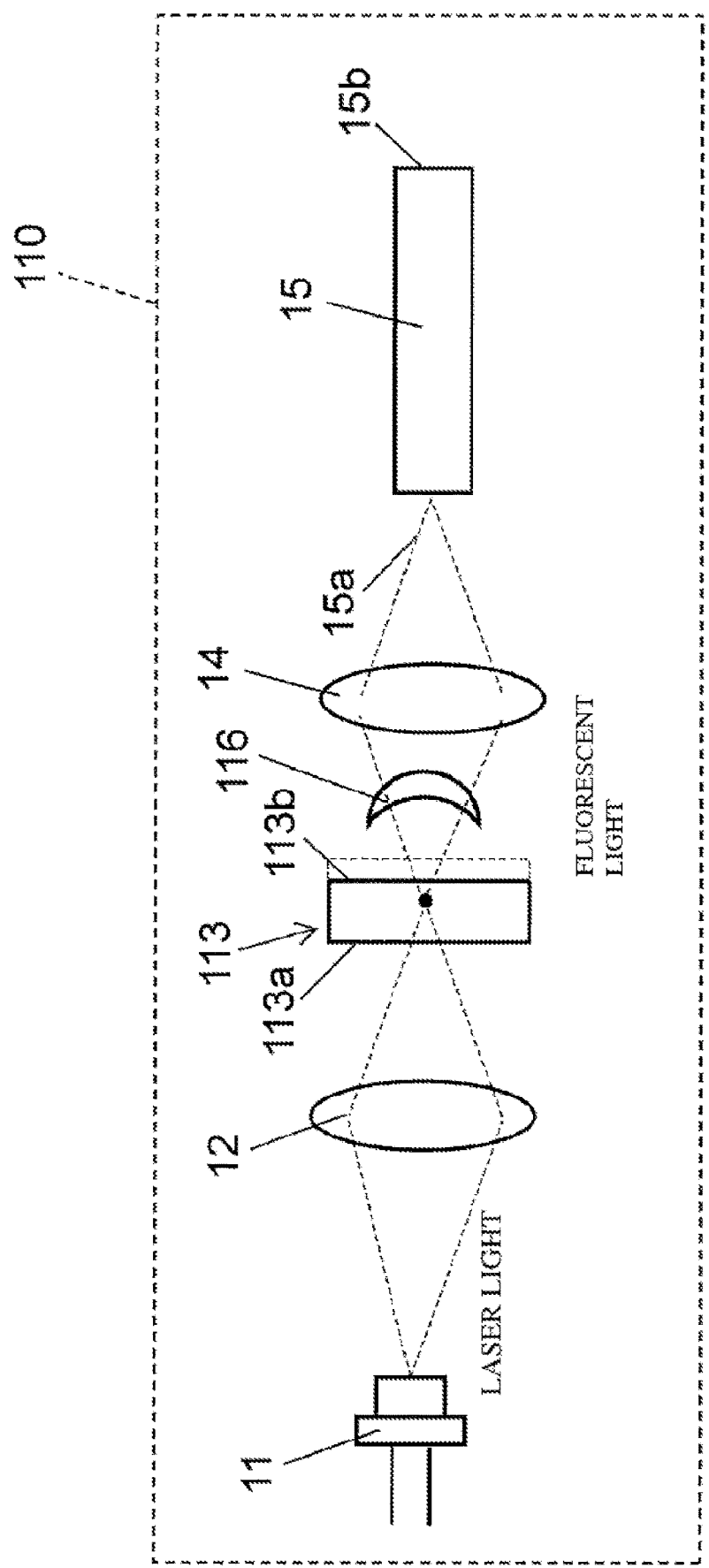
FIG. 5 is a schematic diagram illustrating a configuration of a light source device according to Embodiment 2 of the present invention.
Figure 6:
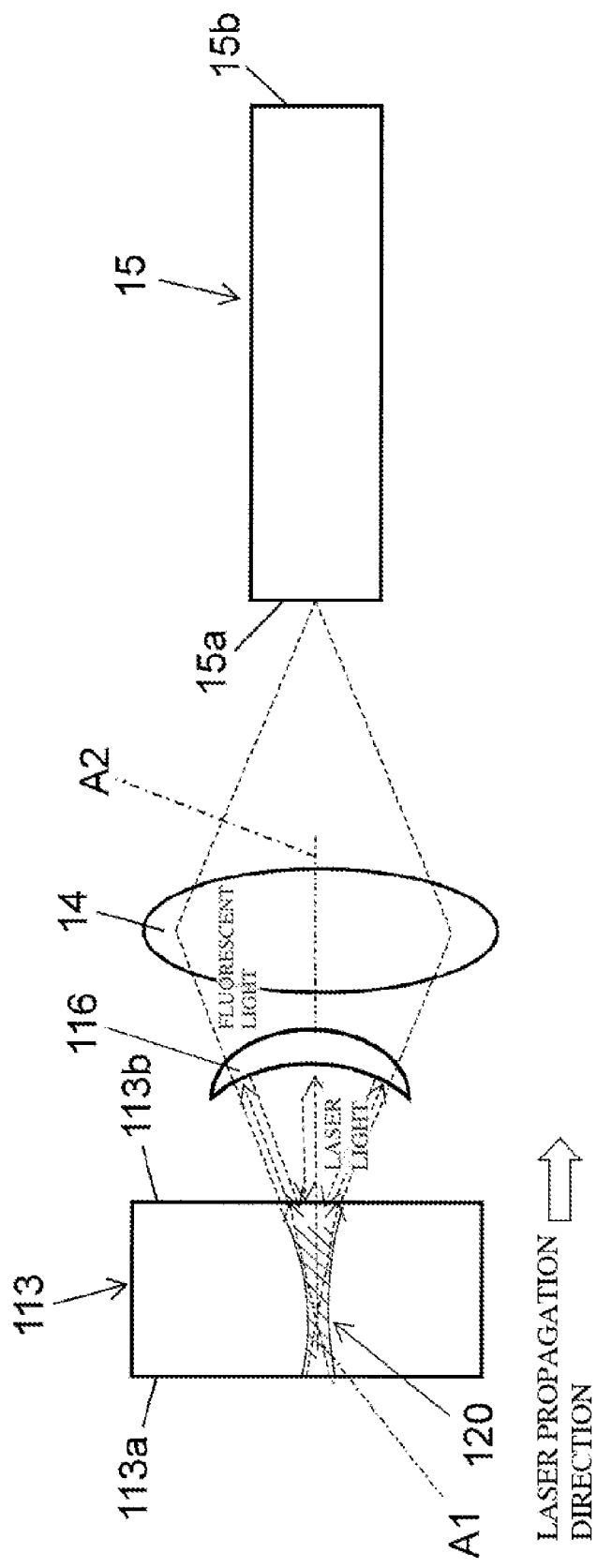
FIG. 6 is a schematic diagram in which main parts of the light source device in FIG. 5 are enlarged.
Figure 7:
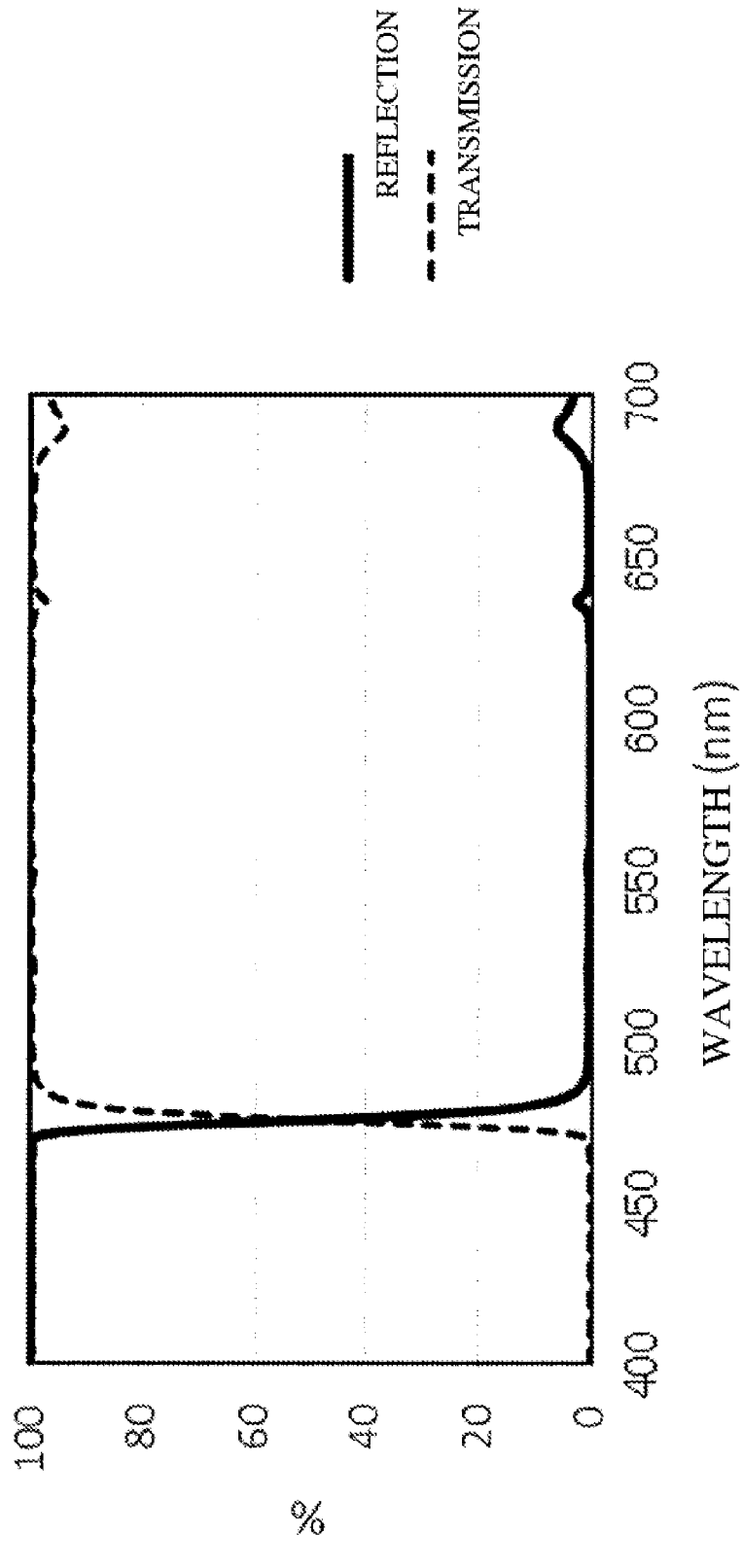
FIG. 7 is a graph showing wavelength characteristics of a concave mirror (dichroic mirror) included in the light source device in FIG. 5.

The following is a description of a light source device according to Embodiment 2 of the present invention using FIGS. 5 to 7.

A light source device 110 according to the present embodiment differs from that of Embodiment 1 described above in that a concave mirror 116 is provided between a transmissive fluorescent body 113 and an intake lens 14, as shown in FIG. 5.

Note that the other constituent elements of the light source device 110 are similar to those of the light source device 10 of Embodiment 1 described above, and thus the same reference numerals are given to these constituent elements and a detailed description thereof is omitted. The light source device 110 of the present embodiment includes a light source unit 11, a condensing lens 12, the transmissive fluorescent body 113, the concave mirror 116, the intake lens 14, and an optical fiber 15, as shown in FIG. 5.

The transmissive fluorescent body 113 is a YAG single crystal fluorescent body doped with Ce ions, and has a plate-like shape, for example. The concave mirror 116 is arranged between the transmissive fluorescent body 113 and the intake lens 14, and has a concave reflection surface on an incident face on the transmissive fluorescent body 113 side. Also, the concave mirror 116 has a property of allowing fluorescent light excited in the transmissive fluorescent body 113 to pass through and reflecting laser light that has passed through the transmissive fluorescent body 113.

Accordingly, that part of the fluorescent light emitted in every direction from a fluorescent light source unit 120 formed inside the transmissive fluorescent body 113, that is emitted toward the intake lens 14 can be taken in by the intake lens 14 without being blocked by the concave mirror 116.

Furthermore, the laser light that has passed through the transmissive fluorescent body 113 without being absorbed thereby can be caused to return toward the transmissive fluorescent body 113 by being reflected by the concave mirror 116, as shown in FIG. 6.

As a result, fluorescent light can be excited in the transmissive fluorescent body 113 by taking in a larger amount of exciting light than that of the laser light with which the transmissive fluorescent body 113 is irradiated in Embodiment 1, and therefore a light source with higher luminance than known light sources can be obtained.

Also, the amount of laser light that passed through the transmissive fluorescent body 13 and has been reflected by the concave mirror 116 and with which the transmissive fluorescent body 13 is to be again irradiated can be increased by reducing the thickness of the transmissive fluorescent body 113 relative to the transmissive fluorescent body 13 in Embodiment 1, and as a result, a light source with even higher luminance can be obtained.

Moreover, the concave mirror 116 is arranged such that the central axis A1 of the fluorescent light source unit 120 passes through the center of the concave surface, as shown in FIG. 6. With this, the reflected laser light can be again condensed at a portion (fluorescent light source unit 120) from which fluorescent light has been emitted.

As a result, fluorescent light can be excited in the transmissive fluorescent body 113 by taking in a larger amount of exciting light than that of the laser light with which the transmissive fluorescent body 113 is irradiated in Embodiment 1, and therefore a light source with higher luminance than known light sources can be obtained.

Also, it is preferable that the concave mirror 116 has a spherical surface or an aspherical surface with the center being at the condensing point X of laser light that has been condensed inside the transmissive fluorescent body 113 by the condensing lens 12.

With this, the reflected laser light can again be condensed at the portion (fluorescent light source unit 120) that has emitted fluorescent light. As a result, the intake lens 14 can take in a greater amount of fluorescent light than that of the fluorescent light taken in in Embodiment 1, and cause the fluorescent light to condense on the first face 15a of the optical fiber 15, and therefore a light source with higher and effectively increased luminance can be obtained.

Note that a dichroic mirror, a meniscus lens having a concave surface on which a reflection film that reflects laser light is vapor-deposited, a holed mirror that has an opening through which fluorescent light passes and reflects laser light by a concave surface, or the like can be used as the concave mirror 116.

For example, when the dichroic mirror is used as the concave mirror 116, laser light can be caused to be reflected while fluorescent light is allowed to pass through by reflecting light having a wavelength of about 480 nm or less (laser light), and allowing light having a wavelength that is longer than about 480 nm (fluorescent light) to pass through, as shown in FIG. 7.

Embodiment 3

Figure 8:
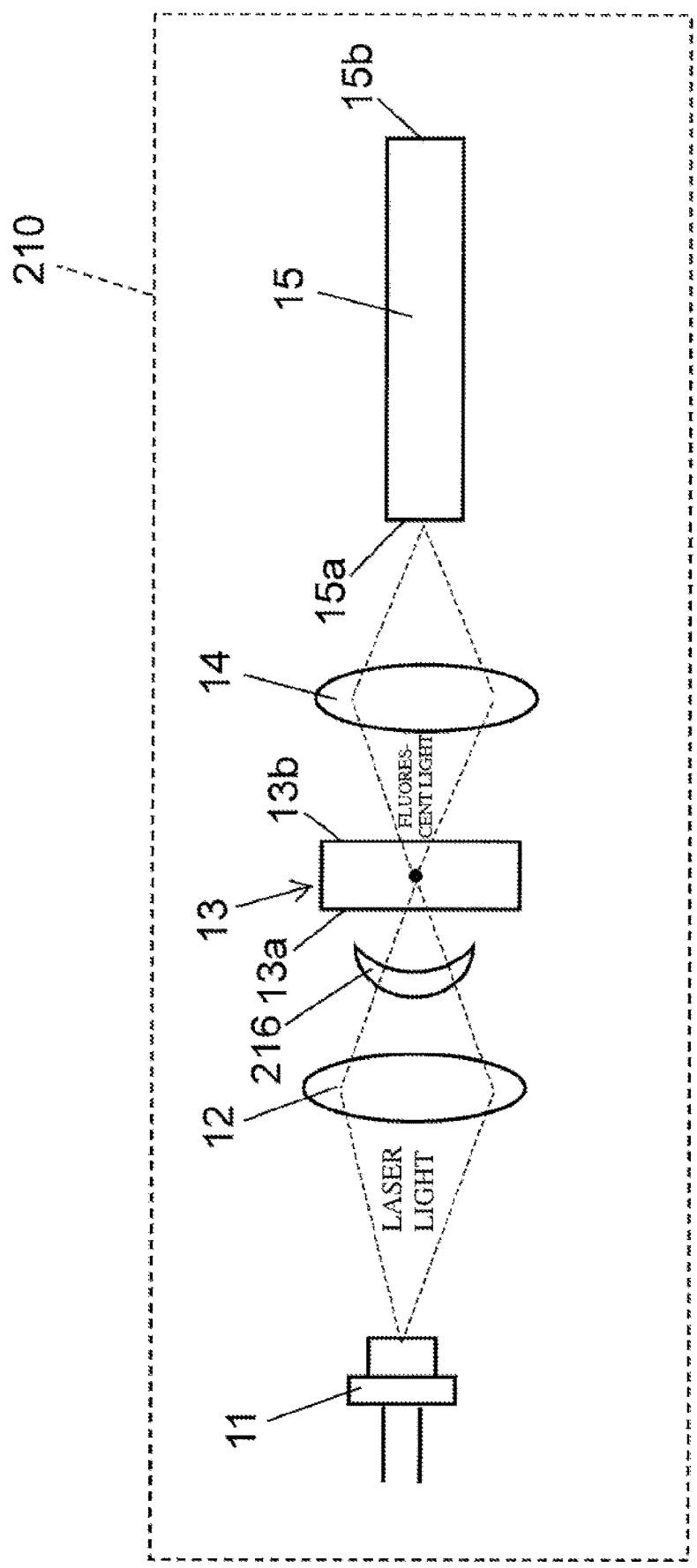
FIG. 8 is a schematic diagram illustrating a configuration of a light source device according to Embodiment 3 of the present invention.
Figure 9:
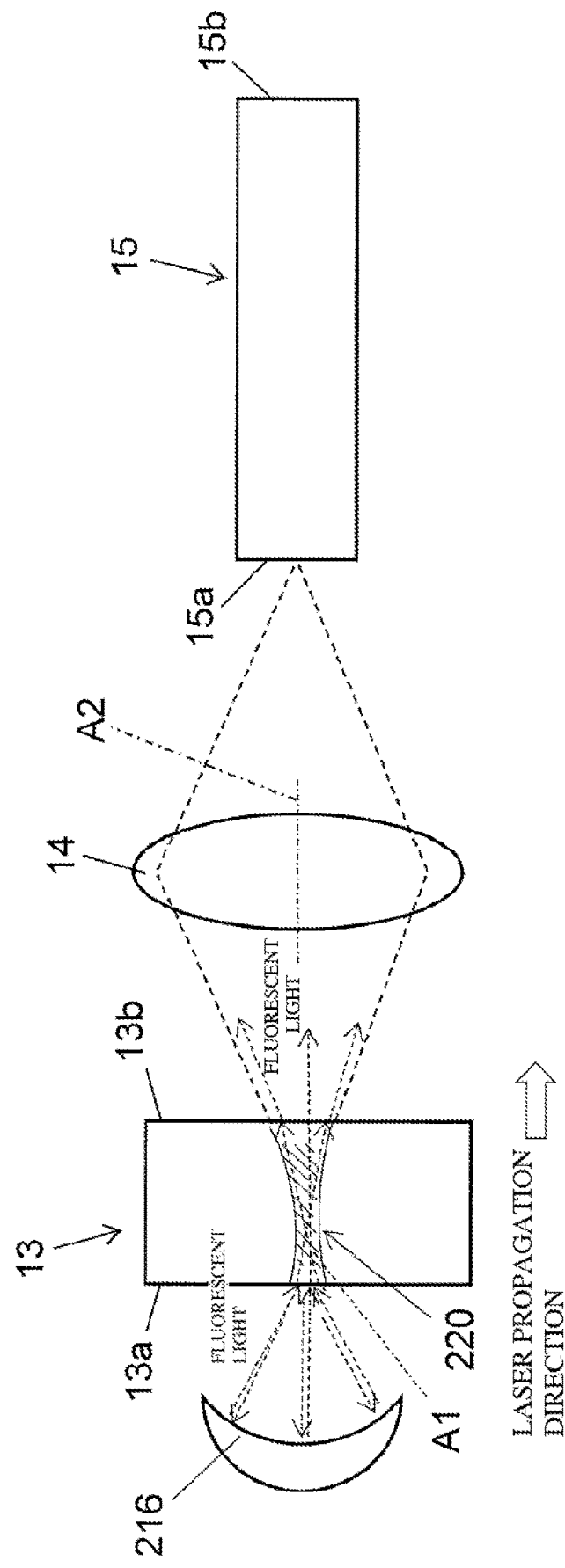
FIG. 9 is a schematic diagram in which main parts of the light source device in FIG. 8 are enlarged.
Figure 10:
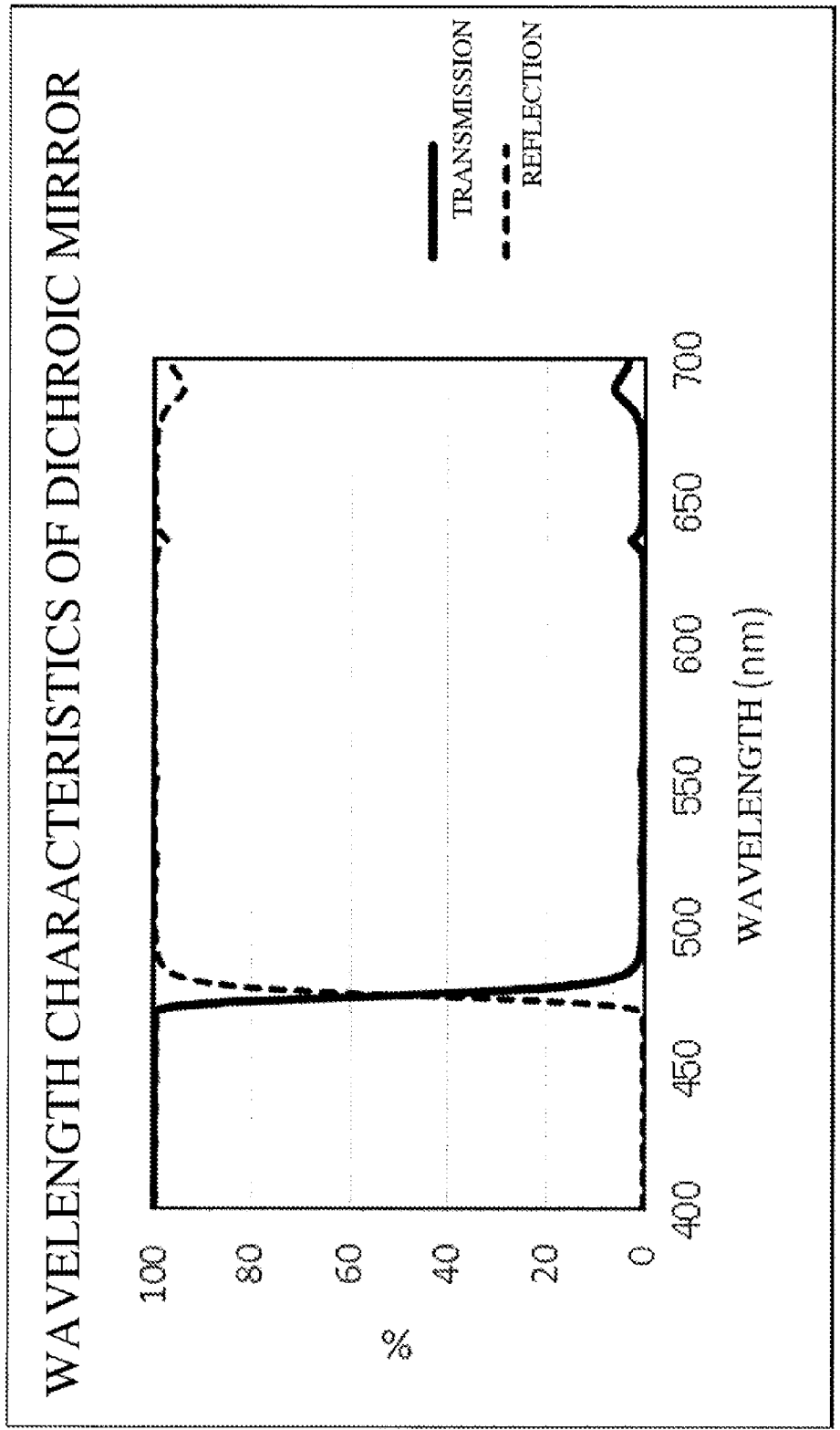
FIG. 10 is a graph showing wavelength characteristics of a concave mirror (dichroic mirror) included in the light source device in FIG. 8.

The following is a description of a light source device according to Embodiment 3 of the present invention using FIGS. 8 to 10.

A light source device 210 according to the present embodiment differs from that of Embodiment 1 described above in that a concave mirror 216 is provided between a condensing lens 12 and a transmissive fluorescent body 13, as shown in FIG. 8. Note that the other constituent elements of the light source device 210 are similar to those of the light source device 10 of Embodiment 1 described above, and thus the same reference numerals are given to these constituent elements and a detailed description thereof is omitted.

The light source device 210 of the present embodiment includes a light source unit 11, the condensing lens 12, the concave mirror 216, the transmissive fluorescent body 13, an intake lens 14, and an optical fiber 15, as shown in FIG. 8.

The concave mirror 216 is arranged between the condensing lens 12 and the transmissive fluorescent body 13, and has a concave reflection surface on the transmissive fluorescent body 13 side. Also, the concave mirror 216 has a property of allowing laser light that has been condensed by the condensing lens 12 to pass through and reflecting fluorescent light emitted inside the transmissive fluorescent body 13.

Accordingly, the transmissive fluorescent body 13 can be irradiated with the laser light that was emitted from the light source unit 11 and has been condensed by the condensing lens 12, without being blocked by the concave mirror 216. Furthermore, that part of the fluorescent light emitted in every direction from a fluorescent light source unit 220 formed inside the transmissive fluorescent body 13, that is emitted toward the condensing lens 12 can be caused to return toward the transmissive fluorescent body 13 by being reflected by the concave mirror 216, as shown in FIG. 9.

As a result, the intake lens 14 can take in a larger amount of fluorescent light than that of the fluorescent light taken in in Embodiment 1, and cause the fluorescent light to condense on a first face 15a of the optical fiber 15, and therefore a light source with higher luminance than known light sources can be obtained.

Furthermore, the concave mirror 216 is arranged such that the central axis A1 of the fluorescent light source unit 220 passes through the center of the concave surface. With this, the reflected fluorescent light can be condensed at a portion that has emitted fluorescent light (fluorescent light source unit 220).

As a result, the intake lens 14 can take in a greater amount of fluorescent light than that of the fluorescent light taken in in Embodiment 1, and cause the fluorescent light to condense on the first face 15a of the optical fiber 15, and therefore a light source with higher and effectively increased luminance can be obtained.

Also, it is preferable that the concave mirror 216 has a spherical surface or an aspherical surface with the center being at the condensing point X of laser light that has been condensed inside the transmissive fluorescent body 13 by the condensing lens 12.

With this, the reflected fluorescent light can be condensed at the portion (fluorescent light source unit 220) that has emitted fluorescent light. As a result, the intake lens 14 can take in a greater amount of fluorescent light than that of the fluorescent light taken in in Embodiment 1, and cause the fluorescent light to condense on the first face 15a of the optical fiber 15, and therefore a light source with higher and effectively increased luminance can be obtained.

Note that a dichroic mirror, a meniscus lens having a concave surface on which a reflection film that reflects fluorescent light is vapor-deposited, a holed mirror that has an opening through which laser light passes and reflects fluorescent light by a concave surface, or the like can be used as the concave mirror 216.

For example, when a dichroic mirror is used as the concave mirror 216, laser light can be allowed to pass through while fluorescent light being caused to be reflected by allowing light having a wavelength of about 480 nm or less (laser light) to pass through, and reflecting light having a wavelength that is longer than about 480 nm (fluorescent light), as shown in FIG. 10.

Embodiment 4

Figure 11:
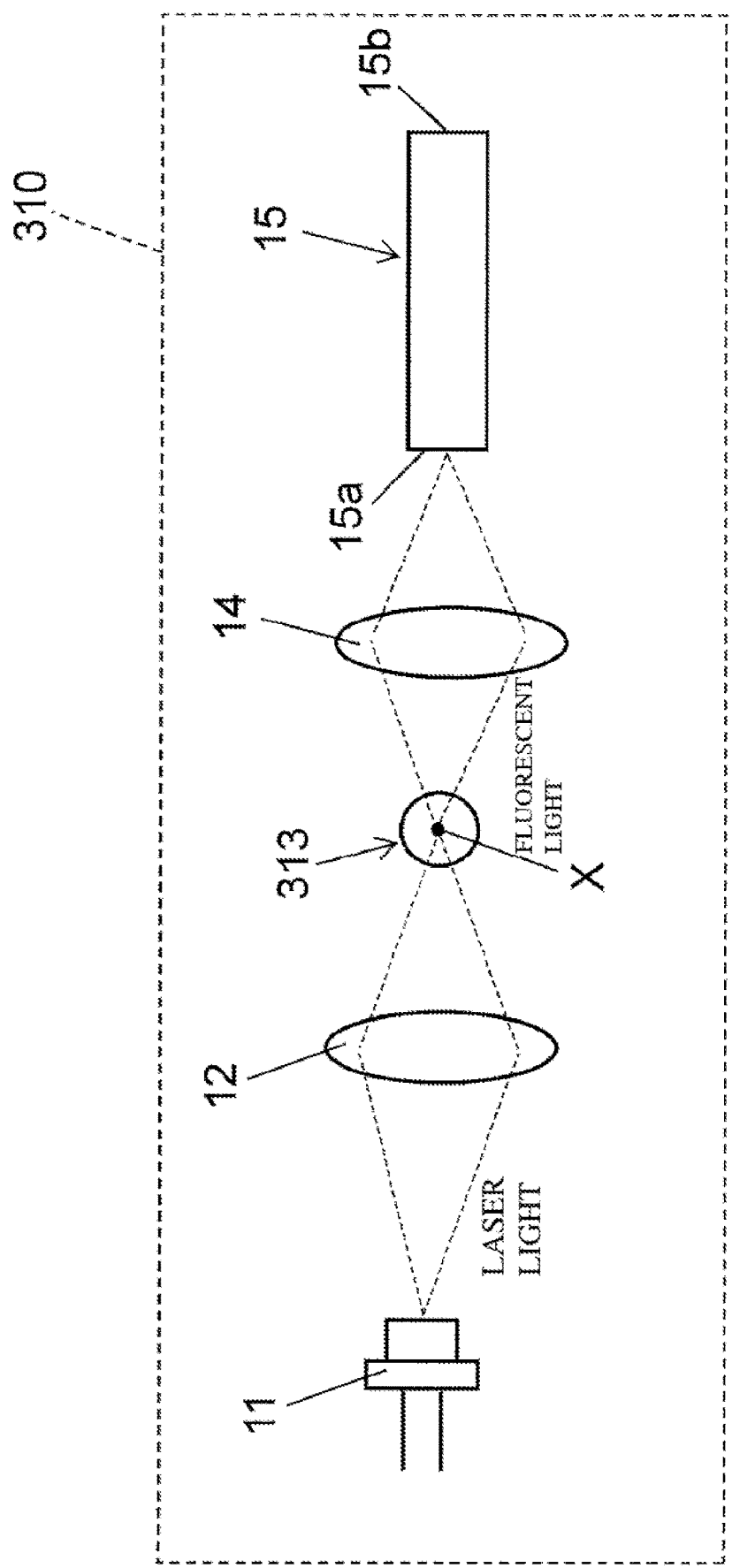
FIG. 11 is a schematic diagram illustrating a configuration of a light source device according to Embodiment 4 of the present invention.

The following is a description of a light source device according to Embodiment 4 of the present invention using FIGS. 11 and 12.

A light source device 310 according to the present embodiment differs from that of Embodiment 1 described above in that a spherical transmissive fluorescent body 313 is provided in place of the plate-shaped transmissive fluorescent body 13, as shown in FIG. 11.

Note that the other constituent elements of the light source device 310 are similar to those of the light source device 10 of Embodiment 1 described above, and thus the same reference numerals are given to these constituent elements and a detailed description thereof is omitted. The light source device 310 of the present embodiment includes a light source unit 11, a condensing lens 12, the transmissive fluorescent body 313, an intake lens 14, and an optical fiber 15, as shown in FIG. 11.

The transmissive fluorescent body 313 is a YAG single crystal fluorescent body doped with Ce ions, and has a spherical shape, for example. Also, as a result of a condensing point X at which laser light is condensed by the condensing lens 12 being provided at the center thereof, the transmissive fluorescent body 313 emits fluorescent light in every direction, the condensing point X being the center.

Figures 12A, 12B:
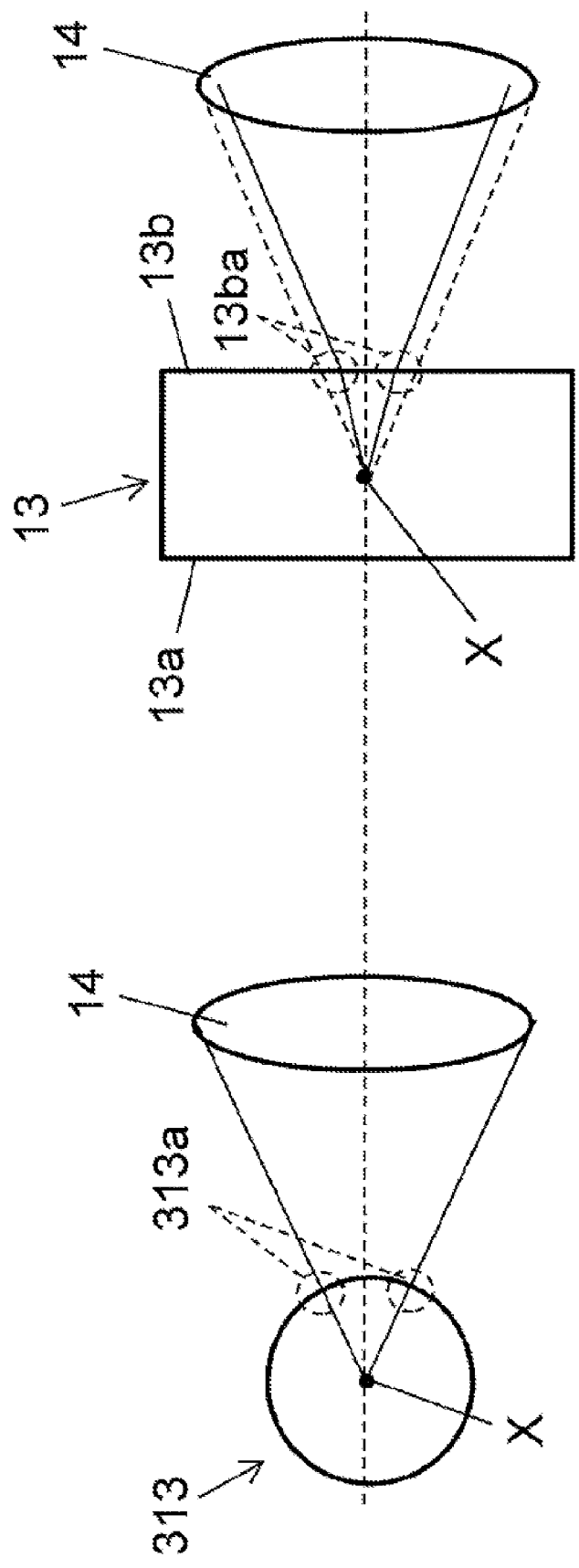
FIG. 12A is a schematic diagram illustrating refraction of light in a transmissive fluorescent body included in the light source device in FIG. 11.
FIG. 12B is a schematic diagram illustrating refraction of light in a transmissive fluorescent body included in the light source device in FIG. 2 as a comparative example.

Also, the fluorescent light emitted inside the spherical transmissive fluorescent body 313 is taken in by the intake lens 14 while scarcely being refracted at the interface (emitting portion 313*a*) between the transmissive fluorescent body 313 and air, as shown in FIG. 12A.

On the other hand, the fluorescent light emitted inside the plate-shaped transmissive fluorescent body 13 described in Embodiment 1 and the like is taken in by the intake lens 14, while the fluorescent light is refracted at the interface between the transmissive fluorescent body 13 and air (emitting portion 13*ba*) and spreads in a wide angle, as shown in FIG. 12B.

Therefore, as a result of using the spherical transmissive fluorescent body 313 in place of the plate-shaped transmissive fluorescent body 13, the fluorescent light emitted inside the transmissive fluorescent body 313 can be guided to the intake lens 14 while being scarcely refracted.

As a result, because the coupling efficiency of the fluorescent light in the intake lens 14 improves, higher luminance light can be condensed on a first face 15*a* of the optical fiber 15. Also, in the present embodiment, laser light is emitted and condensed such that the condensing point X is formed at the center of the spherical transmissive fluorescent body 313.

With this, the fluorescent light emitted toward every direction with the condensing point X at the center of the sphere enters the air at positions at the same distance from the condensing point X regardless of the position on the surface of the sphere from which the fluorescent light is taken out. As a result, fluorescent light with substantially the same luminance can be taken out from the spherical transmissive fluorescent body 313 regardless of the direction.

Embodiment 5

Figure 13:
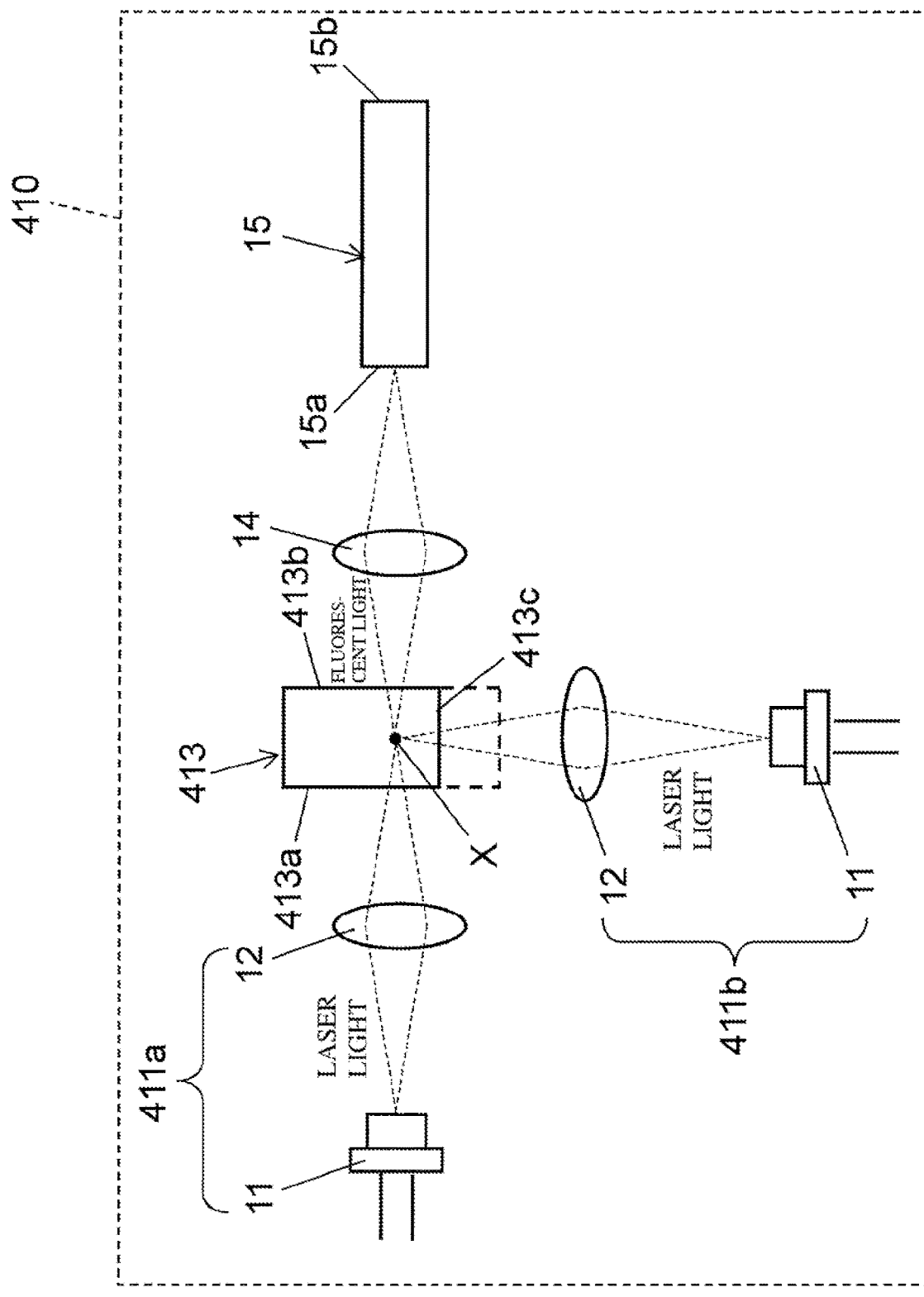
FIG. 13 is a schematic diagram illustrating a configuration of a light source device according to Embodiment 5 of the present invention.
Figure 14:
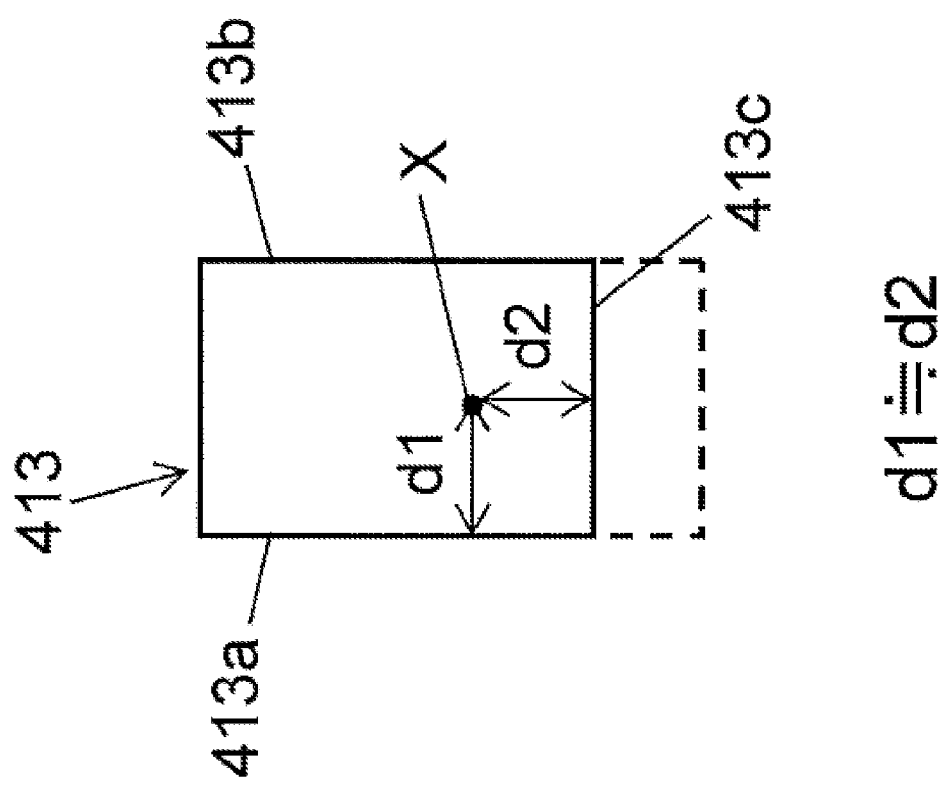
FIG. 14 is a schematic diagram illustrating a condensing point formed in a transmissive fluorescent body included in the light source device in FIG. 13.

The following is a description of a light source device 410 according to Embodiment 5 of the present invention using FIGS. 13 and 14.

The light source device 410 according to the present embodiment differs from that of Embodiment 1 described above in that two laser condensing systems 411*a* and 411*b* each including a light source unit 11 and a condensing lens 12 are provided in order to irradiate a transmissive fluorescent body 413 having a rectangular parallelepiped (polyhedron) shape with laser light from two directions that are orthogonal to each other, as shown in FIG. 13.

Note that the other constituent elements of the light source device 410 are similar to those of the light source device 10 of Embodiment 1 described above, and thus the same reference numerals are given to these constituent elements and a detailed description thereof is omitted. The light source device 410 of the present embodiment includes the laser condensing system 411*a* including a light source unit 11 and a condensing lens 12, the laser condensing system 411*b* including a light source unit 11 and a condensing lens 12, a transmissive fluorescent body 413, an intake lens 14, and an optical fiber 15, as shown in FIG. 13.

The laser condensing system 411*a* is arranged such that the central lens axis of the condensing lens 12 matches the central lens axis of the intake lens 14 that takes in fluorescent light. That is, laser light emitted from the laser condensing system 411*a* is condensed in the transmissive fluorescent body 413 via the condensing lens 12, and causes fluorescent light to be emitted from a portion whose center is the condensing point X. Also, the fluorescent light emitted from the transmissive fluorescent body 413 is condensed by the intake lens 14 that is arranged on the same straight line as the laser condensing system 411*a*, and a first face 15*a* of the optical fiber 15 is irradiated with the condensed fluorescent light.

The laser condensing system 411*b* is arranged such that the central lens axis of the condensing lens 12 extends along a direction that is substantially orthogonal to (intersects) the central lens axis of the intake lens 14 that takes in fluorescent light. That is, laser light emitted from the laser condensing system 411*b* is condensed in the transmissive fluorescent body 413 via the condensing lens 12, and causes fluorescent light to be emitted from a portion whose center is the condensing point X.

Here, the configuration is such that the condensing point X of the laser light condensed by the condensing lens 12 of the laser condensing system 411*b* is the same as that of the laser light condensed by the condensing lens 12 of the laser condensing system 411*a*.

Also, fluorescent light is emitted from the transmissive fluorescent body 413 toward every direction, and therefore a portion of the fluorescent light is condensed by the intake lens 14 that is arranged along a direction orthogonal to the laser condensing system 411*b*, and the first face 15*a* of the optical fiber 15 is irradiated with the condensed fluorescent light.

Also, the laser condensing systems 411*a* and 411*b* are arranged on a circumference of a circle centered on the condensing point X that is formed inside the transmissive fluorescent body 413, as shown in FIG. 13. With this, the transmissive fluorescent body 413 is irradiated with laser light from the plurality of laser condensing systems 411*a* and 411*b* that are arranged at the same distance.

The transmissive fluorescent body 413 is a YAG single crystal fluorescent body doped with Ce ions, for example, and has a rectangular parallelepiped (hexahedron) shape including an incident face 413*a*, an emitting face 413*b*, and an incident face 413*c*, as shown in FIGS. 13 and 14.

The incident face 413*a* is a face that opposes the emitting face 413*b*, which is on the intake lens 14 side, and through which laser light emitted from the laser condensing system 411*a* enters. The emitting face 413*b* is a face on the intake lens 14 side, and from which that part of the fluorescent light emitted toward every direction due to being excited by laser light emitted from the laser condensing systems 411*a* and 411*b*, that is emitted toward the intake lens 14 exits.

The incident face 413*c* is a face that is perpendicular to the incident face 413*a* and the emitting face 413*b*, and through which laser light emitted from the laser condensing system 411b enters. In the light source device 410 of the present embodiment, the laser light rays emitted from the two laser condensing systems 411a and 411b are condensed at the common condensing point X formed inside the transmissive fluorescent body 413, as shown in FIG. 13.

With this, the amount of laser light at the condensing point X is substantially doubled compared with the configuration in which one laser condensing system is included, and as a result, the amount of excited fluorescent light is substantially doubled, and a light source having even higher luminance can be obtained.

Also, in the present embodiment, the condensing point X of laser light emitted by the two laser condensing systems 411a and 411b is formed, inside the transmissive fluorescent body 413, such that a distance d1 from the incident face 413a and a distance d2 from the incident face 413c are substantially the same, as shown in FIG. 14.

In this way, as a result of arranging the condensing point X of laser light emitted from the two laser condensing systems 411a and 411b such that the distances d1 and d2 from the respective incident faces 413a and 413c are substantially the same, the luminance of fluorescent light at the condensing point X can further be increased.

Note that, in the present embodiment, a configuration in which two laser condensing systems are provided has been described, but the present invention is not limited thereto, and the configuration may be such that three or more laser condensing systems are provided around a rectangular parallelepiped transmissive fluorescent body.

Embodiment 6

Figure 15:
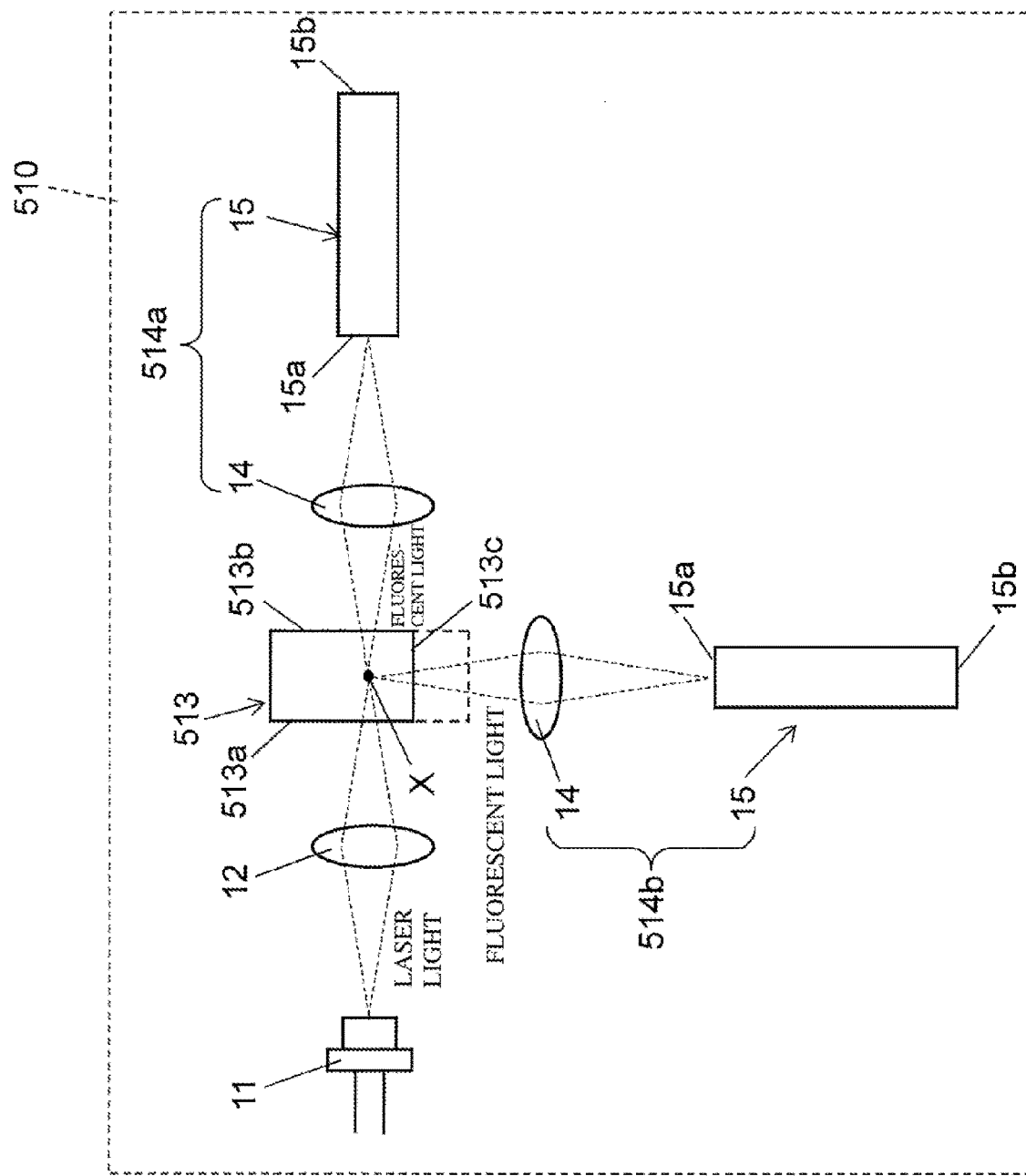
FIG. 15 is a schematic diagram illustrating a configuration of a light source device according to Embodiment 6 of the present invention.
Figure 16:
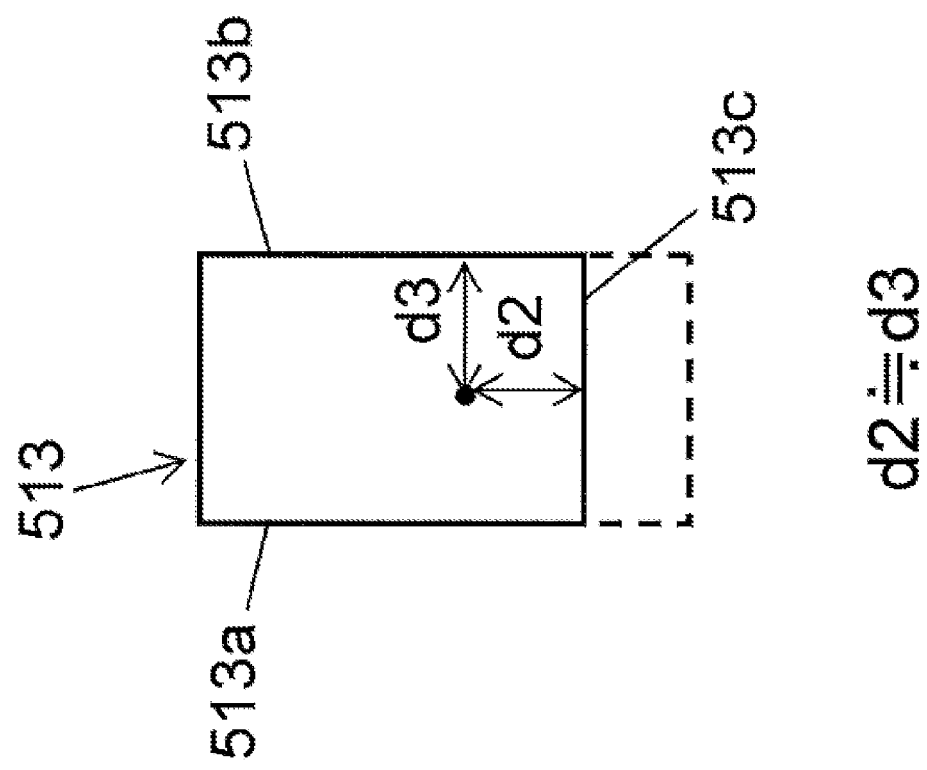
FIG. 16 is a schematic diagram illustrating a condensing point formed in a transmissive fluorescent body included in the light source device in FIG. 15.

The following is a description of a light source device 510 according to Embodiment 6 of the present invention using FIGS. 15 and 16.

The light source device 510 according to the present embodiment differs from that of Embodiment 1 described above in that two fluorescent light intake systems 514a and 514b are provided with respect to a transmissive fluorescent body 513 having a rectangular parallelepiped (polyhedron) shape such that fluorescent light is taken in from two directions that are orthogonal to each other, as shown in FIG. 15.

Note that the other constituent elements of the light source device 510 are similar to those of the light source device 10 of Embodiment 1 described above, and thus the same reference numerals are given to these constituent elements and a detailed description thereof is omitted. The light source device 510 of the present embodiment includes a light source unit 11, a condensing lens 12, the transmissive fluorescent body 513, the fluorescent light intake system 514a including an intake lens 14 and an optical fiber 15, and the fluorescent light intake system 514b including an intake lens 14 and an optical fiber 15, as shown in FIG. 15.

The fluorescent light intake system 514a is arranged such that the central lens axis of the intake lens 14 matches the central lens axis of the condensing lens 12 that condenses laser light. That is, in the fluorescent light intake system 514a, the fluorescent light generated due to the transmissive fluorescent body 513 being excited by laser light that was emitted from the single light source unit 11 and has been condensed by the condensing lens 12 is condensed by the intake lens 14 that is arranged on the same straight line as the condensing lens 12, and a first face 15a of the optical fiber 15 is irradiated with the condensed fluorescent light.

The fluorescent light intake system 514b is arranged such that the central lens axis of the intake lens 14 is substantially orthogonal to (intersects) the central lens axis of the condensing lens 12 and the central lens axis of the intake lens 14 of the fluorescent light intake system 514a.

That is, laser light emitted from the light source unit 11 is condensed in the transmissive fluorescent body 513 via the condensing lens 12, and causes fluorescent light to be emitted from a portion whose center is the condensing point X. Here, the fluorescent light generated inside the transmissive fluorescent body 513 is emitted toward every direction. The generated fluorescent light rays are emitted from the emitting faces 513b and 513c that are arranged at substantially the same distance from the condensing point X of the laser light in the direction toward the respective fluorescent light intake systems 514a and 514b.

Also, in each of the fluorescent light intake systems 514a and 514b, the fluorescent light emitted from the emitting face 513b or 513c is condensed by an intake lens 14, and a first face 15a of an optical fiber 15 is irradiated with the condensed fluorescent light.

Also, the fluorescent light intake systems 514a and 514b are arranged on a circumference of a circle centered on the condensing point X that is formed inside the transmissive fluorescent body 513, as shown in FIG. 15. With this, the transmissive fluorescent body 513 emits fluorescent light to the plurality of fluorescent light intake systems 514a and 514b that are arranged at the same distance.

The transmissive fluorescent body 513 is a YAG single crystal fluorescent body doped with Ce ions, for example, and has a rectangular parallelepiped (hexahedron) shape including an incident face 513a, an emitting face 513b, and an emitting face 513c, as shown in FIGS. 15 and 16.

The incident face 513a is a face that opposes the emitting face 513b, which is on the intake lens 14 side, and through which laser light emitted from the light source unit 11 enters via the condensing lens 12. The emitting face 513b is a face on the side of the intake lens 14 of the fluorescent light intake system 514a, and from which that part of the fluorescent light emitted toward every direction due to being excited by laser light emitted from the light source unit 11, that is emitted toward the fluorescent light intake system 514a exits.

The emitting face 513c is a face perpendicular to the incident face 513a and the emitting face 513b, and from which that part of the fluorescent light emitted toward every direction due to being excited by laser light emitted from the light source unit 11, that is emitted toward the fluorescent light intake system 514b exits.

In the light source device 510 of the present embodiment, as shown in FIG. 15, fluorescent light generated in the vicinity of the condensing point X of laser light that was emitted from the light source unit 11 and has been condensed by the condensing lens 12 is taken out in two directions toward which the fluorescent light intake systems 514a and 514b are arranged, which serve as light sources.

Accordingly, fluorescent light can be taken out from the single light source unit 11 by the two fluorescent light intake systems 514a and 514b, and therefore a plurality of fiber light sources can be provided. Also, in the present embodiment, the condensing point X of laser light emitted by the single light source unit 11 is formed, inside the transmissive fluorescent body 513, such that the distance d3 from the emitting face 513b and the distance d2 from the emitting face 513c are substantially the same, as shown in FIG. 16.

In this way, as a result of adopting a configuration in which fluorescent light rays to be taken out by the two fluorescent light intake systems 514a and 514b are emitted from the respective emitting faces 513b and 513c that are located at the substantially same distances from the condensing point X, two fiber light sources having substantially the same luminance can be obtained.

Note that, in the present embodiment, a configuration in which two fluorescent light intake systems are provided has been described, but the present invention is not limited thereto, and the configuration may also be such that three or more fluorescent light intake systems are provided around a rectangular parallelepiped transmissive fluorescent body.

Embodiment 7

Figure 17:
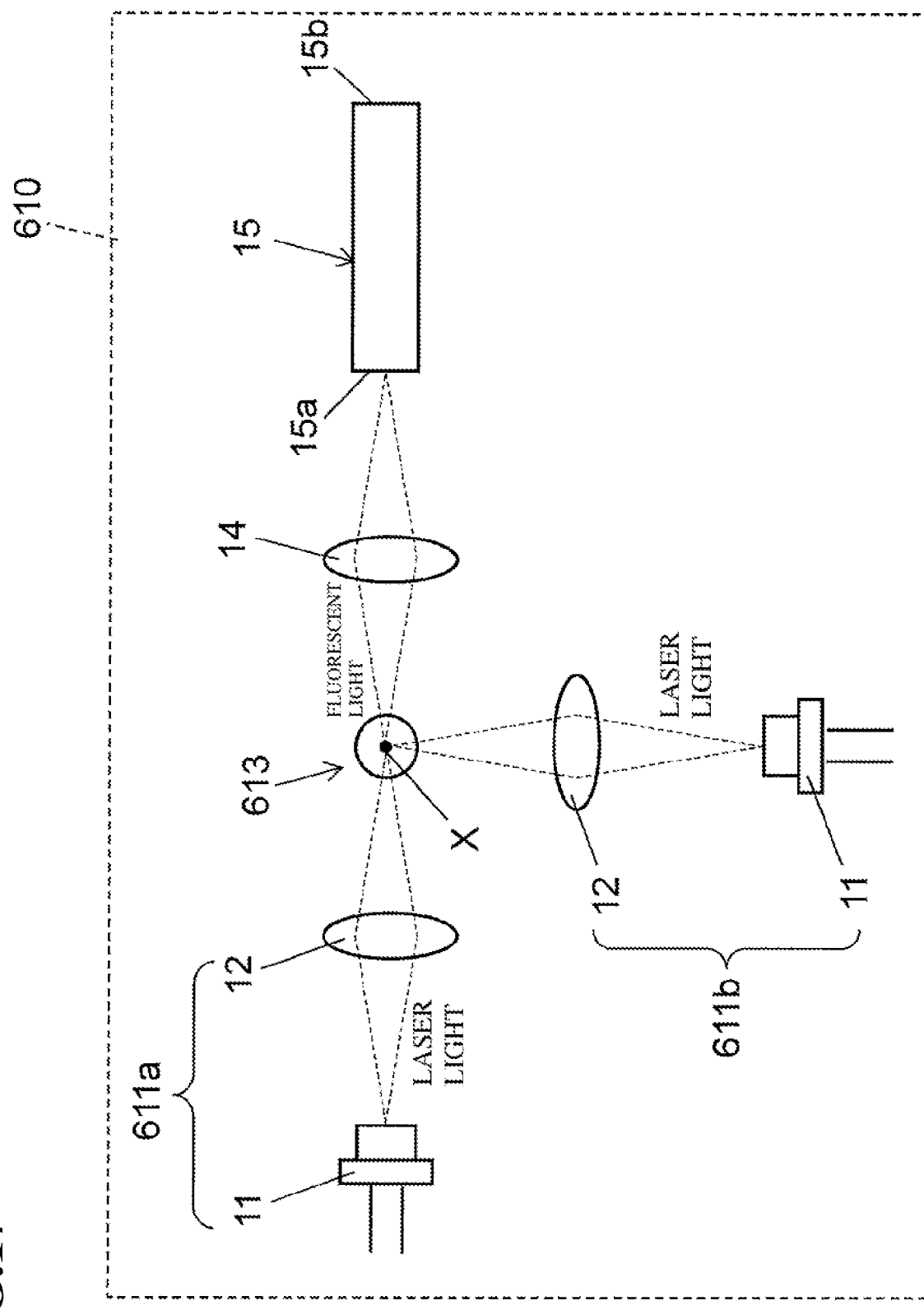
FIG. 17 is a schematic diagram illustrating a configuration of a light source device according to Embodiment 7 of the present invention.

The following is a description of a light source device 610 according to Embodiment 7 of the present invention using FIG. 17.

The light source device 610 according to the present embodiment differs from that of Embodiment 5 described above in that a spherical transmissive fluorescent body 613 is provided in place of the rectangular parallelepiped transmissive fluorescent body, as shown in FIG. 17.

Note that the other constituent elements of the light source device 610 are similar to those of the light source device 10 of Embodiment 1 described above, and thus the same reference numerals are given to these constituent elements and a detailed description thereof is omitted. The light source device 610 of the present embodiment includes a laser condensing system 611a including a light source unit 11 and a condensing lens 12, a laser condensing system 611b including a light source unit 11 and a condensing lens 12, a transmissive fluorescent body 613, an intake lens 14, and an optical fiber 15, as shown in FIG. 17.

The laser condensing system 611a is arranged such that the central lens axis of the condensing lens 12 matches the central lens axis of the intake lens 14 that takes in fluorescent light. That is, laser light emitted from the laser condensing system 611a is condensed at the center of the spherical transmissive fluorescent body 613 via the condensing lens 12, and causes fluorescent light to be emitted from a portion centered on the condensing point X. Also, the fluorescent light emitted from the transmissive fluorescent body 613 is condensed by the intake lens 14 that is arranged on the same straight line as the laser condensing system 611a, and a first face 15a of the optical fiber 15 is irradiated with the condensed fluorescent light.

The laser condensing system 611b is arranged such that the central lens axis of the condensing lens 12 extends along a direction that is substantially orthogonal to (intersects) the central lens axis of the intake lens 14 that takes in fluorescent light. That is, laser light emitted from the laser condensing system 611b is condensed at the center of the spherical transmissive fluorescent body 613 via the condensing lens 12, and causes fluorescent light to be emitted from a portion centered on the condensing point X.

Here, the laser light condensed by the condensing lens 12 of the laser condensing system 611b is emitted so as to be condensed at the central position (condensing point X) of the spherical transmissive fluorescent body 613, similarly to the laser light condensed by the condensing lens 12 of the laser condensing system 611a.

Also, fluorescent light generated in the transmissive fluorescent body 613 is emitted toward every direction, and therefore a portion of the fluorescent light is condensed by the intake lens 14 arranged along a direction orthogonal to the laser condensing system 611b, and a first face 15a of the optical fiber 15 is irradiated with the condensed fluorescent light.

Also, the laser condensing systems 611a and 611b are arranged on a spherical surface centered on the condensing point X that is formed inside the transmissive fluorescent body 613, as shown in FIG. 17. With this, the transmissive fluorescent body 613 is irradiated with laser light from the plurality of laser condensing systems 611a and 611b that are arranged at the same distance.

The transmissive fluorescent body 613 is a YAG single crystal fluorescent body doped with Ce ions, for example, and has a spherical shape. The condensing point X of laser light is formed at the center of the sphere. In the light source device 610 of the present embodiment, laser light rays emitted from the two laser condensing systems 611a and 611b are condensed at the common condensing point X formed at the center of the spherical transmissive fluorescent body 613, as shown in FIG. 17.

With this, the amount of laser light at the condensing point X is substantially doubled compared with the configuration in which one laser condensing system is included, and as a result, the amount of excited fluorescent light is substantially doubled, and a light source having even higher luminance can be obtained.

Also, in the present embodiment, since the spherical transmissive fluorescent body 613 is used, the distance of the condensing point X, inside of the transmissive fluorescent body 613, of laser light emitted from the two laser condensing systems 611a and 611b from any incident face is substantially the same.

In this way, as a result of arranging the condensing point X of laser light emitted from the two laser condensing systems 611a and 611b such that the distances from the respective incident faces are substantially the same, the luminance of fluorescent light at the condensing point X can further be increased.

Note that, in the present embodiment, a configuration in which two laser condensing systems are provided has been described, but the present invention is not limited thereto, and the configuration may also be such that three or more laser condensing systems are provided around a spherical transmissive fluorescent body.

Moreover, in the present embodiment, laser light is emitted and condensed such that the condensing point X is formed at the center of the spherical transmissive fluorescent body 613. With this, the fluorescent light emitted toward every direction with the condensing point X, which is at the center of the sphere, being the center enters the air at the same distance from the condensing point X regardless of the position on the surface of the sphere from which the fluorescent light is taken out. As a result, fluorescent light with substantially the same luminance can be taken out from the spherical transmissive fluorescent body 613 regardless of the direction.

Embodiment 8

Figure 18:
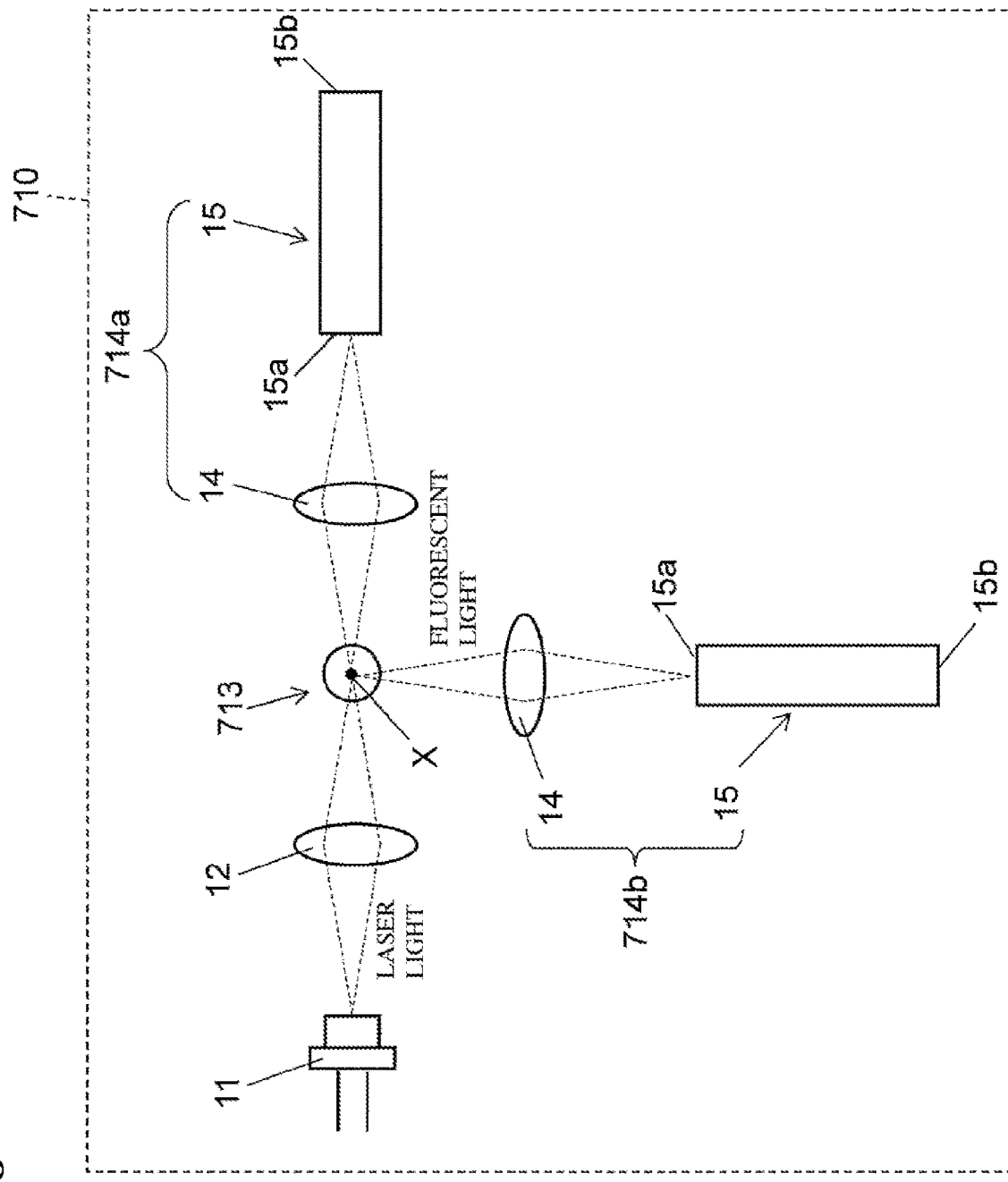
FIG. 18 is a schematic diagram illustrating a configuration of a light source device according to Embodiment 8 of the present invention.

The following is a description of a light source device 710 according to Embodiment 8 of the present invention using FIG. 18. The light source device 710 according to the present embodiment differs from that of Embodiment 6 described above in that a spherical transmissive fluorescent body 713 is provided in place of the rectangular parallelepiped transmissive fluorescent body, as shown in FIG. 18.

Note that the other constituent elements of the light source device 710 are similar to those of the light source device 10 of Embodiment 1 described above, and thus the same reference numerals are given to these constituent elements and a detailed description thereof is omitted. The light source device 710 of the present embodiment includes a light source unit 11, a condensing lens 12, a transmissive fluorescent body 713, the fluorescent light intake system 714a including an intake lens 14 and an optical fiber 15, and the fluorescent light intake system 714b including an intake lens 14 and an optical fiber 15, as shown in FIG. 18.

The transmissive fluorescent body 713 is a YAG single crystal fluorescent body doped with Ce ions, for example, and has a spherical shape. The fluorescent light intake systems 714a and 714b are arranged on a spherical surface centered on the spherical transmissive fluorescent body 713, as shown in FIG. 18.

With this, the transmissive fluorescent body 713 emits fluorescent light toward the plurality of fluorescent light intake systems 714a and 714b that are arranged at the same distance. The fluorescent light intake system 714a is arranged such that the central lens axis of the intake lens 14 matches the central lens axis of the condensing lens 12 that condenses laser light.

That is, in the fluorescent light intake system 714a, the fluorescent light generated due to the transmissive fluorescent body 713 being excited by laser light that was emitted from the single light source unit 11 and has been condensed by the condensing lens 12 is condensed by the intake lens 14 that is arranged on the same straight line as the condensing lens 12, and a first face 15a of the optical fiber 15 is irradiated with the condensed fluorescent light.

The fluorescent light intake system 714b is arranged such that the central lens axis of the intake lens 14 is substantially orthogonal to (intersects) the central lens axis of the condensing lens 12 and the central lens axis of the intake lens 14 of the fluorescent light intake system 714a.

That is, laser light emitted from the light source unit 11 is condensed in the spherical transmissive fluorescent body 713 via the condensing lens 12, and causes fluorescent light to be emitted from the center of the sphere (condensing point X). Here, the fluorescent light generated inside the spherical transmissive fluorescent body 713 is emitted toward every direction. The generated fluorescent light rays are emitted from the spherical emitting faces that are arranged at substantially the same distance from the condensing point X of the laser light in the direction toward the respective fluorescent light intake systems 714a and 714b.

Also, in each of the fluorescent light intake systems 714a and 714b, the fluorescent light emitted from the transmissive fluorescent body 713 is condensed by the intake lens 14, and a first face 15a of the optical fiber 15 is irradiated with the condensed fluorescent light.

In the light source device 710 of the present embodiment, as shown in FIG. 18, fluorescent light rays generated at the condensing point X of laser light that was emitted from the light source unit 11 and has been condensed by the condensing lens 12 are taken out in two directions toward the fluorescent light intake systems 714a and 714b, which serve as fiber light sources.

Accordingly, fluorescent light can be taken out from the single light source unit 11 by the two fluorescent light intake systems 714a and 714b, and therefore a plurality of fiber light sources with similar luminance can be provided.

Also, in the present embodiment, the condensing point X of laser light emitted by the single light source unit 11 is formed, inside the spherical transmissive fluorescent body 713, at the center of the sphere. With this, as a result of adopting a configuration in which fluorescent light rays to be taken out by the two fluorescent light intake systems 714a and 714b are emitted from the respective emitting faces that are located at the substantially same distances from the condensing point X, two fiber light sources having substantially the same luminance can be obtained.

Note that, in the present embodiment, a configuration in which two fluorescent light intake systems are provided has been described, but the present invention is not limited thereto, and the configuration may be such that three or more fluorescent light intake systems are provided around a spherical transmissive fluorescent body.

Embodiment 9

Figure 19:
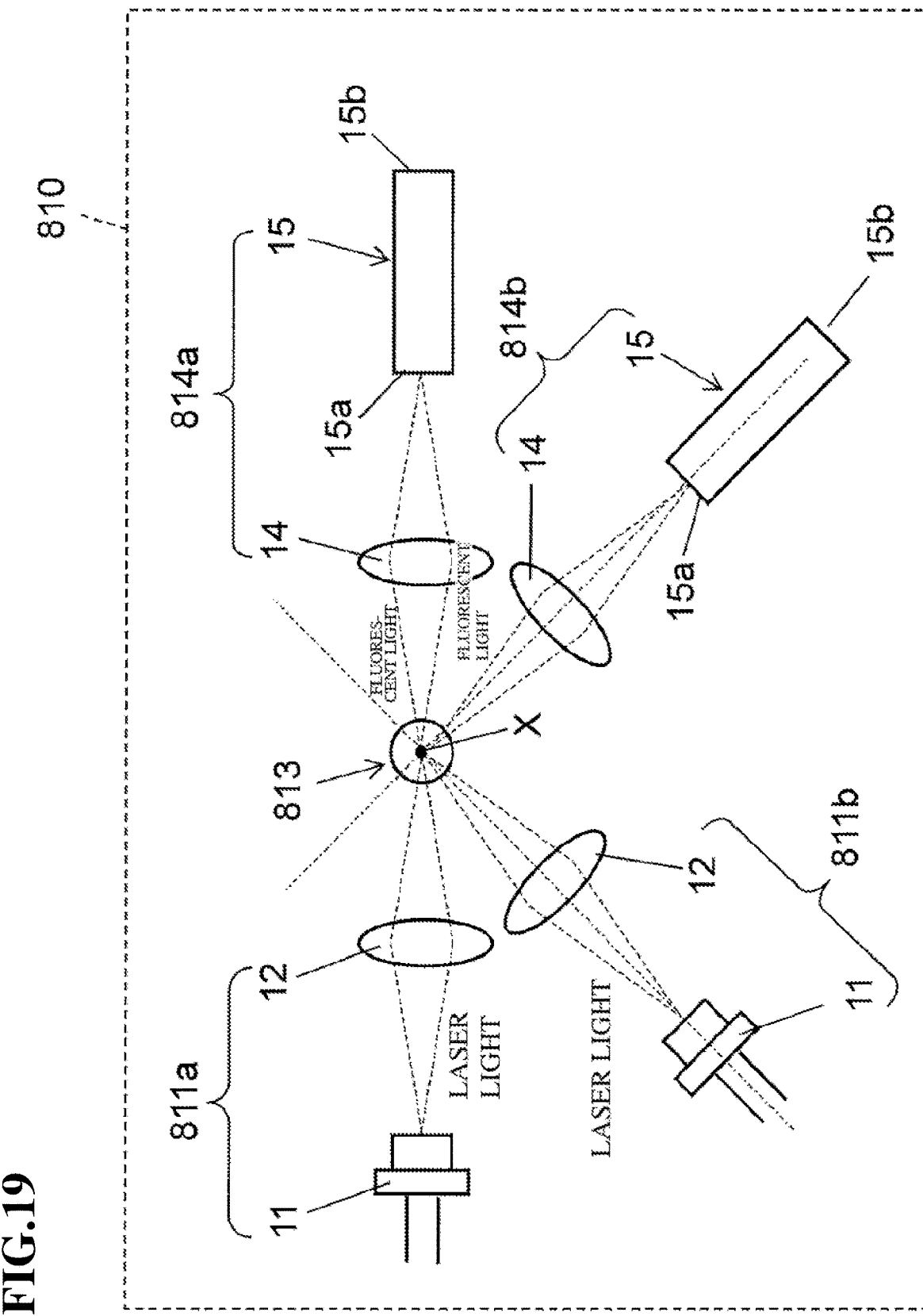
FIG. 19 is a schematic diagram illustrating a configuration of a light source device according to Embodiment 9 of the present invention.

The following is a description of a light source device 810 according to Embodiment 9 of the present invention using FIG. 19.

The light source device 810 according to the present embodiment differs from that of Embodiments 7 and 8 described above in that two laser condensing systems 811a and 811b and two fluorescent light intake systems 814a and 814b are provided, as shown in FIG. 19.

Note that the other constituent elements of the light source device 810 are similar to those of the light source device 10 of Embodiment 1 described above, and thus the same reference numerals are given to these constituent elements and a detailed description thereof is omitted. The light source device 810 of the present embodiment includes a laser condensing system 811a including a light source unit 11 and a condensing lens 12, a laser condensing system 811b including a light source unit 11 and a condensing lens 12, a spherical transmissive fluorescent body 813, a fluorescent light intake system 814a including an intake lens 14 and an optical fiber 15, and a fluorescent light intake system 814b including an intake lens 14 and an optical fiber 15, as shown in FIG. 19.

The laser condensing systems 811a and 811b are arranged on a spherical surface centered on the spherical transmissive fluorescent body 813, as shown in FIG. 19. With this, the transmissive fluorescent body 813 is irradiated with laser light from the plurality of laser condensing systems 811a and 811b arranged at the same distance.

The laser condensing system 811a is arranged such that the central lens axis of the condensing lens 12 matches the central lens axis of the intake lens 14 of the fluorescent light intake system 814a. That is, laser light emitted from the laser condensing system 811a is condensed at the center of the spherical transmissive fluorescent body 813 via the condensing lens 12, and causes fluorescent light to be emitted from a portion centered on the condensing point X. Also, the fluorescent light emitted from the transmissive fluorescent body 813 is, in each of the fluorescent light intake systems 814a and 814b, condensed by the intake lens 14, and a first face 15a of the optical fiber 15 is irradiated with the condensed fluorescent light.

The laser condensing system 811b is arranged such that the central lens axis of the condensing lens 12 intersects the lens central axes of the intake lenses 14 of the fluorescent light intake systems 814a and 814b. That is, laser light emitted from the laser condensing system 811b is condensed at the center of the spherical transmissive fluorescent body 813 via the condensing lens 12, and causes fluorescent light to be emitted from a portion centered on the condensing point X.

Here, the laser light condensed by the condensing lens 12 of the laser condensing system 811b is, similarly to the laser light condensed by the condensing lens 12 of the laser condensing system 811a, emitted so as to be condensed at the central position (condensing point X) of the spherical transmissive fluorescent body 813.

The transmissive fluorescent body 813 is a YAG single crystal fluorescent body doped with Ce ions, for example, and has a spherical shape. Also, the fluorescent light emitted from the transmissive fluorescent body 813 is emitted toward every direction, and therefore a portion of the fluorescent light is condensed by the intake lens 14 of each of the two fluorescent light intake systems 814a and 814b that are arranged along directions that intersect the laser condensing system 811b, and a first face 15a of each of the optical fibers 15 is irradiated with the condensed fluorescent light.

The fluorescent light intake systems 814a and 814b are arranged on a spherical surface centered on the spherical transmissive fluorescent body 813, as shown in FIG. 19. With this, the transmissive fluorescent body 813 emits fluorescent light toward the plurality of fluorescent light intake systems 814a and 814b that are arranged at the same distance.

The fluorescent light intake system 814a is arranged such that the central lens axis of the intake lens 14 matches the central lens axis of the condensing lens 12 of the laser condensing system 811a. That is, in the fluorescent light intake system 814a, the fluorescent light generated in the transmissive fluorescent body 813 due to being excited by the laser light rays that were emitted from the two light source units 11 and have been condensed by the respective condensing lenses 12 is condensed by the intake lens 14, and the first face 15a of the optical fiber 15 is irradiated with the condensed fluorescent light.

The fluorescent light intake system 814b is arranged such that the central lens axis of the intake lens 14 intersects the lens central axes of the condensing lenses 12 of the laser condensing systems 811a and 811b and the central lens axis of the intake lens 14 of the fluorescent light intake system 814a.

That is, the laser light rays emitted from the two light source units 11 are condensed in the spherical transmissive fluorescent body 813 via the respective condensing lenses 12, and cause fluorescent light to be emitted from the center of the sphere (condensing point X). Here, the fluorescent light generated inside the spherical transmissive fluorescent body 813 is emitted toward every direction. Portions of the fluorescent light are emitted toward the fluorescent light intake systems 814a and 814b from respective emitting faces, of the sphere, that are arranged at substantially the same distance from the condensing point X of the laser light.

Also, in each of the fluorescent light intake systems 814a and 814b, the fluorescent light emitted from the transmissive fluorescent body 813 is condensed by the intake lens 14, and a first face 15a of the optical fiber 15 is irradiated with the condensed fluorescent light.

In the light source device 810 of the present embodiment, the plurality of laser condensing systems 811a and 811b and the plurality of fluorescent light intake systems 814a and 814b are arranged around the spherical transmissive fluorescent body 813, as shown in FIG. 19.

With this, as a result of condensing laser light emitted from the plurality of light source units 11 at the center of the spherical transmissive fluorescent body 813, fluorescent light having substantially doubled luminance compared with the case where a single light source unit 11 is included can be taken out.

Also, as a result of arranging the fluorescent light intake systems 814a and 814b including the respective optical fibers 15 around the spherical transmissive fluorescent body 813, a plurality of fluorescent light rays that are generated at the center of the sphere can be taken out in any directions with substantially the same luminance.

Embodiment 10

Figure 20:
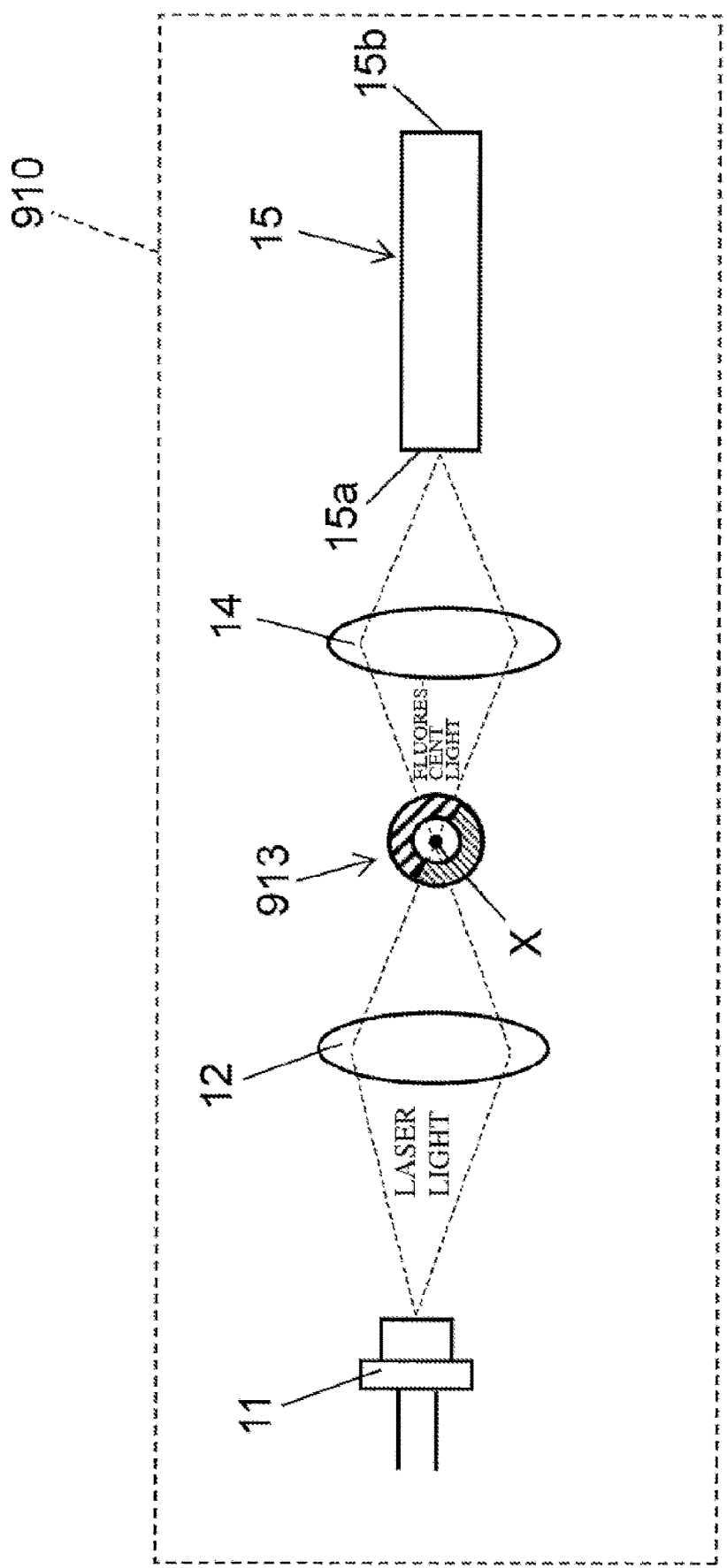
FIG. 20 is a schematic diagram illustrating a configuration of a light source device according to Embodiment 10 of the present invention.
Figure 21:
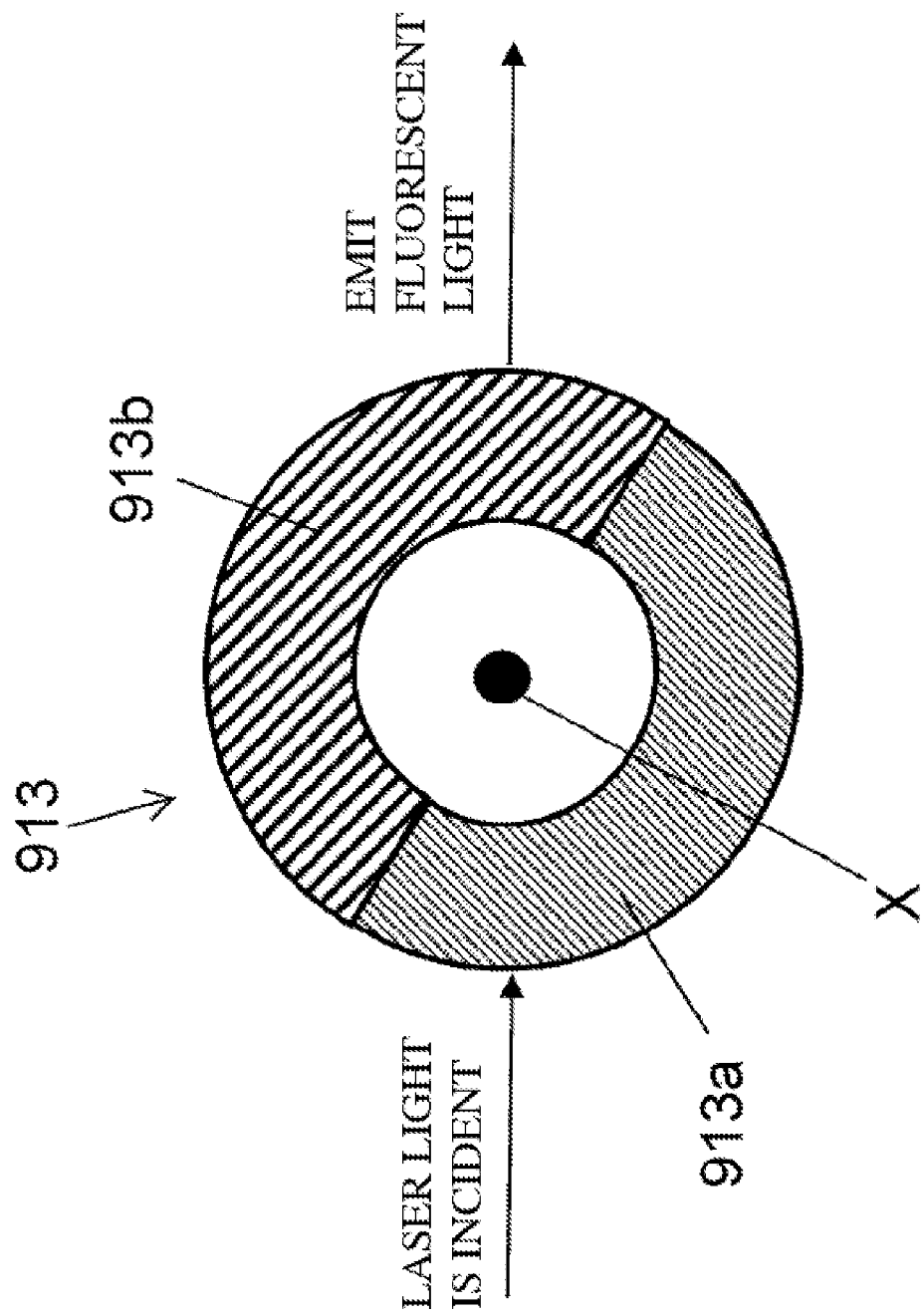
FIG. 21 is an enlarged diagram illustrating a configuration of a transmissive fluorescent body included in the light source device in FIG. 20.

The following is a description of a light source device 910 according to Embodiment 10 of the present invention using FIGS. 20 and 21.

The light source device 910 according to the present embodiment differs from Embodiment 1 described above in that a transmissive fluorescent body 913 including, inside a sphere, a laser transmissive/fluorescent light reflective film (first face) 913a and a laser reflective/fluorescent light transmissive film (second face) 913b is provided, as shown in FIG. 20.

Note that the other constituent elements of the light source device 910 are similar to those of the light source device 10 of Embodiment 1 described above, and thus the same reference numerals are given to these constituent elements and a detailed description thereof is omitted. The light source device 910 of the present embodiment includes a light source unit 11, a condensing lens 12, the transmissive fluorescent body 913, an intake lens 14, and an optical fiber 15, as shown in FIG. 20.

The transmissive fluorescent body 913 is a YAG single crystal fluorescent body doped with Ce ions, for example, and has a spherical shape. Also, the transmissive fluorescent body 913 has, inside thereof, the laser transmissive/fluorescent light reflective film 913a and the laser reflective/fluorescent light transmissive film 913b, as shown in FIG. 21. Also, in the spherical transmissive fluorescent body 913, laser light emitted from the light source unit 11 is condensed at the center of the sphere (condensing point X) by the condensing lens 12.

The laser transmissive/fluorescent light reflective film 913a allows the laser light that was emitted from the light source unit 11 and has been condensed by the condensing lens 12 to pass through, and reflects fluorescent light generated inside the transmissive fluorescent body 913. Also, the laser transmissive/fluorescent light reflective film 913a is provided on a laser light incident face side, as shown in FIG. 21.

The laser reflective/fluorescent light transmissive film 913b reflects the laser light that was emitted from the light source unit 11 and has been condensed by the condensing lens 12, and allows the fluorescent light generated inside the transmissive fluorescent body 913 to pass through. Also, the laser reflective/fluorescent light transmissive film 913b is provided on a fluorescent light emitting face side, as shown in FIG. 21.

Here, the laser transmissive/fluorescent light reflective film 913a and the laser reflective/fluorescent light transmissive film 913b can each be formed on the transmissive fluorescent body 913 using a method such as vapor deposition or sputtering.

With this, since the transmissive fluorescent body 913 has the laser transmissive/fluorescent light reflective film 913a, the laser light that was emitted from the light source unit 11 and has been condensed by the condensing lens 12 can enter the inside of the transmissive fluorescent body 913. Also, a portion of the fluorescent light that has been excited by laser light that was condensed at the center (condensing point X) of the spherical transmissive fluorescent body 913, and has been emitted in every direction can be reflected, on the laser light incident side, toward the fluorescent light emitting side.

On the other hand, since the transmissive fluorescent body 913 has the laser reflective/fluorescent light transmissive film 913*b*, the laser light that was emitted from the light source unit 11, has been condensed by the condensing lens 12, and has passed through the transmissive fluorescent body 913 without being absorbed can be reflected toward the center (condensing point X) of the transmissive fluorescent body 913 again. Also, a portion of the fluorescent light that has been excited by laser light that was condensed at the center (condensing point X) of the spherical transmissive fluorescent body 913, and has been emitted in every direction can exit toward the outside from an emitting-side on which the intake lens 14 is arranged.

Note that an example in which the laser transmissive/fluorescent light reflective film 913*a* and the laser reflective/fluorescent light transmissive film 913*b* are provided so as to have substantially the same areas has been described in FIG. 21. The present invention is not limited thereto, and the areas may also be different to each other.

Also, the laser transmissive/fluorescent light reflective film 913*a* and the laser reflective/fluorescent light transmissive film 913*b* need not be arranged so as to surround the outer periphery of the transmissive fluorescent body 913, as shown in FIG. 21, and the films need only be provided at least on an incident side of the laser light and an emitting side of the fluorescent light, respectively.

Embodiment 11

Figure 22:
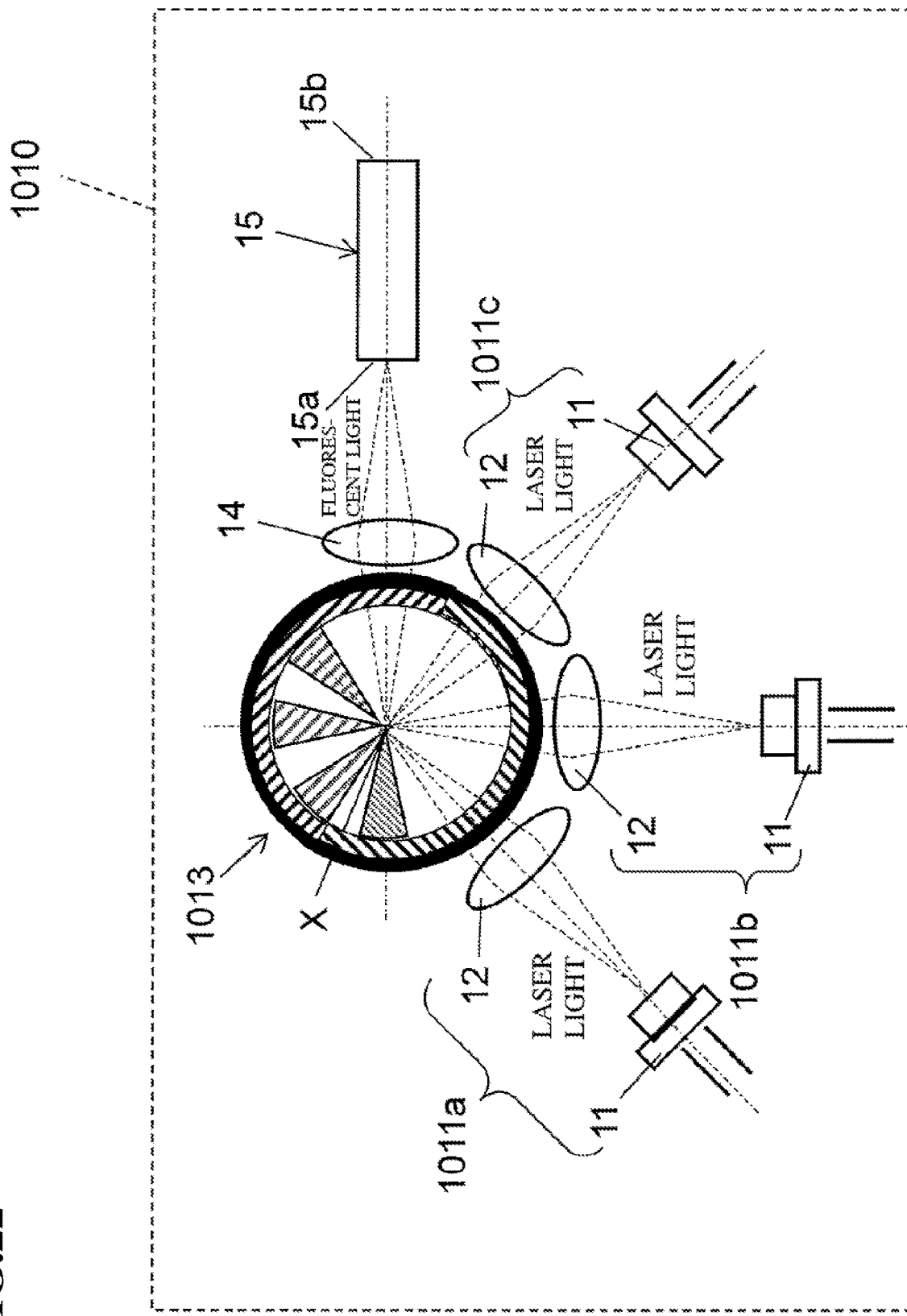
FIG. 22 is a schematic diagram illustrating a configuration of a light source device according to Embodiment 11 of the present invention.
Figure 23:
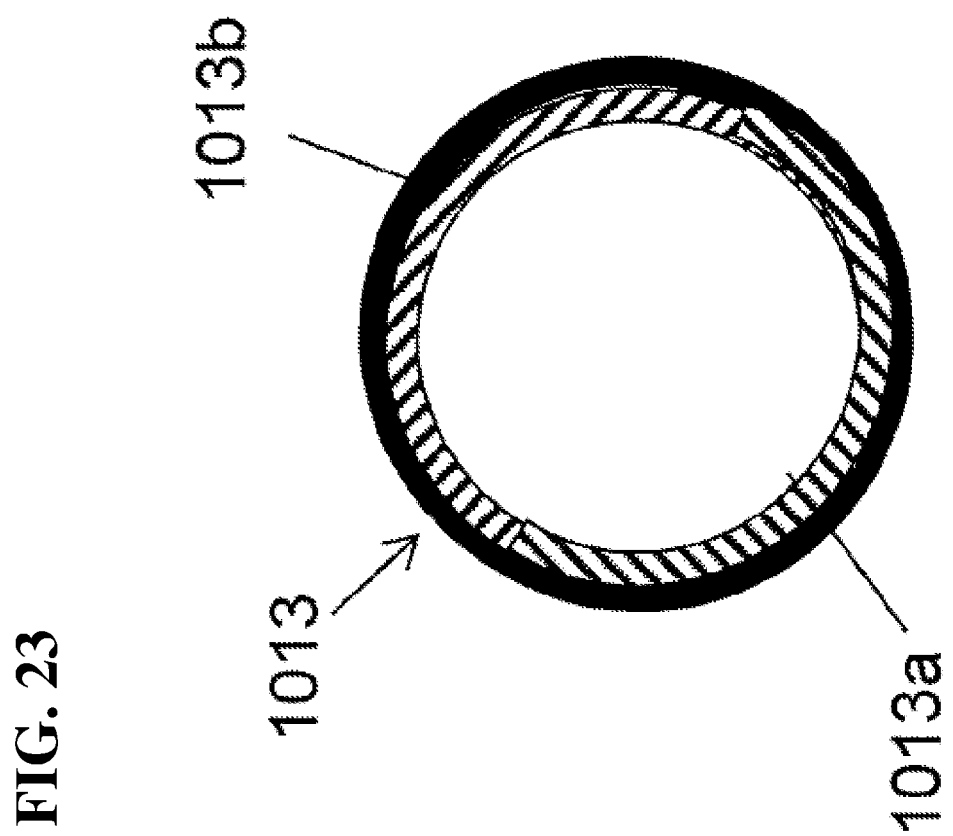
FIG. 23 is a schematic diagram illustrating a configuration of a transmissive fluorescent body included in the light source device in FIG. 22.

The following is a description of a light source device 1010 according to Embodiment 11 of the present invention using FIGS. 22 and 23.

The light source device 1010 according to the present embodiment differs from the above-described Embodiment 9 and the like in that a plurality of laser condensing systems 1011*a*, 1011*b*, and 1011*c* are arranged in directions that intersect the central lens axis of an intake lens 14 for taking out fluorescent light, as shown in FIG. 22, and a spherical transmissive fluorescent body 1013 in which one-layer mirror coating is performed on the surface thereof is used.

Note that the other constituent elements of the light source device 1010 are similar to those of the light source device 10 of Embodiment 1 described above, and thus the same reference numerals are given to these constituent elements and a detailed description thereof is omitted.

The light source device 1010 of the present embodiment includes the laser condensing system 1011*a* including a light source unit 11 and a condensing lens 12, the laser condensing system 1011*b* including a light source unit 11 and a condensing lens 12, the laser condensing system 1011*c* including a light source unit 11 and a condensing lens 12, the transmissive fluorescent body 1013, an intake lens 14, and an optical fiber 15, as shown in FIG. 22.

The laser condensing systems 1011*a*, 1011*b*, and 1011*c* are arranged on a spherical surface centered on the spherical transmissive fluorescent body 1013, as shown in FIG. 22. With this, the transmissive fluorescent body 1013 is irradiated with laser light from the plurality of laser condensing systems 1011*a*, 1011*b*, and 1011*c* that are arranged at the same distance.

Also, the laser condensing systems 1011*a*, 1011*b*, and 1011*c* are each arranged along a direction that intersects the central axis of the intake lens 14 for taking out fluorescent light. Also, the laser condensing systems 1011*a*, 1011*b*, and 1011*c* each condenses laser light emitted from the own light source unit 11 by the condensing lens 12 such that the laser light is condensed at the center (condensing point X) of the spherical transmissive fluorescent body 1013.

The transmissive fluorescent body 1013 is a YAG single crystal fluorescent body doped with Ce ions, for example, and has a spherical shape. Also, the transmissive fluorescent body 1013 includes a laser transmissive/fluorescent light reflective mirror 1013*a* and a laser reflective/fluorescent light transmissive mirror 1013*b*, as shown in FIG. 23.

The laser transmissive/fluorescent light reflective mirror 1013*a* has a property of allowing laser light that was emitted from the light source unit 11 and has been condensed by the condensing lens 12, in each of the laser condensing systems 1011*a*, 1011*b*, and 1011*c*, to pass and reflecting fluorescent light emitted at the center (condensing point X) of the spherical transmissive fluorescent body 1013 due to the laser light.

The laser reflective/fluorescent light transmissive mirror 1013*b* has a property of reflecting the laser light that was emitted from the light source unit 11, condensed by the condensing lens 12, in each of the laser condensing systems 1011*a*, 1011*b*, and 1011*c*, that was not absorbed and has passed through the transmissive fluorescent body 1013, and again guiding the laser light to the condensing point X.

In the light source device 1010 of the present embodiment, the spherical transmissive fluorescent body 1013 is provided with wavelength selective mirrors (laser transmissive/fluorescent light reflective mirror 1013*a*, laser reflective/fluorescent light transmissive mirror 1013*b*), as described above.

With this, laser light that entered the transmissive fluorescent body 1013 and has passed therethrough without being absorbed is reflected toward the condensing point X, and as a result, excitation of fluorescent light at the condensing point X is augmented, and a light source with higher luminance can be obtained.

Also, the laser transmissive/fluorescent light reflective mirror 1013*a* and the laser reflective/fluorescent light transmissive mirror 1013*b* are respectively arranged at an intake port of laser light and a taking-out port of fluorescent light, in the transmissive fluorescent body 1013.

With this, taking-in of laser light and taking-out of fluorescent light can be prevented from being blocked, without providing openings such as an intake window and a taking-out window. Moreover, in the present embodiment, the laser condensing systems 1011*a*, 1011*b*, and 1011*c* are arranged, centered on the spherical transmissive fluorescent body 1013, such that their axes do not match the axis of the intake lens 14, as shown in FIG. 22.

With this, laser light emitted from each of the plurality of laser condensing systems 1011*a*, 1011*b*, and 1011*c* is condensed at the center (condensing point X) of the spherical transmissive fluorescent body 1013, and its reflected light is also directed toward the condensing point X, and as a result, a light source with even higher luminance can be obtained.

Note that an example in which the laser transmissive/fluorescent light reflective mirror 1013*a* and the laser reflective/fluorescent light transmissive mirror 1013*b* are provided so as to have substantially the same areas has been described in FIG. 23. The present invention is not limited thereto, and the areas may also be different to each other.

Also, the laser transmissive/fluorescent light reflective mirror 1013*a* and the laser reflective/fluorescent light transmissive mirror 1013*b* need not be arranged so as to surround the outer periphery of the transmissive fluorescent body 1013, as shown in FIG. 23, and the mirrors need only be provided at least on an incident side of the laser light and an emitting side of the fluorescent light, respectively.

Embodiment 12

Figure 24:
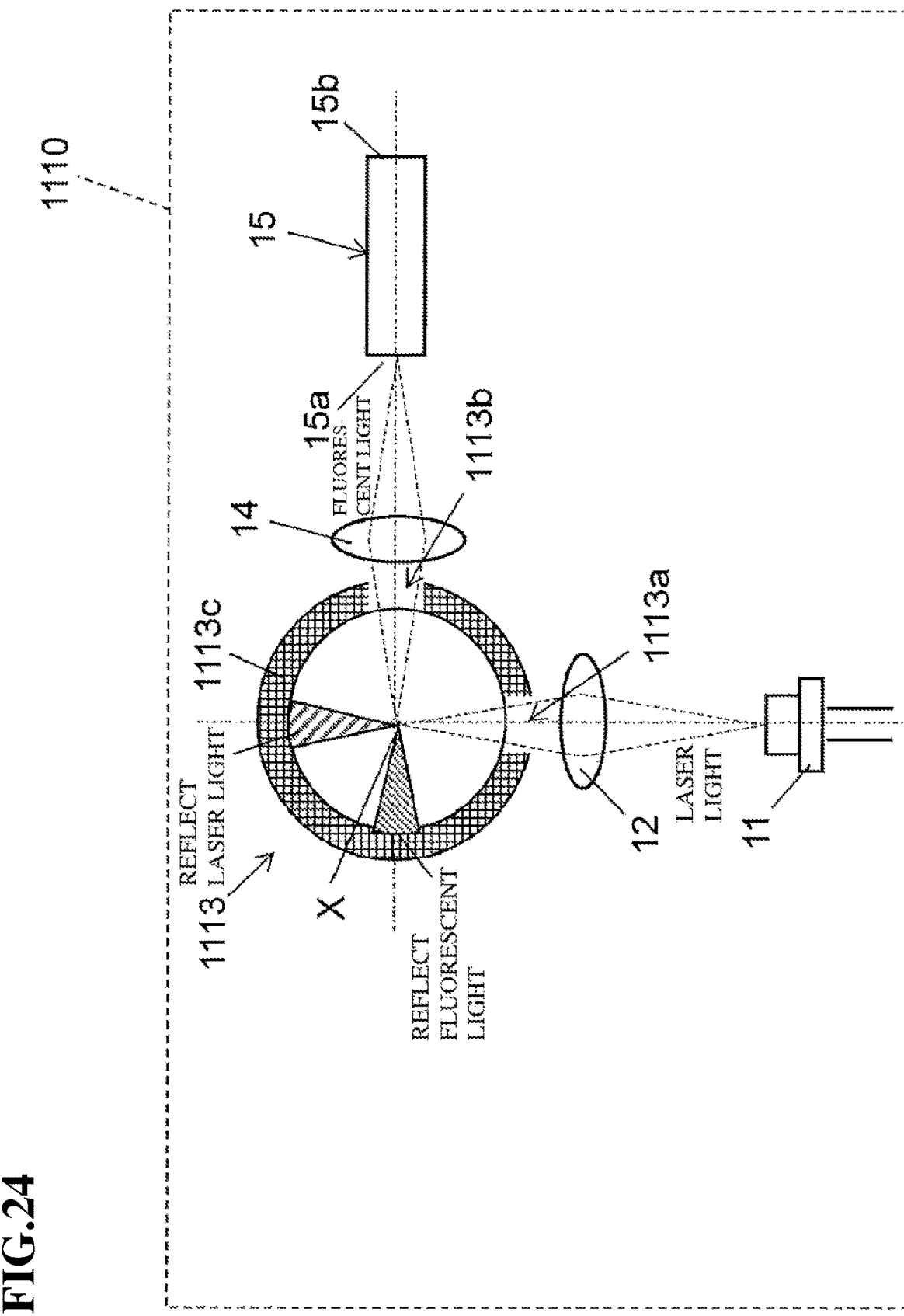
FIG. 24 is a schematic diagram illustrating a configuration of a light source device according to Embodiment 12 of the present invention.

The following is a description of a light source device 1110 according to Embodiment 12 of the present invention using FIG. 24.

The light source device 1110 according to the present embodiment differs from the above-described Embodiment 10 and the like in that condensed laser light enters through an intake window (first opening portion) 1113a formed in a spherical transmissive fluorescent body 1113, and fluorescent light is taken out from a taking-out window (second opening portion) 1113b that is arranged opposite to an intake lens 14 that is arranged along a direction that is substantially orthogonal to (intersects) the central lens axis of the condensing lens 12, as shown in FIG. 24.

Note that the other constituent elements of the light source device 1110 are similar to those of the light source device 10 of Embodiment 1 described above, and thus the same reference numerals are given to these constituent elements and a detailed description thereof is omitted.

The light source device 1110 of the present embodiment includes a light source unit 11, the condensing lens 12, the transmissive fluorescent body 1113, the intake lens 14, and an optical fiber 15, as shown in FIG. 24.

The light source unit 11 and the condensing lens 12 are arranged, at a position at which the axes thereof do not match that of the intake lens 14 for taking out fluorescent light, along a direction that intersects the central axis of the intake lens 14.

The transmissive fluorescent body 1113 is a YAG single crystal fluorescent body doped with Ce ions, for example, and has a spherical shape. Also, the transmissive fluorescent body 1113 has the intake window 1113a formed at a position opposite to the condensing lens 12, the taking-out window 1113b formed at a position opposite to the intake lens 14, and a reflection film 1113c.

The intake window 1113a is an opening formed in the spherical transmissive fluorescent body 1113 at a position at which laser light is taken in, and through which laser light condensed by the condensing lens 12 is guided to a condensing point X.

The taking-out window 1113b is an opening formed in order to take out fluorescent light toward the intake lens 14 and the optical fiber 15, and through which fluorescent light emitted at the condensing point X is taken out. The reflection film 1113c reflects laser light that has entered through the intake window 1113a, and that passed through the transmissive fluorescent body 1113 without being absorbed toward the condensing point X. Also, the reflection film 1113c reflects that part of the fluorescent light generated at the condensing point X, and emitted toward every direction, that has been emitted in a direction different from the direction toward the taking-out window 1113b toward the taking-out window 1113b.

With this, as a result of arranging the laser condensing system (light source unit 11 and condensing lens 12) and the fluorescent light intake system (intake lens 14 and optical fiber 15) such that their axes do not match, a light source with even higher luminance can be obtained using the reflected light of laser light and the reflected light of fluorescent light.

Note that, in the present embodiment, a configuration in which one laser condensing system (light source unit 11 and condensing lens 12) and one fluorescent light intake system (intake lens 14 and optical fiber 15) are provided has been described. However, the present invention is not limited thereto.

For example, the configuration may be such that a plurality of laser condensing systems (light source unit 11 and condensing lens 12) and fluorescent light intake systems (intake lens 14 and optical fiber 15) are provided around a spherical transmissive fluorescent body.

Embodiment 13

Figure 25:
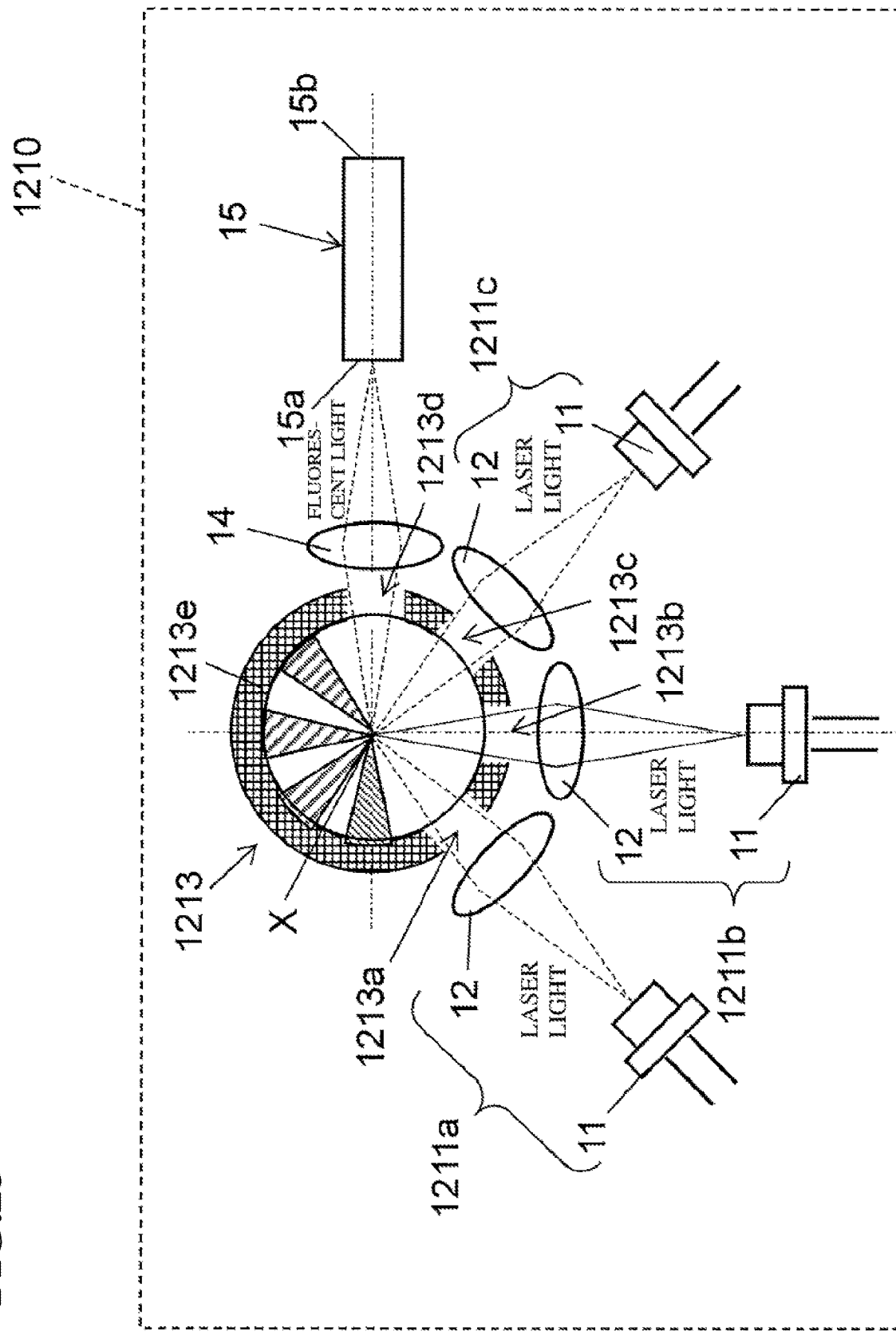
FIG. 25 is a schematic diagram illustrating a configuration of a light source device according to Embodiment 13 of the present invention.

The following is a description of a light source device 1210 according to Embodiment 13 of the present invention using FIG. 25.

The light source device 1210 according to the present embodiment differs from Embodiment 12 described above in that three laser condensing systems (light source unit 11 and condensing lens 12) are provided around a spherical transmissive fluorescent body 1213, as shown in FIG. 25.

Note that the other constituent elements of the light source device 1210 are similar to those of the light source device 10 of Embodiment 1 described above, and thus the same reference numerals are given to these constituent elements and a detailed description thereof is omitted.

The light source device 1210 of the present embodiment includes a laser condensing system 1211a including a light source unit 11 and a condensing lens 12, a laser condensing system 1211b including a light source unit 11 and a condensing lens 12, a laser condensing system 1211c including a light source unit 11 and a condensing lens 12, the transmissive fluorescent body 1213, an intake lens 14, and an optical fiber 15, as shown in FIG. 25.

The laser condensing systems 1211a to 1211c are arranged on a spherical surface centered on the spherical transmissive fluorescent body 1213, as shown in FIG. 25. With this, the transmissive fluorescent body 1213 is irradiated with laser light from the plurality of laser condensing systems 1211a, 1211b, and 1211c that are arranged at the same distance.

Also, the laser condensing systems 1211a, 1211b, and 1211c condense laser light rays at the center (condensing point X) of the transmissive fluorescent body 1213 through respective intake windows (first opening portions) 1213a, 1213b, and 1213c formed in the transmissive fluorescent body 1213.

The transmissive fluorescent body 1213 is a YAG single crystal fluorescent body doped with Ce ions, for example, and has a spherical shape. Also, the transmissive fluorescent body 1213 has the intake windows 1213a to 1213c that are formed at positions respectively opposite to the condensing lenses 12 of the laser condensing systems 1211a to 1211c, a taking-out window (second opening portion) 1213d formed at a position opposite to the intake lens 14, and a reflection film 1213e.

The intake windows 1213a to 1213c are openings formed in the spherical transmissive fluorescent body 1213 at positions at each of which laser light is taken in, and through which laser light condensed by each condensing lens 12 is guided to the condensing point X.

The taking-out window 1213d is an opening formed in order to take out fluorescent light toward the intake lens 14 and the optical fiber 15, and through which fluorescent light emitted at the condensing point X is taken out. The reflection film 1213e reflects the laser light that entered through the intake windows 1213a to 1213c, and that has passed through the transmissive fluorescent body 1213 without being absorbed toward the condensing point X. Also, the reflection film 1213e reflects that part of the fluorescent light generated at the condensing point X and emitted toward every direction, that has been emitted in a direction opposite to the taking-out window 1213*d* toward the taking-out window 1213*d*.

With this, as a result of arranging the laser condensing systems (light source unit 11 and condensing lens 12) and the fluorescent light intake system (intake lens 14 and optical fiber 15) such that their axes do not match, a light source with even higher luminance can be obtained using the reflected light of laser light and the reflected light of fluorescent light.

Embodiment 14

Figure 26:
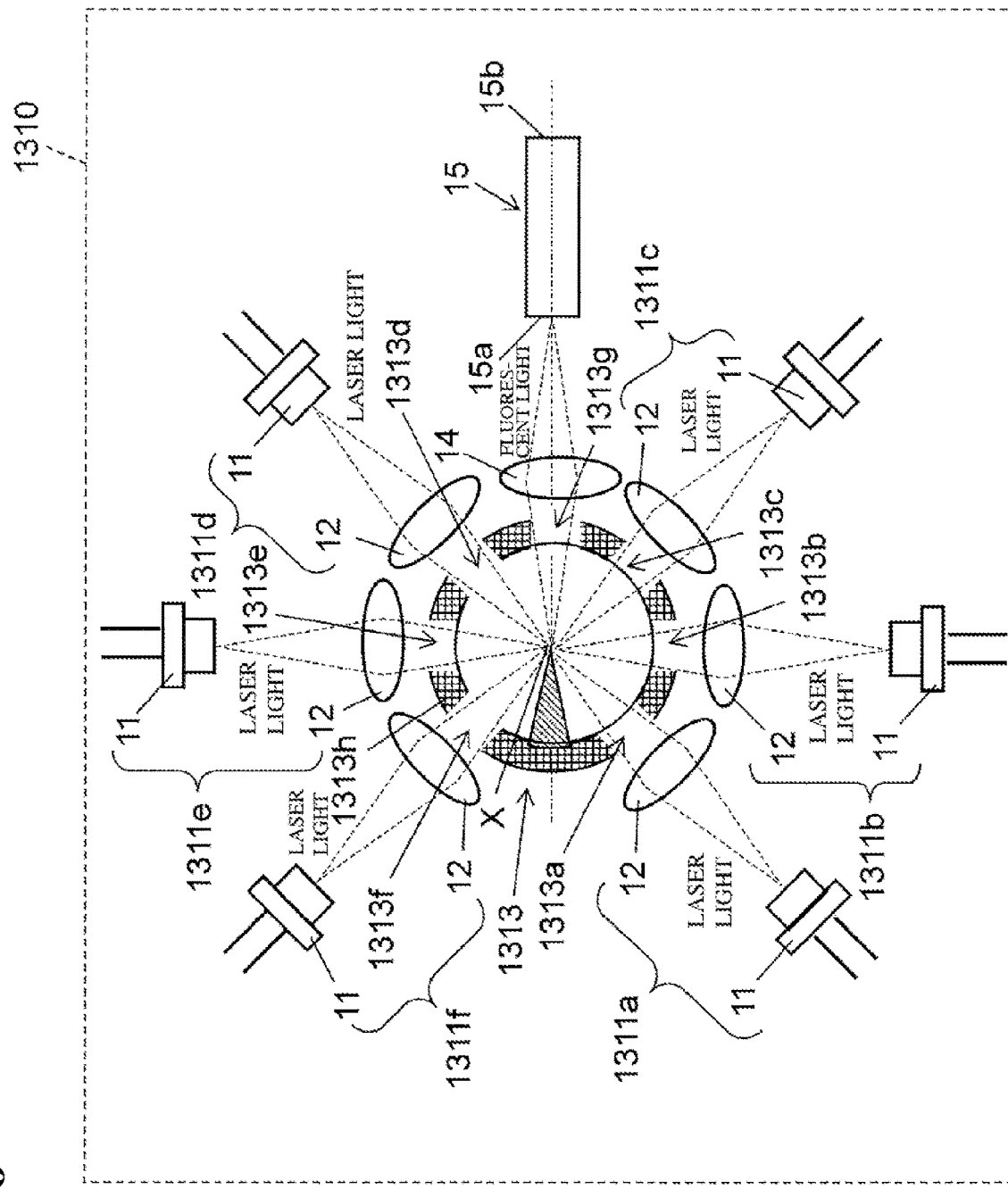
FIG. 26 is a schematic diagram illustrating a configuration of a light source device according to Embodiment 14 of the present invention.

The following is a description of a light source device 1310 according to Embodiment 14 of the present invention using FIG. 26.

The light source device 1310 according to the present embodiment differs from Embodiments 12 and 13 described above in that six laser condensing systems (light source unit 11 and condensing lens 12) are provided around a spherical transmissive fluorescent body 1313, as shown in FIG. 26.

Note that the other constituent elements of the light source device 1310 are similar to those of the light source device 10 of Embodiment 1 described above, and thus the same reference numerals are given to these constituent elements and a detailed description thereof is omitted.

The light source device 1310 of the present embodiment includes a laser condensing system 1311*a* including a light source unit 11 and a condensing lens 12, a laser condensing system 1311*b* including a light source unit 11 and a condensing lens 12, a laser condensing system 1311*c* including a light source unit 11 and a condensing lens 12, a laser condensing system 1311*d* including a light source unit 11 and a condensing lens 12, a laser condensing system 1311*e* including a light source unit 11 and a condensing lens 12, a laser condensing system 1311*f* including a light source unit 11 and a condensing lens 12, the transmissive fluorescent body 1313, an intake lens 14, and an optical fiber 15, as shown in FIG. 26.

The laser condensing systems 1311*a* to 1311*f* are arranged on a spherical surface centered on the spherical transmissive fluorescent body 1313, as shown in FIG. 26. With this, the transmissive fluorescent body 1313 is irradiated with laser light from the plurality of laser condensing systems 1311*a* to 1311*f* that are arranged at the same distance.

Also, the laser condensing systems 1311*a* to 1311*f* condenses laser light rays at the center (condensing point X) of the transmissive fluorescent body 1313 through respective intake windows (first opening portions) 1313*a*, 1313*b*, 1313*c*, 1313*d*, 1313*e*, and 1313*f* formed in the transmissive fluorescent body 1313.

The transmissive fluorescent body 1313 is a YAG single crystal fluorescent body doped with Ce ions, for example, and has a spherical shape. Also, the transmissive fluorescent body 1313 has the intake windows 1313*a* to 1313*f* that are formed at positions respectively opposite to the condensing lenses 12 of the laser condensing systems 1311*a* to 1311*f*, a taking-out window (second opening portion) 1313*g* formed at a position opposite to the intake lens 14, and a reflection film 1313*h*.

The intake windows 1313*a* to 1313*f* are openings formed in the spherical transmissive fluorescent body 1313 at positions at each of which laser light is taken in, and through which laser light condensed by each condensing lens 12 is guided to a condensing point X.

The taking-out window 1313*g* is an opening formed in order to take out fluorescent light toward the intake lens 14 and the optical fiber 15, and through which fluorescent light emitted at the condensing point X is taken out. The reflection film 1313*h* reflects that part of the fluorescent light generated at the condensing point X by laser light entered through each of the intake windows 1313*a* to 1313*f* and emitted toward every direction, that has been emitted toward a direction opposite to the taking-out window 1313*g* toward the taking-out window 1313*g*.

With this, as a result of arranging the laser condensing systems (light source unit 11 and condensing lens 12) and the fluorescent light intake system (intake lens 14 and optical fiber 15) such that their axes do not match, a light source with even higher luminance can be obtained using reflected light of fluorescent light.

Embodiment 15

Figure 27:
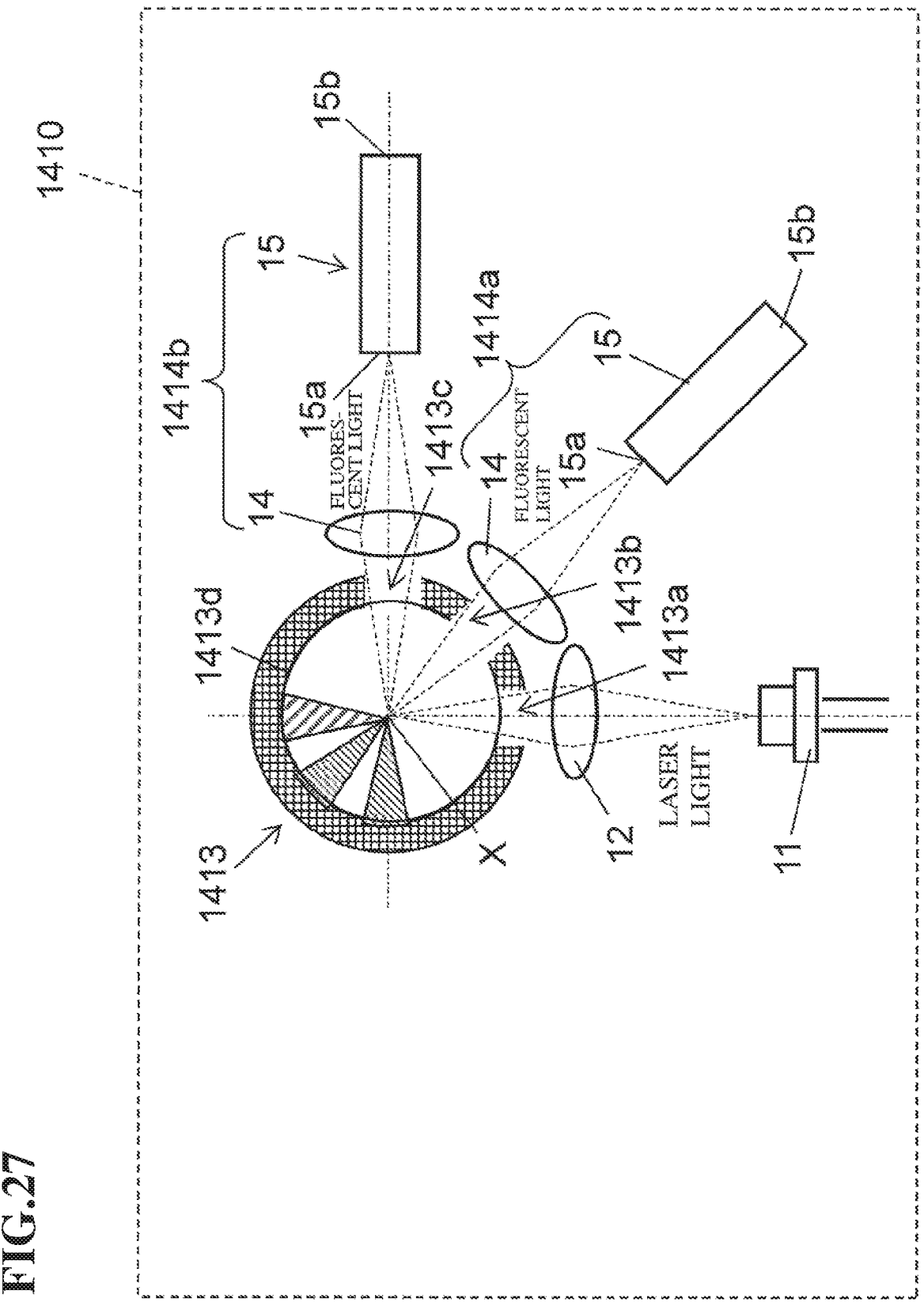
FIG. 27 is a schematic diagram illustrating a configuration of a light source device according to Embodiment 15 of the present invention.

The following is a description of a light source device 1410 according to Embodiment 15 of the present invention using FIG. 27.

The light source device 1410 according to the present embodiment differs from Embodiment 12 in that a plurality of fluorescent light intake systems 1414*a* and 1414*b* are arranged, centered on a spherical transmissive fluorescent body 1413, such that their axes do not match the axis of a single laser condensing system (light source unit 11 and condensing lens 12), as shown in FIG. 27.

Note that the other constituent elements of the light source device 1410 are similar to those of the light source device 10 of Embodiment 1 described above, and thus the same reference numerals are given to these constituent elements and a detailed description thereof is omitted.

The light source device 1410 of the present embodiment includes the light source unit 11, the condensing lens 12, the transmissive fluorescent body 1413, the fluorescent light intake system 1414*a* including an intake lens 14 and an optical fiber 15, and the fluorescent light intake system 1414*b* including an intake lens 14 and an optical fiber 15, as shown in FIG. 27.

The laser condensing system (light source unit 11 and condensing lens 12) condenses laser light at the center (condensing point X) of the transmissive fluorescent body 1413 through the intake window (first opening portion) 1413*a* formed in the transmissive fluorescent body 1413.

The fluorescent light intake systems 1414*a* and 1414*b* are arranged on a spherical surface centered on the spherical transmissive fluorescent body 1413 such that their axes do not match the axis of the laser condensing system. Also, the fluorescent light intake systems 1414*a* and 1414*b* take out fluorescent light rays emitted at the center (condensing point X) of the transmissive fluorescent body 1413 through respective taking-out windows (second opening portions) 1413*b* and 1413*c* that are formed in the transmissive fluorescent body 1413, and condense the fluorescent light rays on first faces 15*a* of the optical fibers 15 by the intake lenses 14, respectively.

The transmissive fluorescent body 1413 is a YAG single crystal fluorescent body doped with Ce ions, for example, and has a spherical shape. Also, the transmissive fluorescent body 1413 includes the intake window 1413*a*, the taking-out windows 1413*b* and 1413*c*, and a reflection film 1413*d*.

The intake window 1413*a* is an opening formed in the spherical transmissive fluorescent body 1413 at a position at which laser light is taken in, and through which laser light condensed by the condensing lens 12 is guided to the condensing point X.

The taking-out windows 1413b and 1413c are each an opening formed in order to take out fluorescent light toward the intake lens 14 and the optical fiber 15, and through which fluorescent light emitted at the condensing point X is taken out.

The reflection film 1413d reflects that part of the fluorescent light generated at the condensing point X by laser light entered through the intake window 1413a and emitted toward every direction, that has been emitted in directions that are not toward the taking-out windows 1413b and 1413c toward the taking-out windows 1413b and 1413c.

With this, as a result of arranging the laser condensing system (light source unit 11 and condensing lens 12) and the fluorescent light intake systems (intake lens 14 and optical fiber 15) such that their axes do not match, a light source with even higher luminance can be obtained using the reflected light of laser light and the reflected light of fluorescent light.

Embodiment 16

Figure 28:
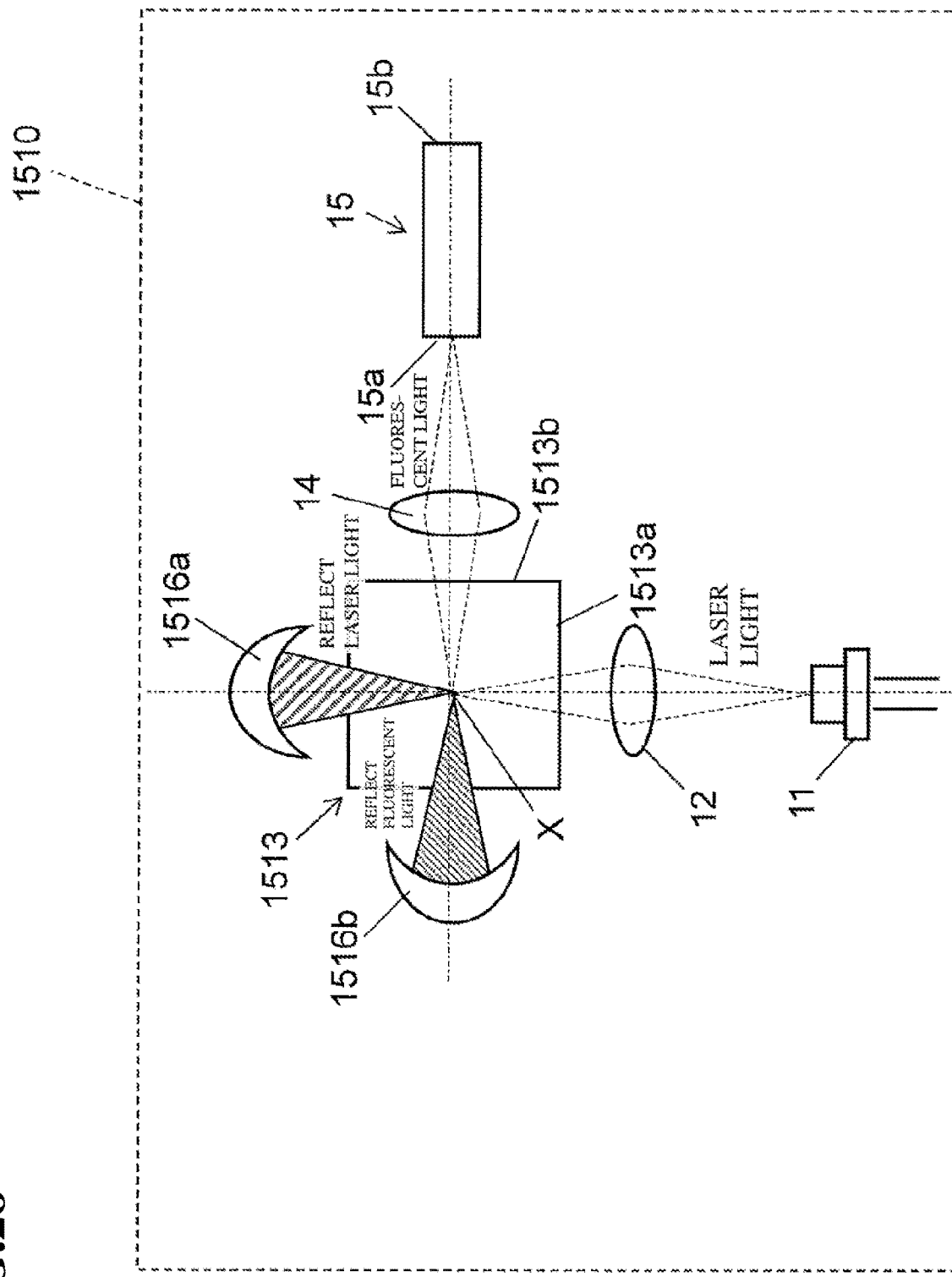
FIG. 28 is a schematic diagram illustrating a configuration of a light source device according to Embodiment 16 of the present invention.

The following is a description of a light source device 1510 according to Embodiment 16 of the present invention using FIG. 28.

The light source device 1510 according to the present embodiment differs from Embodiment 12 described above in that a concave mirror 1516a for reflecting laser light and a concave mirror 1516b for reflecting fluorescent light are arranged outside a transmissive fluorescent body 1513 having a cubic (polyhedron) shape, as shown in FIG. 28.

Note that the other constituent elements of the light source device 1510 are similar to those of the light source device 10 of Embodiment 1 described above, and thus the same reference numerals are given to these constituent elements and a detailed description thereof is omitted.

The light source device 1510 of the present embodiment includes a light source unit 11, a condensing lens 12, the transmissive fluorescent body 1513, an intake lens 14, an optical fiber 15, and the concave mirrors 1516a and 1516b, as shown in FIG. 28.

The transmissive fluorescent body 1513 is a YAG single crystal fluorescent body doped with Ce ions, for example, and has a cubic shape. Also, laser light enters the transmissive fluorescent body 1513 from an incident face 1513a, and fluorescent light is taken out from an emitting face 1513b that intersects the incident face 1513a.

The concave mirror 1516a is arranged opposite to a face that opposes the incident face 1513a of the transmissive fluorescent body 1513. Also, the concave mirror 1516a reflects laser light that has passed through the face that opposes the incident face 1513a of the transmissive fluorescent body 1513 toward a condensing point X.

The concave mirror 1516b is arranged opposite to a face that opposes the emitting face 1513b of the transmissive fluorescent body 1513. Also, the concave mirror 1516b reflects that part of the fluorescent light generated at the condensing point X of the transmissive fluorescent body 1513 and emitted toward every direction, that has passed through the face that opposes the emitting face 1513b toward the condensing point X.

As described above, in the light source device 1510 of the present embodiment, the concave mirror 1516a for reflecting laser light and the concave mirror 1516b for reflecting fluorescent light are provided outside the transmissive fluorescent body 1513 having a cubic shape.

With this, the same effect as the above-described embodiments that a light source with even higher luminance can be obtained can be achieved without providing members that have a function of reflecting laser light or fluorescent light inside a transmissive fluorescent body.

Note that when a plurality of laser condensing systems are provided in the configuration of the present embodiment, a laser condensing system that emits laser light in a direction perpendicular to a plane including the central lens axis of the condensing lens 12 and the central lens axis of the intake lens 14 (perpendicular to the page) shown in FIG. 28 may be provided.

Embodiment 17

Figure 29:
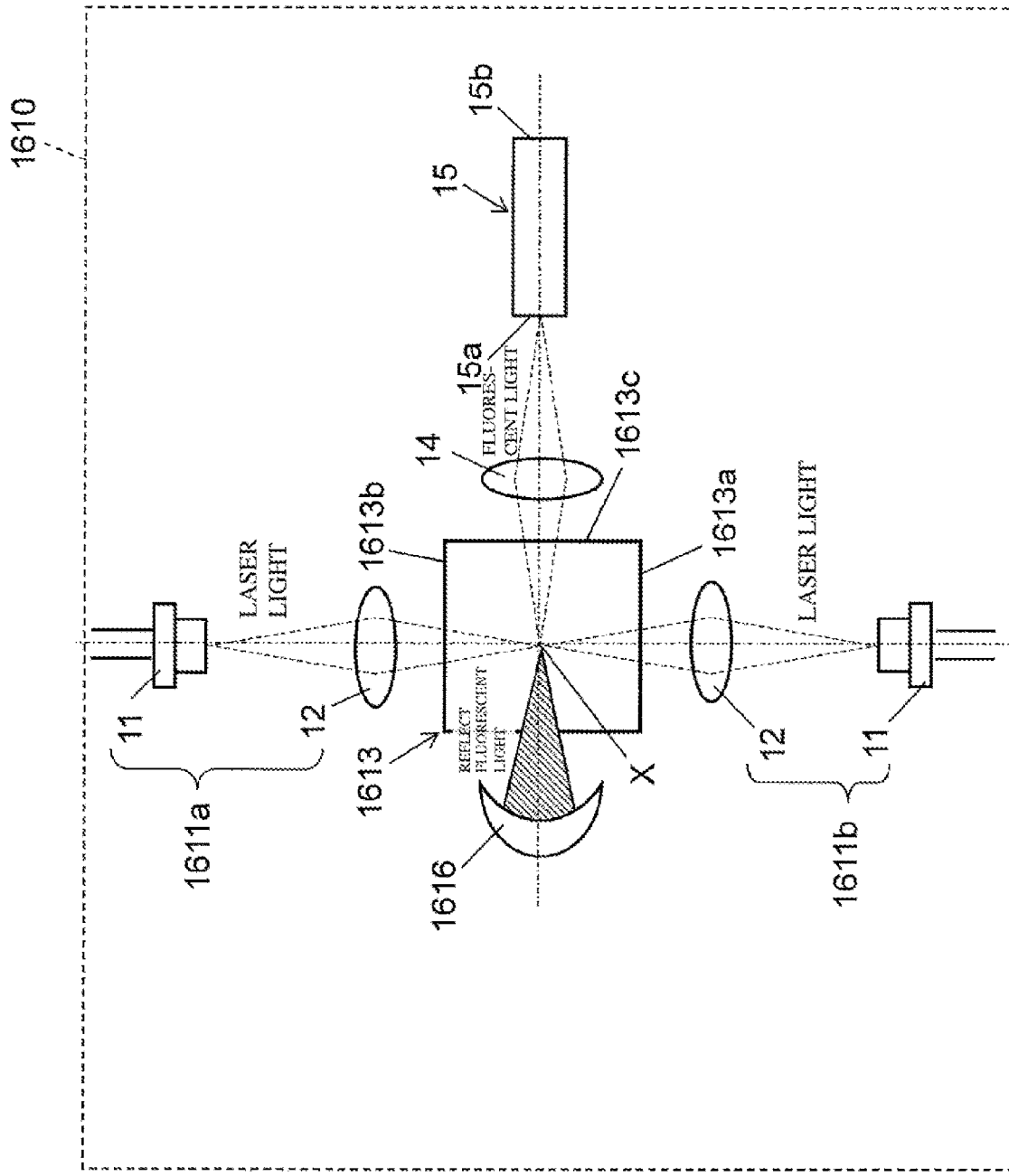
FIG. 29 is a schematic diagram illustrating a configuration of a light source device according to Embodiment 17 of the present invention.

The following is a description of a light source device 1610 according to Embodiment 17 of the present invention using FIG. 29.

The light source device 1610 according to the present embodiment differs from Embodiment 16 described above in that two laser condensing systems 1611a and 1611b are arranged at positions opposite to each other, and a concave mirror 1616 for reflecting fluorescent light is provided at a position opposite to a fluorescent light intake system (intake lens 14), outside a transmissive fluorescent body 1613 having a cubic (polyhedron) shape, as shown in FIG. 29.

Note that the other constituent elements of the light source device 1610 are similar to those of the light source device 10 of Embodiment 1 described above, and thus the same reference numerals are given to these constituent elements and a detailed description thereof is omitted.

The light source device 1610 of the present embodiment includes the laser condensing system 1611a including a light source unit 11 and a condensing lens 12, the laser condensing system 1611b including a light source unit 11 and a condensing lens 12, the transmissive fluorescent body 1613, the intake lens 14, an optical fiber 15, and the concave mirror 1616, as shown in FIG. 29.

The laser condensing systems 1611a and 1611b are arranged on a circumference of a circle centered on a condensing point X that is formed inside the transmissive fluorescent body 1613 having a cubic shape, as shown in FIG. 29. With this, the transmissive fluorescent body 1613 is irradiated with laser light from the plurality of laser condensing systems 1611a and 1611b that are arranged at the same distance.

The transmissive fluorescent body 1613 is a YAG single crystal fluorescent body doped with Ce ions, for example, and has a cubic shape. Also, the laser light enters the transmissive fluorescent body 1613 from incident faces 1613a and 1613b that oppose each other, and the fluorescent light is taken out from an emitting face 1613c that intersects the incident faces 1613a and 1613b.

The concave mirror 1616 is arranged opposite to a face that opposes the emitting face 1613c of the transmissive fluorescent body 1613. Also, the concave mirror 1616 reflects that part of the fluorescent light generated at the condensing point X of the transmissive fluorescent body 1613 and emitted toward every direction, that has passed through the face that opposes the emitting face 1613c toward the condensing point X.

As described above, in the light source device 1610 of the present embodiment, the two laser condensing systems 1611a and 1611b that are arranged at positions opposite to each other and the concave mirror 1616 for reflecting fluorescent light are provided outside the transmissive fluorescent body 1613 having a cubic shape.

With this, the same effect as the above-described embodiments that a light source with even higher luminance can be obtained can be achieved without providing members that have a function of reflecting fluorescent light inside the transmissive fluorescent body.

Embodiment 18

Figure 30:
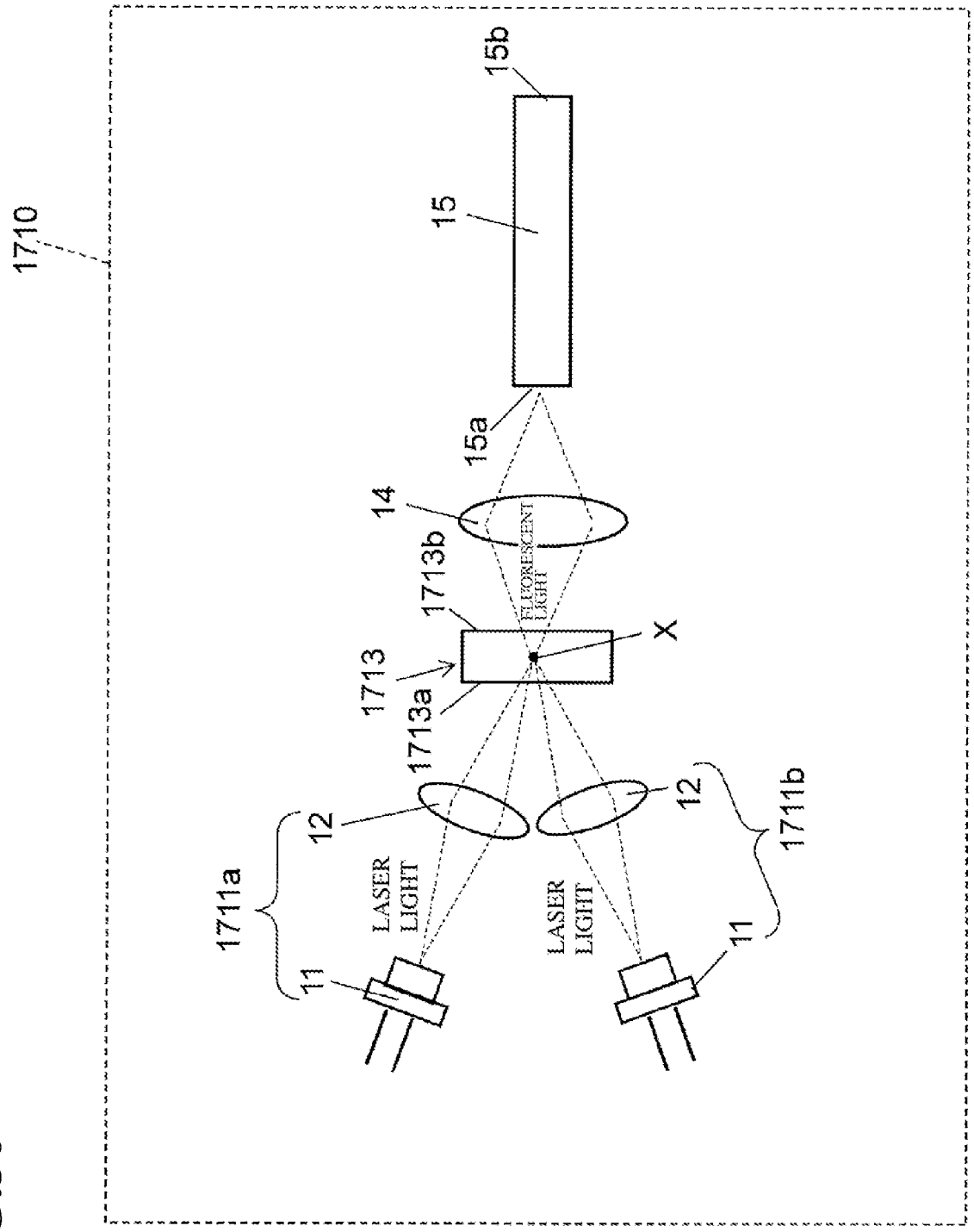
FIG. 30 is a schematic diagram illustrating a configuration of a light source device according to Embodiment 18 of the present invention.

The following is a description of a light source device 1710 according to Embodiment 18 of the present invention using FIG. 30.

The light source device 1710 according to the present embodiment differs from Embodiment 1 described above in that laser light is emitted to an incident face 1713a of the transmissive fluorescent body 1713 having a rectangular parallelepiped shape (plate-shaped) from a plurality of directions, and is condensed at a common condensing point X, as shown in FIG. 30.

Note that the other constituent elements of the light source device 1710 are similar to those of the light source device 10 of Embodiment 1 described above, and thus the same reference numerals are given to these constituent elements and a detailed description thereof is omitted.

The light source device 1710 of the present embodiment includes a laser condensing system 1711a including a light source unit 11 and a condensing lens 12, a laser condensing system 1711b including a light source unit 11 and a condensing lens 12, the transmissive fluorescent body 1713, an intake lens 14, and an optical fiber 15, as shown in FIG. 30.

The laser condensing system 1711a and the laser condensing system 1711b are arranged on a circumference of a circle centered on a condensing point X that is formed inside the transmissive fluorescent body 1713 having a rectangular parallelepiped shape, as shown in FIG. 30.

With this, the transmissive fluorescent body 1713 is irradiated with laser light from the plurality of laser condensing systems 1711a and 1711b that are arranged at the same distance. Also, the laser condensing systems 1711a and 1711b both emit laser light to the incident face 1713a of the transmissive fluorescent body 1713. Moreover, the laser condensing system 1711a and the laser condensing system 1711b are arranged such that the lens central axes of the respective condensing lenses 12 are oblique to the central lens axis of the intake lens 14 on a fluorescent light intake side.

The transmissive fluorescent body 1713 is a YAG single crystal fluorescent body doped with Ce ions, for example, and has a rectangular parallelepiped (plate-like) shape. Also, the laser light incident on the incident face 1713a from each of the two laser condensing systems 1711a and 1711b is condensed at a common condensing point X in the transmissive fluorescent body 1713. Also, the fluorescent light excited by laser light emitted from the two laser condensing systems 1711a and 1711b is taken out from an emitting face 1713b, and is condensed on a first face 15a of the optical fiber 15 by the intake lens 14.

As described above, in the light source device 1710 of the present embodiment, when the single incident face 1713a of the transmissive fluorescent body 1713 having a rectangular parallelepiped (plate-like) shape is irradiated with laser light from a plurality of positions, the laser light is condensed at the common condensing point X inside the transmissive fluorescent body 1713.

With this, the amount of laser light condensed at the condensing point X of the transmissive fluorescent body 1713 is substantially doubled compared with a configuration in which one laser condensing system is included, and as a result, the amount of excited fluorescent light is substantially doubled, and a light source with even higher luminance can be obtained.

Other Embodiments

Although embodiments of the present invention have been described above, the present invention is not limited to the above-described embodiments and various modifications can be made without departing from the gist of the invention.

A

Examples in which a plate-shaped or spherical transmissive fluorescent body is used have been described in the embodiments described above. However, the present invention is not limited thereto.

For example, a transmissive fluorescent body having another shape such as an ellipsoid or a polygon may also be used.

B

The embodiments have been described as combining a transmissive fluorescent body having a spherical, plate-like, or polyhedral shape, a single or a plurality of laser condensing systems, and a single or a plurality of fluorescent light intake systems. However, the present invention is not limited thereto.

For example, the configuration is not limited to the combinations described in the embodiments described above, and other combinations other than those described in the embodiments may also be adopted.

C

Examples in which the present invention is applied to the light source device 10 of the confocal measurement device (range sensor) 50 have been described in the embodiments described above. However, the present invention is not limited thereto.

For example, the range sensor on which the light source device of the present invention is to be mounted is not limited to a range sensor such as a confocal measurement device, and the light source device may also be mounted on other range sensors.

Also, the present invention can also be applied, as the light source device, to light source devices for a headlight or an endoscope.

INDUSTRIAL APPLICABILITY

The light source devices of the present invention provide an effect that a light source with higher luminance than known light sources can be obtained, and thus can be widely applied as various types of light source devices.

INDEX TO THE REFERENCE NUMERALS

10 Light source device
11 Light source unit
Condensing lens
Transmissive fluorescent body
13a Incident face
13b Emitting face
13ba Emitting portion 14 Intake lens
15 Optical fiber
15a First face
15b Second face
20 Fluorescent light source portion
20a Incident-side cross section
20b Small diameter portion cross section
20c Emitting-side cross section
50 Confocal measurement device (range sensor)
51 Head unit
51a Diffractive lens (chromatic aberration focusing lens)
51b Objective lens
51c Condensing lens
52 Optical fiber
53 Controller unit
54 Monitor
55a, 55b Optical fiber
56 Branching optical fiber
57 Spectroscope
57a Concave mirror
57b Diffraction grating
57c Condensing lens
59 Imaging element (light receiving unit)
59 Control circuit unit (measurement unit)
110 Light source device
113 Transmissive fluorescent body
113a Incident face
113b Emitting face
116 Concave mirror
120 Fluorescent light source unit
210 Light source device
216 Concave mirror
220 Fluorescent light source unit
310 Light source device
313 Transmissive fluorescent body
313a Emitting portion
410 Light source device
411a, 411b Laser condensing system
413 Transmissive fluorescent body
413a Incident face
413b Emitting face
413c Incident face
510 Light source device
513 Transmissive fluorescent body
513a Incident faces
513b, 513c Emitting face
514a, 514b Fluorescent light intake system
610 Light source device
611a, 611b Laser condensing system
613 Transmissive fluorescent body
710 Light source device
713 Transmissive fluorescent body
714a, 714b Fluorescent light intake system
810 Light source device
811a, 811b Laser condensing system
813 Transmissive fluorescent body
814a, 814b Fluorescent light intake system
910 Light source device
913 Transmissive fluorescent body
913a Laser transmissive/fluorescent light reflective film (first face)
913b Laser reflective/fluorescent light transmissive film (second face)
1010 Light source device
1011a, 1011b, 1011c Laser condensing system
1013 Transmissive fluorescent body
1013a Laser transmissive/fluorescent light reflective mirror
1013b Laser reflective/fluorescent light transmissive mirror
1110 Light source device
1113 Transmissive fluorescent body
1113a Intake window (first opening portion)
1113b Taking-out window (second opening portion)
1113c Reflection film
1210 Light source device
1211a to 1211c Laser condensing system
1213 Transmissive fluorescent body
1213a to 1213c Intake window (first opening portion)
1213d Taking-out window (second opening portion)
1213e Reflection film
1310 Light source device
1311a to 1311f Laser condensing system
1313 Transmissive fluorescent body
1313a to 1313f Intake window (first opening portion)
1313g Taking-out window (second opening portion)
1313h Reflection film
1410 Light source device
1413 Transmissive fluorescent body
1413a Intake window (first opening portion)
1413b, 1413c Taking-out window (second opening portion)
1413d Reflection film
1414a, 1414b Fluorescent light intake system
1510 Light source device
1513 Transmissive fluorescent body
1513a Incident face
1513b Emitting face
1516a, 1516b Concave mirror
1610 Light source device
1611a, 1611b Laser condensing system
1613 Transmissive fluorescent body
1613a, 1613b Incident face
1613c Emitting face
1616 Concave mirror
1710 Light source device
1711a, 1711b Laser condensing system
1713 Transmissive fluorescent body
1713a Incident face
1713b Emitting face
A1 Central axis
A2 Central lens axis
d1, d2, d3 Distance
T Measurement object
X Condensing point

The invention claimed is:

1. A light source device comprising:
a light source configured to emit laser light;
a condensing lens configured to condense the laser light emitted from the light source; and
a transmissive fluorescent body inside of which a condensing point of the laser light condensed by the condensing lens is provided, the transmissive fluorescent body being configured to emit fluorescent light in every direction from a portion through which the laser light passes,
wherein the condensing point is provided in a range less than or equal to 160 μm from a surface of the transmissive fluorescent body.

2. The light source device according to claim 1, wherein the laser light passing through the transmissive fluorescent body forms a fluorescent light source thereinside from which the fluorescent light is emitted in every direction, the fluorescent light source having a substantially cylindrical shape extending in a longitudinal direction corresponding to a width direction through which the laser light passes, the condensing point of the laser light condensed by the condensing lens is provided in a central portion of the fluorescent light source formed inside the transmissive fluorescent body, the central portion of the fluorescent light source having a cross-sectional diameter that is smaller than a diameter of an end portion of the fluorescent light source at a incident-side where the laser light enters a surface of the transmissive fluorescent body and a diameter of an end portion of the fluorescent light source at a emitting-side where the laser light exits from a surface of the transmissive fluorescent body, and the fluorescent light is emitted in every direction from the fluorescent light source through which the laser light passes.

3. The light source device according to claim 1, wherein the transmissive fluorescent body is a single crystal fluorescent body.

4. The light source device according to claim 1, wherein the transmissive fluorescent body has a spherical, ellipsoidal, or polyhedron shape.

5. The light source device according to claim 1, further comprising an intake lens configured to condense at least the fluorescent light emitted from the transmissive fluorescent body.

6. The light source device according to claim 5, further comprising a fiber whose first end face is irradiated with the fluorescent light condensed by the intake lens and that emits the fluorescent light from a second end face on a side opposite to the first end face.

7. A light source device comprising:
a light source configured to emit laser light;
a condensing lens configured to condense the laser light emitted from the light source;
a transmissive fluorescent body inside of which a condensing point of the laser light condensed by the condensing lens is provided, the transmissive fluorescent body being configured to emit fluorescent light from a portion through which the laser light passes;
an intake lens configured to condense at least the fluorescent light emitted from the transmissive fluorescent body; and
a fiber whose first end face is irradiated with the fluorescent light condensed by the intake lens and that emits the fluorescent light from a second end face on a side opposite to the first end face,
wherein a plurality of fluorescent light intake systems each comprising the intake lens and the fiber are provided with respect to the single transmissive fluorescent body.

8. The light source device according to claim 5, wherein the intake lens is arranged such that a central lens axis of the intake lens matches a central axis of laser propagation of the laser light that is emitted from the light source and is condensed by the condensing lens.

9. The light source device according to claim 6, wherein the intake lens is arranged such that a central lens axis of the intake lens is oblique to a central lens axis of the condensing lens.

10. A light source device comprising:
a light source configured to emit laser light;
a condensing lens configured to condense the laser light emitted from the light source;
a transmissive fluorescent body inside of which a condensing point of the laser light condensed by the condensing lens is provided, the transmissive fluorescent cent body being configured to emit fluorescent light from a portion through which the laser light passes;
an intake lens configured to condense at least the fluorescent light emitted from the transmissive fluorescent body; and
a fiber whose first end face is irradiated with the fluorescent light condensed by the intake lens and that emits the fluorescent light from a second end face on a side opposite to the first end face,
wherein a plurality of fluorescent light intake systems each comprising the intake lens and the fiber are arranged such that the intake lenses are located on one spherical surface centered on the transmissive fluorescent body.

11. The light source device according to claim 1, wherein a plurality of laser condensing systems each comprising the light source and the condensing lens are provided with respect to the single transmissive fluorescent body.

12. The light source device according to claim 11, wherein the plurality of laser condensing systems are arranged such that the condensing lenses are located on one spherical surface centered on the transmissive fluorescent body.

13. The light source device according to claim 1, wherein the transmissive fluorescent body comprises a first face that allows the laser light to pass through and reflects the fluorescent light and a second face that reflects the laser light and allows the fluorescent light to pass through.

14. The light source device according to claim 1, further comprising a concave mirror that is arranged on a side of an incident face of the transmissive fluorescent body, allows the laser light emitted from the light source to pass through, and reflects that part of the fluorescent light emitted in the transmissive fluorescent body, that is emitted toward the incident face toward the transmissive fluorescent body.

15. The light source device according to claim 1, further comprising a concave mirror that is arranged on an emitting face side of the transmissive fluorescent body, reflects the laser light that has been emitted from the light source and has passed through the transmissive fluorescent body, and allows that part of the fluorescent light emitted in the transmissive fluorescent body, that is emitted toward the emitting face side to pass through.

16. The light source device according to claim 14, wherein the concave mirror is a dichroic mirror or a holed mirror comprising an opening portion.

17. The light source device according to claim 1, wherein the transmissive fluorescent body has a spherical shape.

18. The light source device according to claim 17, wherein the transmissive fluorescent body comprises a first opening portion for taking in the laser light that was emitted from the light source and has been condensed by the condensing lens and a second opening portion for taking out the fluorescent light emitted in the transmissive fluorescent body due to the laser light.

19. The light source device according to claim 17, wherein a laser condensing system comprising the light source and the condensing lens is arranged so as to condense the laser light in a central portion of the spherical transmissive fluorescent body.

20. The light source device according to claim 17, wherein a plurality of laser condensing systems each comprising the light source and the condensing lens are arranged on one spherical surface centered on the transmissive fluorescent body.

21. The light source device according to claim 17, further comprising:
- an intake lens configured to condense the fluorescent light emitted from the transmissive fluorescent body; and
- a fiber whose first end face is irradiated with the fluorescent light condensed by the intake lens and that emits the fluorescent light from a second end face on a side opposite to the first end face.

22. A light source device comprising:
- a light source configured to emit laser light;
- a condensing lens configured to condense the laser light emitted from the light source;
- a spherical transmissive fluorescent body inside of which a condensing point of the laser light condensed by the condensing lens is provided, the transmissive fluorescent body being configured to emit fluorescent light from a portion through which the laser light passes;
- an intake lens configured to condense at least the fluorescent light emitted from the transmissive fluorescent body; and
- a fiber whose first end face is irradiated with the fluorescent light condensed by the intake lens and that emits the fluorescent light from a second end face on a side opposite to the first end face,
- wherein a plurality of fluorescent light intake systems each comprising the intake lens and the fiber are arranged on one spherical surface centered on the transmissive fluorescent body.

23. The light source device according to claim 21, wherein the intake lens is arranged such that a central lens axis of the intake lens matches an optical axis of the laser light that is emitted from the light source and is condensed by the condensing lens.

24. The light source device according to claim 21, wherein the intake lens is arranged such that a central lens axis of the intake lens is oblique to a central lens axis of the condensing lens.

25. A light source device comprising:
- a light source configured to emit laser light;
- a condensing lens configured to condense the laser light emitted from the light source;
- a spherical transmissive fluorescent body inside of which a condensing point of the laser light condensed by the condensing lens is provided, configured to emit fluorescent light in every direction in a portion through which the laser light condensed by the condensing lens passes;
- a reflection film that is provided in at least a portion of a surface of the transmissive fluorescent body and reflects the laser light or the fluorescent light;
- a first opening portion that is formed in a portion of the reflection film on a laser light entering side and allows the laser light to enter; and
- a second opening portion that is formed in a portion of the reflection film on a fluorescent light emitting side and allows the fluorescent light to exit.

26. A range sensor comprising:
- the light source device according to claim 1;
- an imaging element configured to receive reflected light of light emitted from the light source device; and
- a control circuit configured to measure a distance to an object based on an amount of light received by the imaging element.

27. The range sensor according to claim 26, further comprising a chromatic aberration focusing lens through which light having a plurality of wavelengths output from the light source device passes, wherein
- the imaging element is configured to receive reflected light of light having the plurality of wavelengths emitted to the object via the chromatic aberration focusing lens, and
- the control circuit is configured to measure the distance to the object based on a wavelength of the reflected light at which the amount of light received by the imaging element is largest.

* * * * *